United States Patent [19]

Gouzu

[11] Patent Number: 5,809,316
[45] Date of Patent: Sep. 15, 1998

[54] POWER DEVICE OF AN INFORMATION PROCESSING APPARATUS FOR ADJUSTING A DRIVE STOP TIME PERIOD BASED UPON SYSTEM ACTIVITY

[75] Inventor: Tomonobu Gouzu, Tokyo, Japan

[73] Assignee: Mitsubishi Denki Kabushiki Kaisha, Tokyo, Japan

[21] Appl. No.: 619,139

[22] Filed: Mar. 21, 1996

[30] Foreign Application Priority Data

Mar. 31, 1995 [JP] Japan ..................................... 7-075322

[51] Int. Cl.⁶ ....................................................... G06F 1/32
[52] U.S. Cl. ............................... 395/750.05; 395/750.01; 360/69
[58] Field of Search .......................... 395/750.01, 750.05, 395/750.06; 360/73.03, 69, 77.02, 78.13

[56] References Cited

U.S. PATENT DOCUMENTS

| | | | |
|---|---|---|---|
| 4,665,536 | 5/1987 | Kim | 364/707 |
| 5,150,351 | 9/1992 | Ohno et al. | 369/116 |
| 5,230,074 | 7/1993 | Canova, Jr. et al. | 395/750 |
| 5,392,438 | 2/1995 | Gunji | 395/750.05 |
| 5,408,668 | 4/1995 | Tornai | 395/750 |
| 5,412,809 | 5/1995 | Tam et al. | 395/750.06 |
| 5,423,045 | 6/1995 | Kannan et al. | 395/750 |
| 5,434,495 | 7/1995 | Toko | 320/44 |
| 5,493,670 | 2/1996 | Douglis et al. | 395/750.06 |
| 5,517,649 | 5/1996 | McLean | 395/750.05 |
| 5,530,876 | 6/1996 | Suzuki | 395/750.05 |

Primary Examiner—Gopal C. Ray
Attorney, Agent, or Firm—Wolf, Greenfield & Sacks, P.C.

[57] ABSTRACT

To provide a power control apparatus for reducing power, wherein the user can specify a time interval to stop driving a system, such as a computer system, there are provided a system-state detecting unit for detecting the drive state of the system, measuring unit for measuring a drive-stop designation time period Toff from the time when the system finishes processing to the time when the user designates drive-stop for the system, and for measuring a drive-start designation time period Tcont from the time when the system finishes processing to the time when the user designates drive-start for the system after the system is automatically stopped, a power-off-time determining unit for determining the automatic-drive-stop time period from the time when the system finishes processing to the time when the drive automatically stopped, according to the drive-stop designation time period, a time reporting unit for measuring the idling time from the time when the system finishes processing to the time when processing is started again and for reporting that the idling time has exceeded the automatic-drive-stop time period, and a system control unit for stopping the driving of the system according to the report.

33 Claims, 79 Drawing Sheets

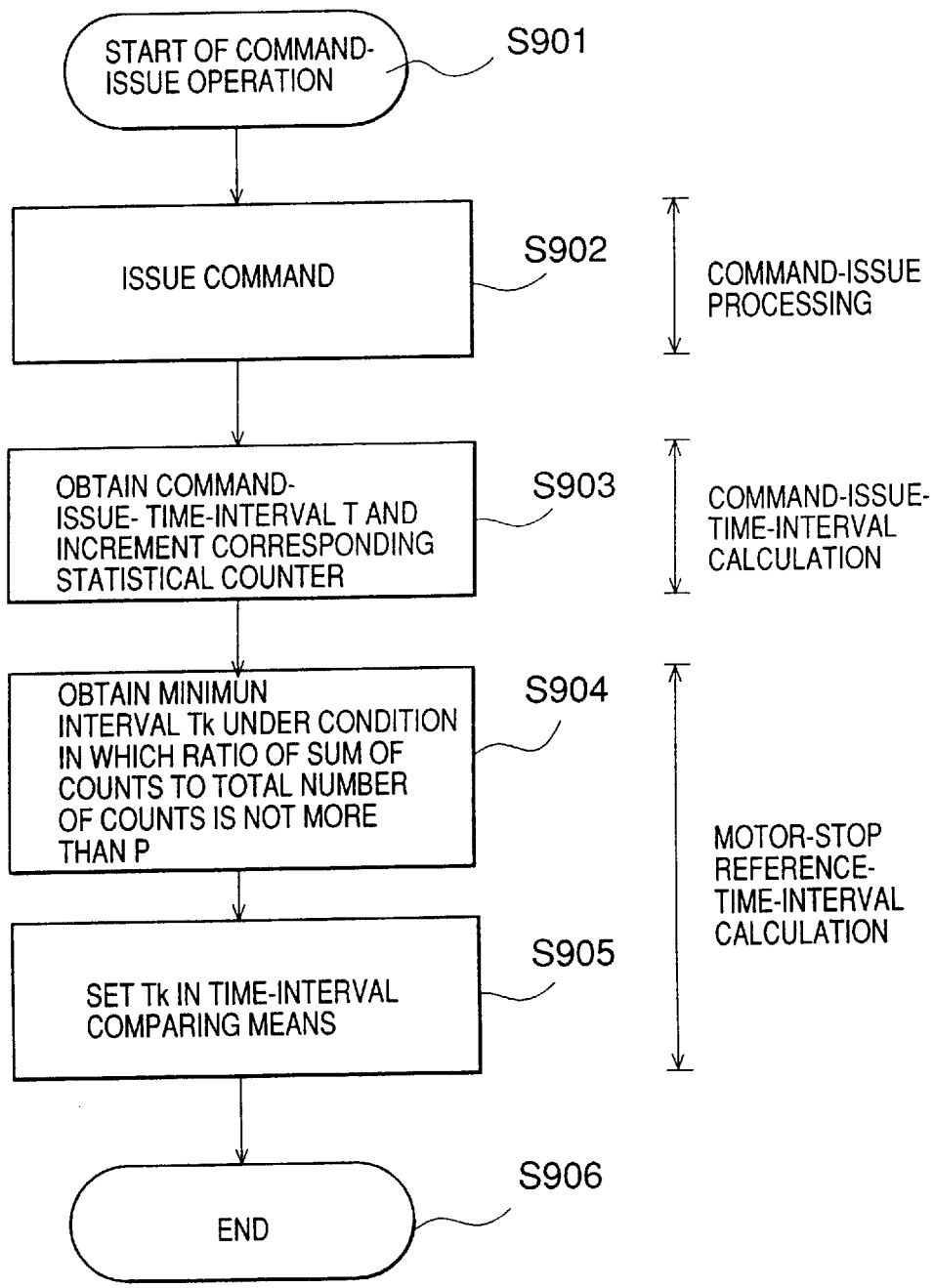

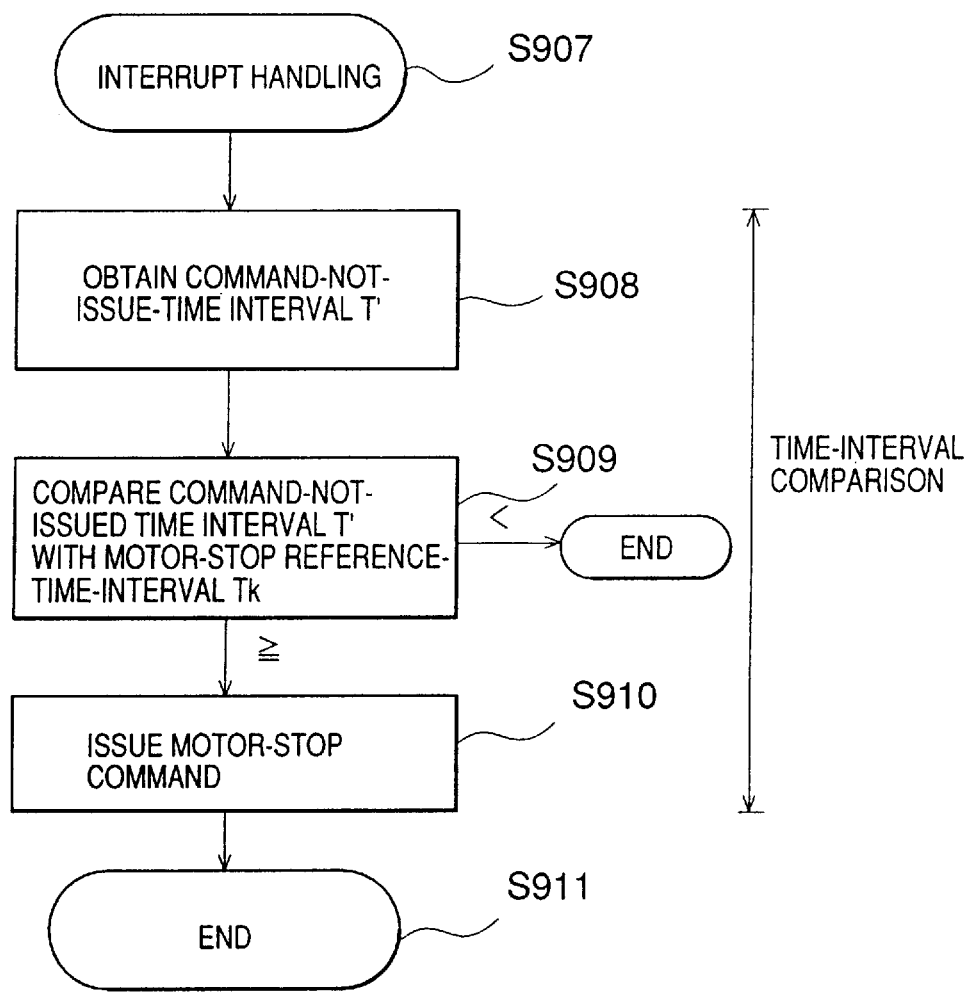

POWER DEVICE OF AN INFORMATION PROCESSING APPARATUS FOR ADJUSTING A DRIVE STOP TIME PERIOD BASED UPON SYSTEM ACTIVITY

BACKGROUND OF THE INVENTION

1. Field of the Invention

The present invention relates to information processing apparatuses, such as personal computers, word processors, and electronic pocketbooks, and more particularly, to a power control device for controlling the power of such an information processing apparatus.

2. Description of the Related Art

Computer-related products, such as personal computers and word processors, have been made compact these days and they can be easily carried like a notebook. Portable, compact electronic apparatuses, such as electronic pocketbooks and portable information terminals, have also been developed.

Since such a compact electronic apparatus is mainly operated with a battery, its power consumption should be reduced. It is important to suppress power consumption as much as possible in order to allow the apparatus to be used as long as possible.

In the past, a device disclosed in the Japanese Unexamined Patent Publication No. 4-316115 has been used for reducing power consumption. FIG. 80 shows a block diagram of the power control device of the conventional data processing apparatus. In FIG. 80, a hard-disk drive 901 has a motor which can be stop-controlled. Command issuing process 902 operating in a CPU 900 issues commands such as those for data write and data read to a hard-disk controller 906, described later. A command-issue-time-interval calculating process 903 receives the commands issued from the command issuing process 902, calculates the time interval between issued commands according to the time the command issuing process 902 reports and and the previous time it reported, and counts the time interval at a statistical counter (not shown). There is also shown a motor-stop reference-time-interval calculating process 904 which calculates the reference time interval for stopping the motor according to the information of the statistical counter. Time-interval comparing processing 905 obtains the time interval for which a command is not issued according to the time when a command is received from the command issuing process 902 and the time when a command was received last time, and compares the obtained time interval with the motor-stop reference-time-interval reported from the motor-stop reference-time-interval calculating process 904, and, depending on the result, issues a command for stopping the motor to the hard-disk controller 906. The hard-disk controller 906 controls the hard-disk drive 901, such as in data writing, data reading, and stopping the motor. A timer unit 907 reports the current time to the time-interval comparing process 905.

Operations of the power control device of the conventional data processing apparatus will be described by referring to FIGS. 80, 81, and 82.

FIG. 81 is a flowchart showing how to set the motor-stop reference-time-interval Tk. The command issuing process 902 issues a command for writing data, reading data, or the like into or from the hard-disk drive 901, to the hard-disk controller 906, and reports the time when the command is issued (s902) to the command-issue-time-interval calculating process 903 and the time-interval comparing process 905.

The command-issue-time-interval calculating process 903 calculates the time interval T between issued commands according to the times when it received a report last time and when it receives a report this time, and increments the count of the statistical counter (not shown) corresponding to the time interval T (s903).

The motor-stop reference-time-interval calculating process 904 rearranges the contents of the statistical counters in the order of the magnitude of corresponding time interval counted and calculates the sum of counts starting from the counter corresponding to the largest time interval in order to obtain the minimum time interval Tk under the condition in which the ratio of the sum of counts to the total number of counts is not more than P (P is a specified value between 0 and 1) (s904). This time interval Tk is set in the time-interval comparing process 905 as the motor-stop reference time interval (s905). Then, the command-issue operation is finished (s906).

FIG. 82 is a flowchart illustrating a motor-stop control operation of the hard-disk drive 901 in the conventional data processing apparatus, in which interrupt handling (s907) is repeatedly activated at a constant time interval.

When the time-interval comparing means 905 receives from the command issuing process 902 a signal indicating that a command has been issued, the time-interval comparing process 905 obtains the current time when it receives this signal from the counter unit 907, and compares that current time with the time when the preceding command was issued in order to obtain the time interval T' for which a command is not being issued (s908). Then, the time-interval comparing process 905 compares the time interval T' with the motor-stop reference-time-interval Tk (s909). When the time interval T' is smaller than the motor-stop reference-time-interval Tk, the interrupt handling is finished. On the other hand, when the time-interval T' is equal to or larger than the motor-stop reference-time-interval Tk, the time-interval comparing process 905 issues a motor-stop command to the hard-disk controller 906 (s910). Then, the interrupt handling is finished (s911).

In the conventional electronic apparatus, the power consumption is reduced by determining the motor-stop reference time interval based on the statistics of the time intervals of access commands, as described above.

In the conventional apparatus, however, if the user can specify a drive-start and a drive-stop in the apparatus, the motor-stop reference time interval requested by the user may differ from that determined based on the statistics of the time intervals for access commands. Accordingly, situations may occur such as those in which the user specifies a drive-start immediately after the drive is stopped according to the statistics and in which the motor-stop reference time interval according to the statistics does not elapse even if the time interval for which the user does not use the apparatus continues for a while.

It is necessary for the motor-stop time interval to be specified as short as possible in order to reduce power consumption. If the motor-stop time interval is set too short, however, the apparatus stops its operation when the user is still using the apparatus, increasing the inconvenience for the user of having to specify a drive-start. If the motor-stop time interval is too long, on the other hand, the apparatus continues operating even when the user does not use the apparatus any more, which wastes power. Hence, it is very difficult to set the motor-stop time interval appropriately, and power consumption is not efficiently reduced.

SUMMARY OF THE INVENTION

The present invention has been made in order to overcome these problems of conventional power control device for information processing apparatus.

An object of the present invention is to provide a power control device which can efficiently reduce the power consumption of an information processing apparatus. Another object of the invention is to provide a power control device for information processing apparatus which can efficiently reduce the power consumption according to the use conditions of the user to enable it to be used for long period.

A further object of the invention is to provide a power control device for an information processing apparatus which enables high-speed processing and reduced memory space.

BRIEF DESCRIPTION OF THE DRAWINGS

FIG. 81 and FIG. 82 are flowcharts showing operations of the conventional data processing apparatus.

DETAILED DESCRIPTION OF THE PREFERRED EMBODIMENTS

First Embodiment

Figure 1:
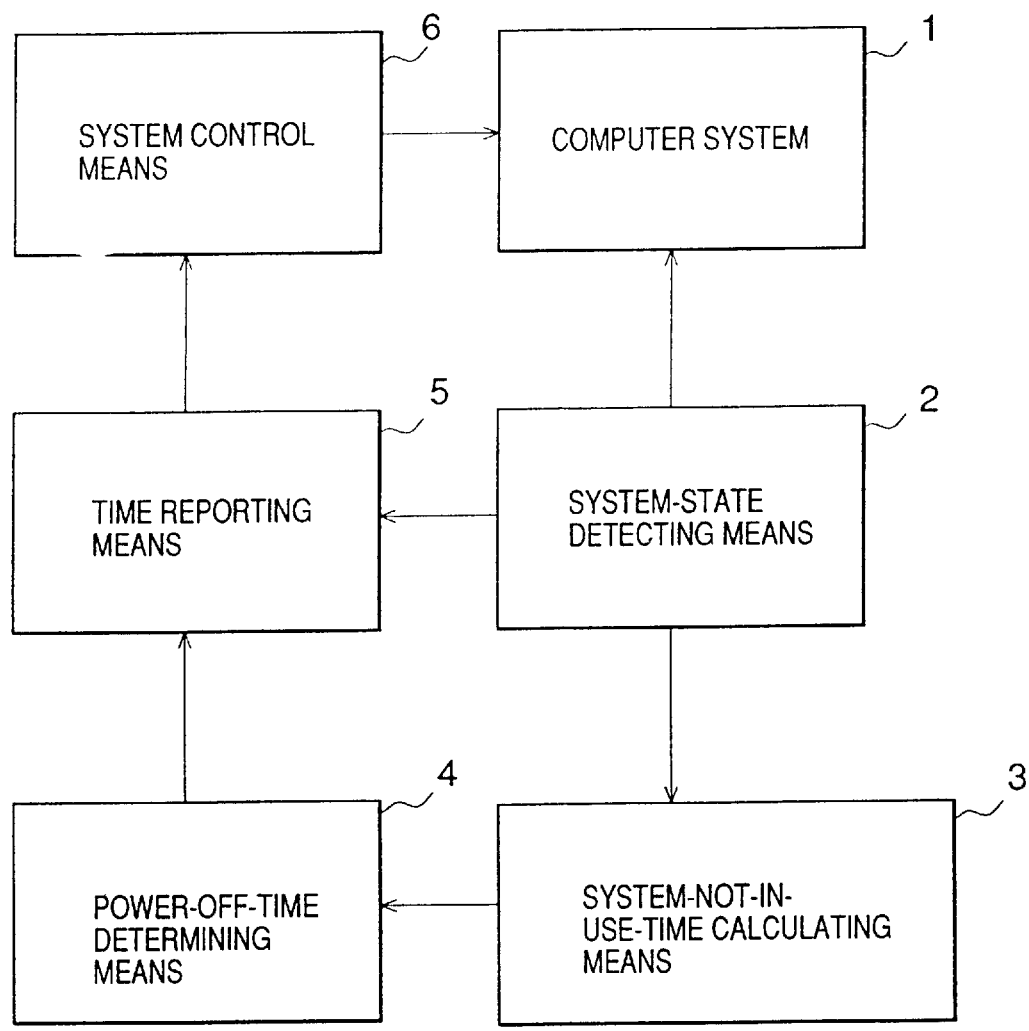
FIG. 1 is a block diagram showing the structure of a power control device according to the present invention.

A first embodiment of the present invention will be now described with reference to FIGS. 1 to 10. FIG. 1 is a block diagram of a power control device according to an embodiment of the present invention. In FIG. 1, there is shown the computer system 1 whose power is to be controlled and system-state detecting unit 2 for detecting a state of operation of the computer system 1 and for reporting the change in the state, if any.

A system-not-in-use-time calculating unit 3 calculates the time period in which the system is not being used, according to the time when the system-state detecting unit 2 reports a change in the state of the system, and obtains time period statistics.

A power-off-time determining unit 4 determines the time period Tauto from the time when said system 1 finishes processing to the time when the drive is automatically stopped. Further, time reporting unit 5 counts the time period determined by the power-off-time determining unit 4, and a system control unit 6 turns off the power of the computer system 1 when the time reporting unit 5 sends a report. Each unit may be a circuit for performing the proper functions. Alternatively, each unit may be included as an appropriate process in a CPU which performs the same functions.

Figure 2:
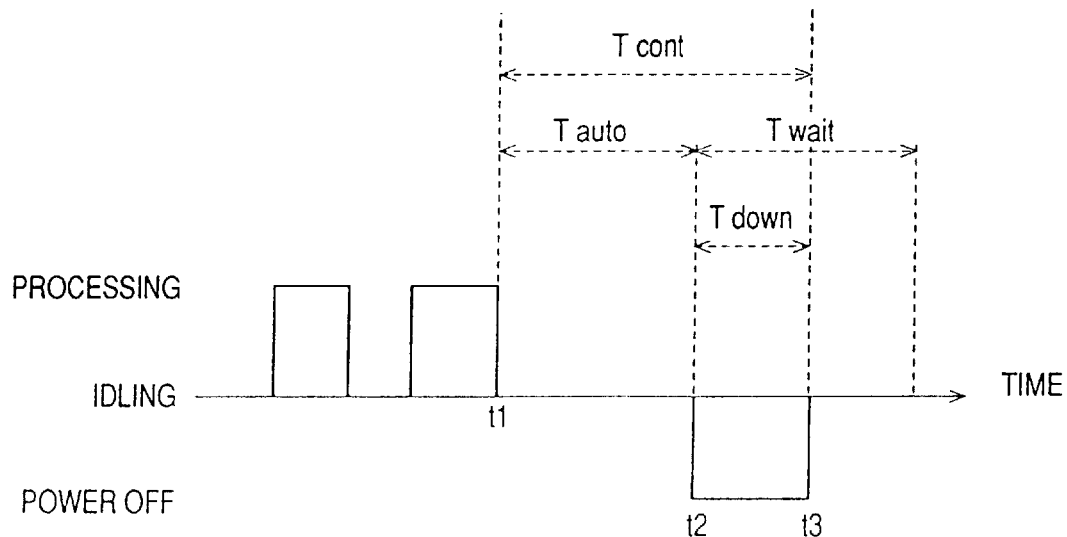
FIG. 2 is a timing chart indicating a state of a computer system according to a first embodiment of the present invention.
Figure 3:
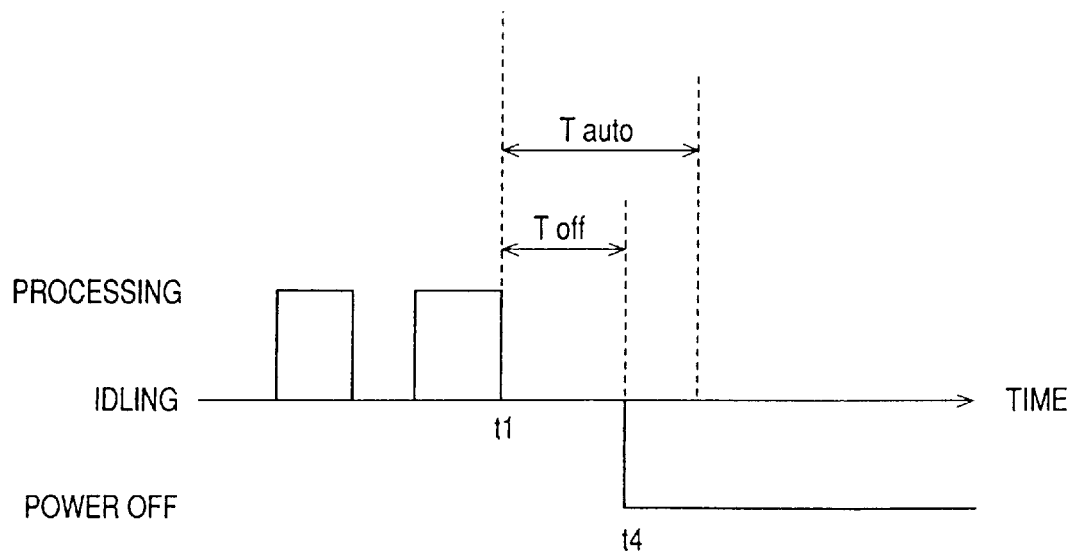
FIG. 3 is a timing chart indicating an another state of the computer system according to the first embodiment of the present invention.

FIG. 2 and FIG. 3 are timing charts indicating the states of operation of the computer system 1. In FIG. 2, first of all, the computer system 1 becomes idle after it finishes processing (t1). Next, the system control unit 6 turns off the power (t2), and then the user turns the power on (t3). Tauto is a automatic power-off time period indicating the time period from when the computer system 1 finishes its processing (t1) to when the system control unit 6 turns off the power (t2). Tcont unit the time period from when the computer system 1 finishes its processing (t1) to when the user turns the power on (t3). Tdown refers to the time period from when the system control unit 6 turns the power off (t2) to when the user turns the power on (t3). When Tdown is short, it can be assumed that the user hoped to use the computer system 1 continuously. Twait is the shortest time period to allow such a decision to be made.

In FIG. 3, first of all, the computer system 1 becomes idle after it finishes its processing (t1) and then the user turns off the power (t4). Toff indicates the time period from when the computer system 1 finishes its processing (t1) to when the user turns off the power (t4). Toff is shorter than Tauto because the computer system 1 is in an on-state when the user turns off the power.

Figure 4:
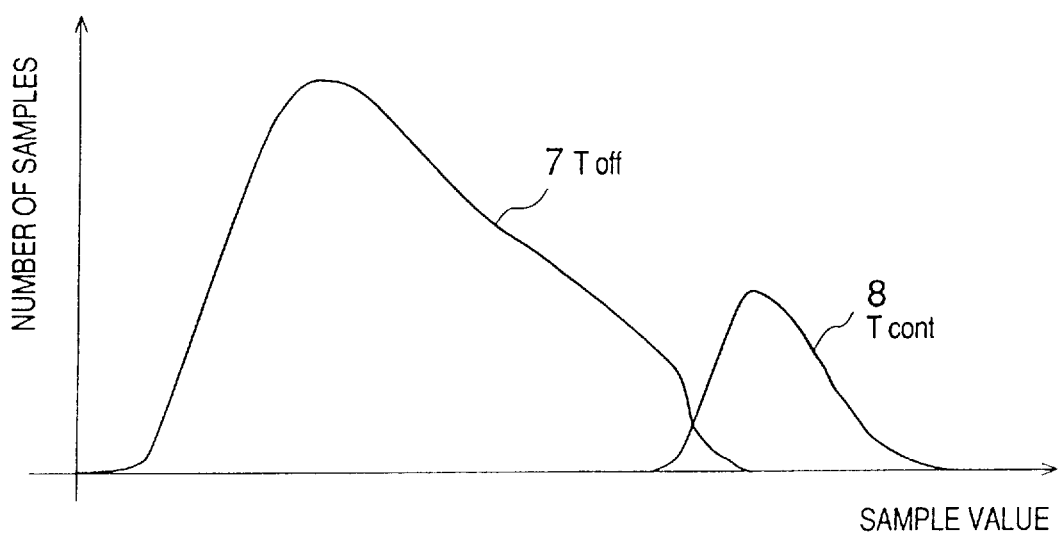
FIG. 4 shows an example of statistics of Toff and Tcont according to the first embodiment of the present invention.

FIG. 4 shows examples of the statistics of Toff and Tcont. The horizontal axis indicates a sample value (time period) and the vertical axis indicates the number of samples. Statistics 7 show the statistics of Toff, and statistics 8 the statistics of T cont. There is no need to collect samples from all the information in the past. It is enough to use samples collected from the information for the most recent several tens of power-on and power-off operations.

Figure 5:
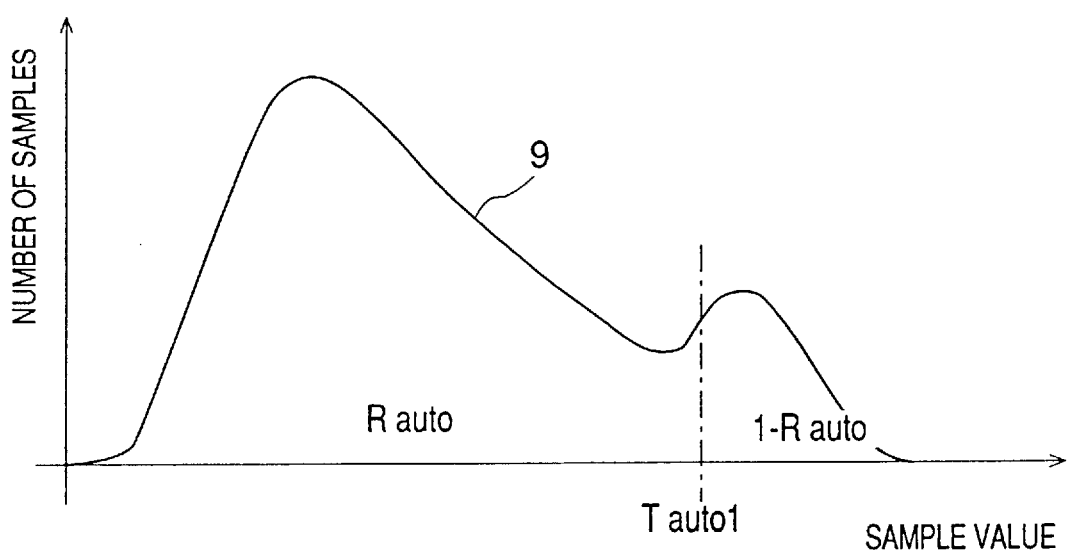
FIG. 5 shows an example of statistics of the sum of Toff and Tcont according to the first embodiment of the present invention.

FIG. 5 shows an example of the total statistics of Toff and Tcont. The horizontal axis indicates a sample value (time period) and the vertical axis indicates the number of samples. Statistics 9 show the total statistics of Toff and Tcont, which is made by combining the number of the samples for the statistics 7 and 8.

Operations in the first embodiment will be described next.

According to the statistics of the time Toff when the user turns the power off and of the time Tcont when the user turns the power on after the power is automatically turned off, the automatic power-off time period Tauto is determined. It is necessary to decide appropriately the area ratio in the statistics in advance which is essential to decide the automatic power-off time period Tauto. When this automatic power-off time period Tauto is short, power consumption is reduced, contributing to improvement in operations.

However, it also increases the number of cases in which the power is automatically turned off while the user uses the system, causing inconvenience to the user in having to turn on the power again. Therefore, the automatic power-off time period Tauto is determined after an area ratio Rauto is determined as a compromise value.

Figure 6:
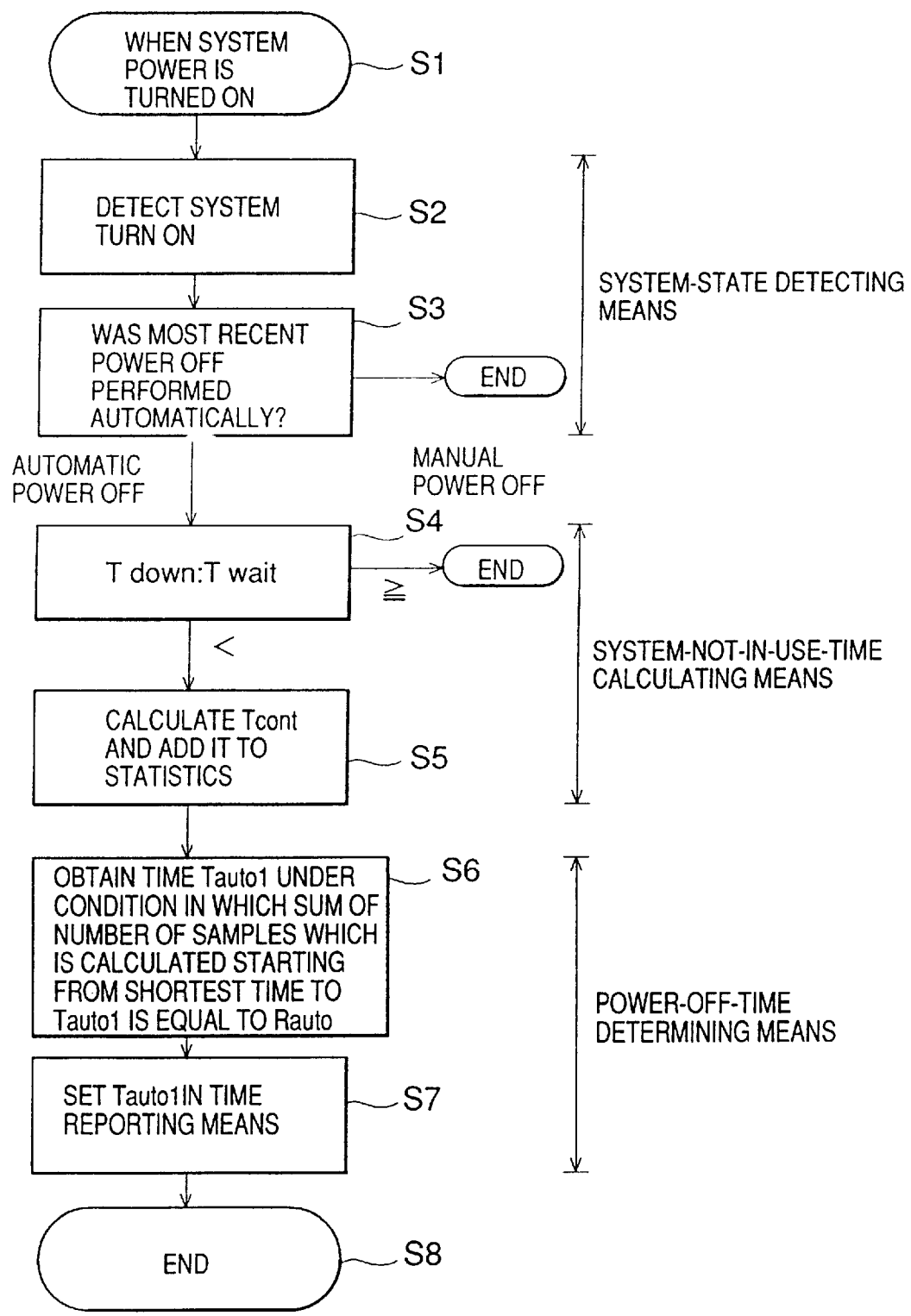
FIGS. 6 to 10 are flowcharts showing operations of a power control device according to the first embodiment of the present invention.

FIG. 6 is a flowchart for obtaining the automatic power-off time period Tauto in a case in which the computer system 1 is changed from "off" to "on" (s1).

The system-state detecting unit 2, shown in FIG. 1, detects the state in which the computer system 1 is turned on (s2). The system-state detecting unit 2 has stored identification information for identifying whether the system control unit 6 automatically turned the power off or the user turned the power off manually, at the time when the computer system 1 was changed from "on" to "off" the most recent time. When the power was turned off manually the last time, the processing terminates. On the other hand, when the power was automatically turned off last time, the system-state detecting unit 2 reports to the system-not-in-use-time calculating unit 3 that the computer system 1 was turned on this time (s3).

When the system-not-in-use-time calculating unit 3 receives the power-on report from the system-state detecting unit 2, it calculates Tdown according to the time when it receives the power-on report and the time when it received the automatic-power-off report from the system-state detecting unit 2 the most recent time. The system-not-in-use-time calculating unit 3 compares this Tdown with Twait, and if Tdown is not smaller than Twait, the processing terminates (s4). If Tdown is smaller than Twait, the system-not-in-use-time calculating unit 3 calculates Tcont and adds it to the statistics 8 (s5).

The power-off-time determining unit 4 obtains the time Tauto1 under the condition in which the sum of the number of samples which is calculated starting from the shortest sample value (time) is equal to the specified value Rauto, (Rauto is decided at the appropriate value between 0 and 1, for example, 0.8 (s6). The power-off-time determining unit 4 sets the obtained Tauto1 in the time reporting unit 5 (s7) and the processing terminates (s8).

In other words, every time the flowchart shown in FIG. 6 is passed through, the data of Tcont is added to the corresponding statistics and Tauto1 is obtained from the statistics (the total of Toff and Tcont) shown in FIG. 5.

Figure 7:
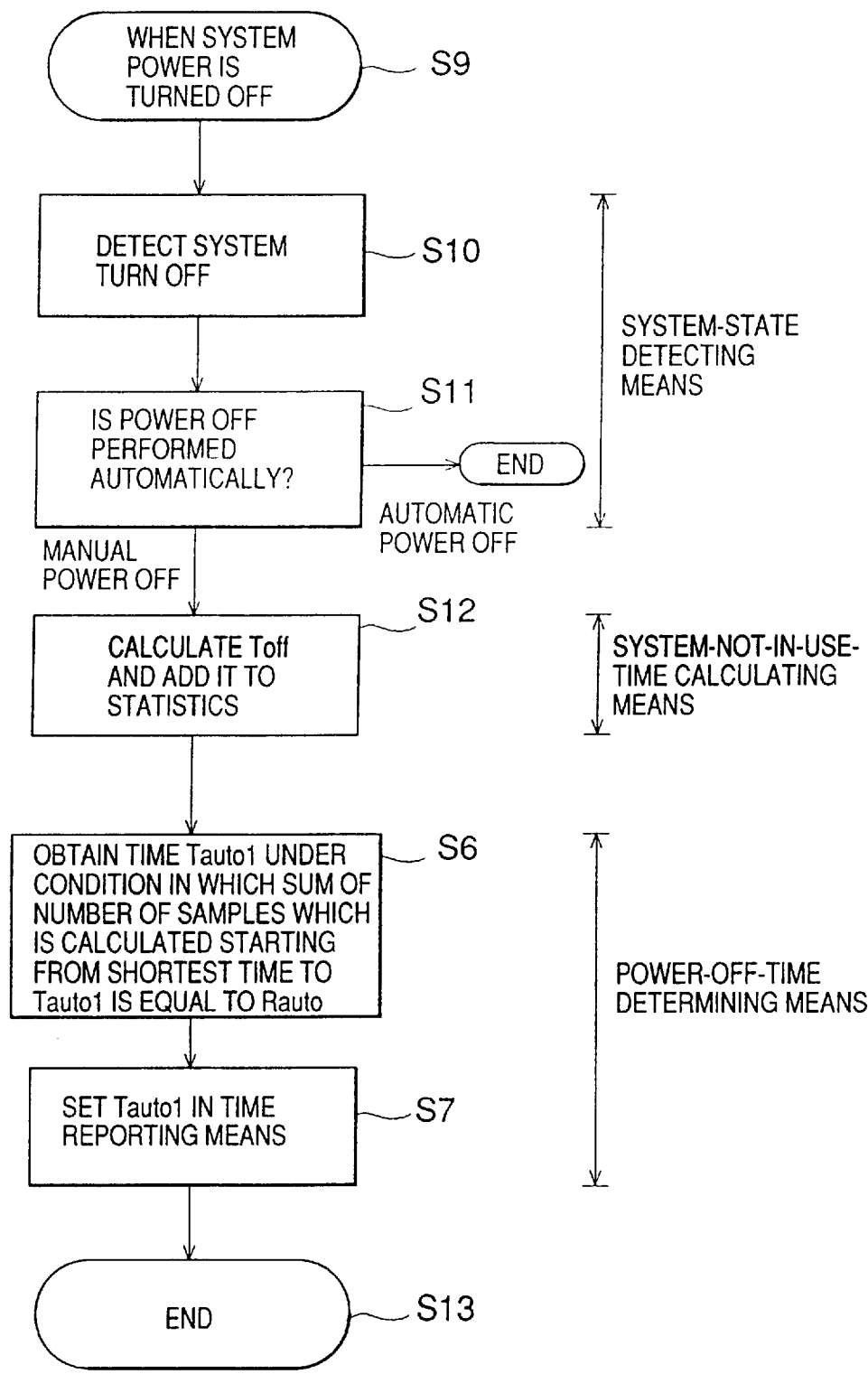

FIG. 7 is a flowchart indicating the processing in a case in which the power of the computer system 1 is changed from "on" to "off" (s9).

The system-state detecting unit 2, shown in FIG. 1, detects the state in which the computer power is turned off (s10). When the power is turned off automatically, this processing terminates. When the power is manually turned off by the user, the system-state detecting unit 2 reports to the system-not-in-use-time calculating unit 3 that the computer system 1 was turned off(s11).

The system-not-in-use-time calculating unit 3 calculates Toff according to the time when it receives the manual-power-off report from the system control unit 6 this time and the time when it received the system-processing-termination report from the system control unit 6 the most recent time, and adds it to the statistics 7 (s12).

The same steps as steps s6 and s7 in FIG. 6 are performed, and the processing terminates (s13).

In other words, every time the flowchart shown in FIG. 7 is passed through, the data of Toff is added to the corresponding statistics and Tauto1 is obtained from the statistics which is the sum of Toff and Tcont shown in FIG. 5.

Figure 8:
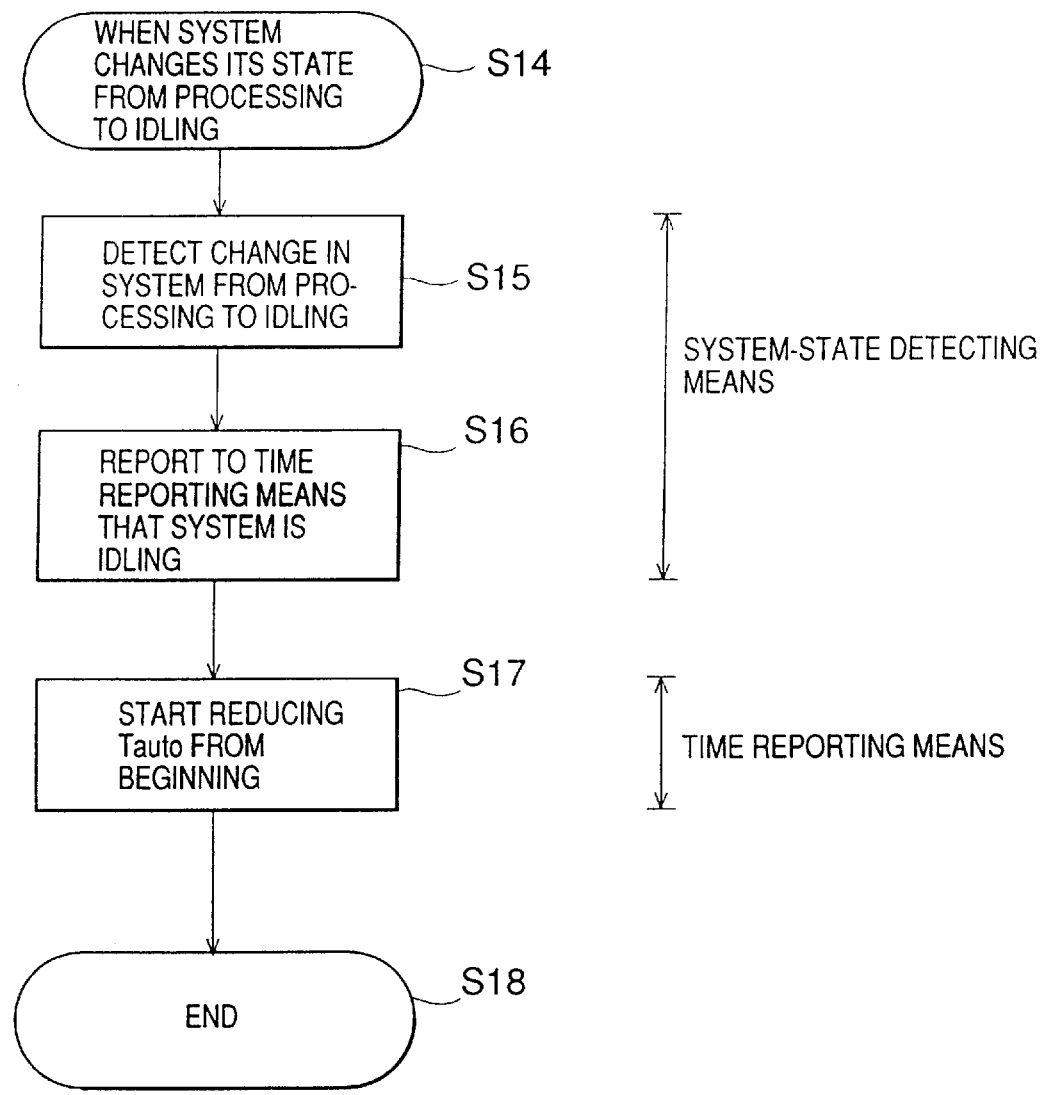

FIG. 8 is a flowchart indicating the processing in a case in which the computer system 1 is changed from the processing state to the idle state shown in FIG. 2. With FIG. 8, operations in a case in which the computer system 1 becomes idle from the processing state (s14) will be described below.

The system-state detecting unit 2 detects the state in which the computer system 1 becomes idle from the processing state (s15). The system-state detecting unit 2 reports to the time reporting unit 5 that the computer system 1 is idling (s16).

When the time reporting unit 5 receives an idling report, it starts countdown of Tauto (s17) from the beginning, and the processing terminates (s18).

Even when the processing shown in FIG. 8 is finished, Tauto is counted down at a constant interval until it is stopped by other processing flow.

Figure 9:
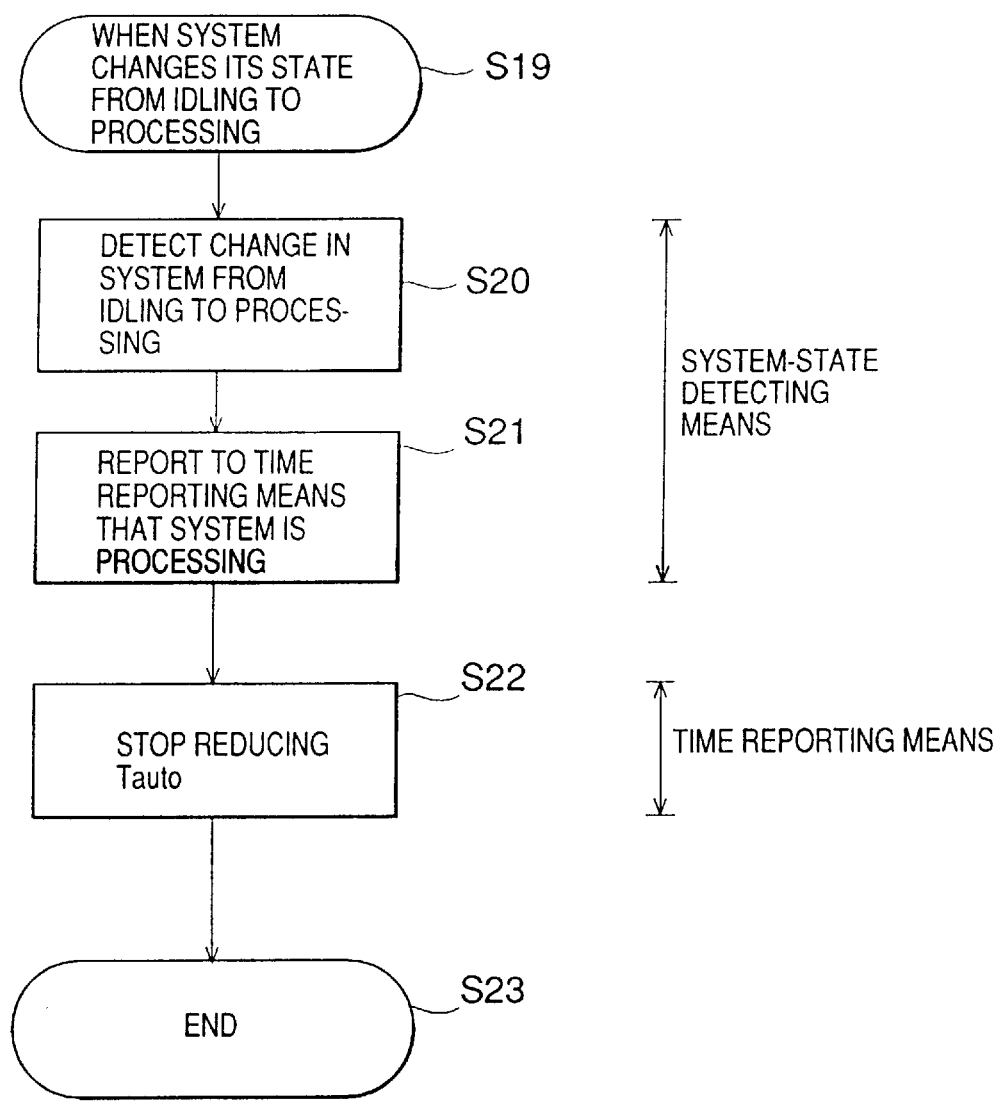

FIG. 9 is a flowchart indicating the processing in a case in which the computer system 1 is changed its state from idling to processing(s19).

The system-state detecting unit 2 detects the state in which the computer system 1 changed its state from idling to processing (s20). The system-state detecting unit 2 reports to the time reporting unit 5 that the computer system 1 is now processing (s21).

When the time reporting unit 5 receives the in-processing report, it stops countdown of Tauto (s22), and the processing terminates (s23).

Remaining in Tauto indicates that the power is not necessary to be automatically turned off, because the computer system 1 starts processing before the idling time shown in FIG. 2 exceeds Tauto. When Tauto is zero, it indicates that the power is necessary to be automatically turned off because the idling time shown in FIG. 2 exceeded Tauto.

Figure 10:
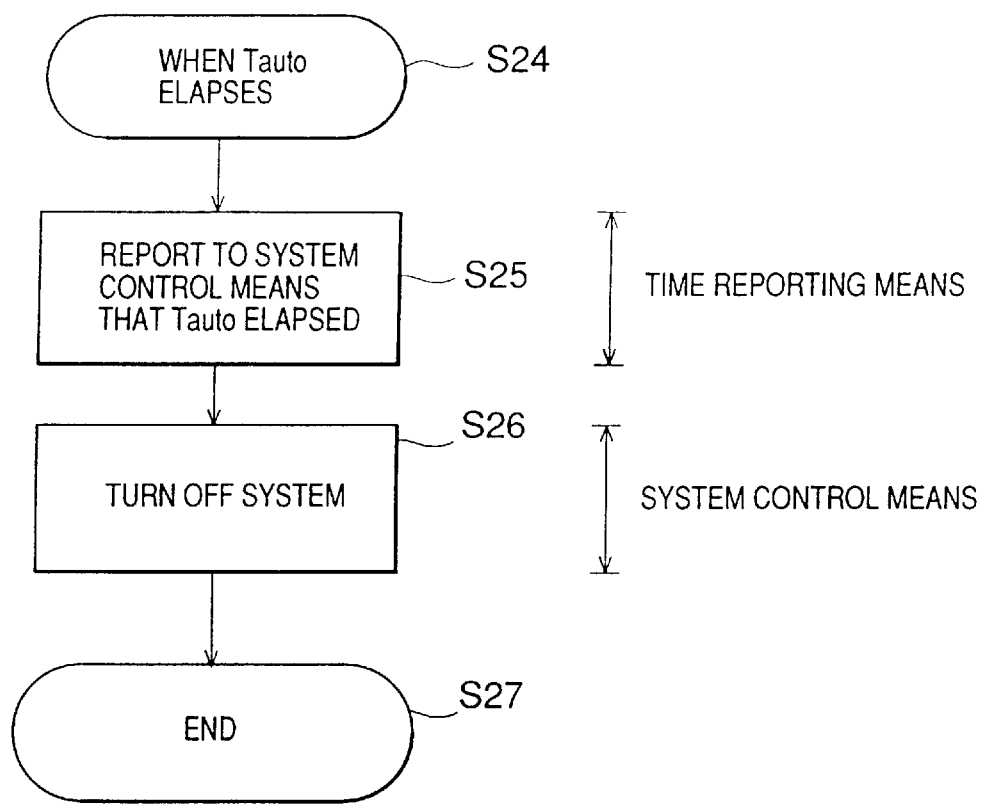

FIG. 10 is a flowchart indicating the processing in a case in which the idling time exceeds Tauto as the result of the countdown of Tauto by the time reporting unit 5. By referring to FIG. 10, operation in a case in which the idling time exceeds Tauto in the time reporting unit 5 (s24) will be described.

The time reporting unit 5 reports to the system control unit 6 that the idling time exceeded Tauto (s25).

When the system control unit 6 receives the report from the time reporting unit 5, it turns off the computer system 1 (s26), and the processing terminates (s27).

In the above embodiment, the area ratio R auto is determined by the user, but it is needless to say that the area ratio may be automatically determined.

According to the embodiment, since the ratio of the time period Tcont from when processing is finished to when the user turns the power on after the power was automatically turned off, to the idling time period Toff from when processing is finished to when the user manually turns the power off, can be set to the desired value, there is an advantage that the apparatus can be used for a long time with low power consumption by setting the ratio to an appropriate value according to the needs of the user.

Second Embodiment

Figure 11:
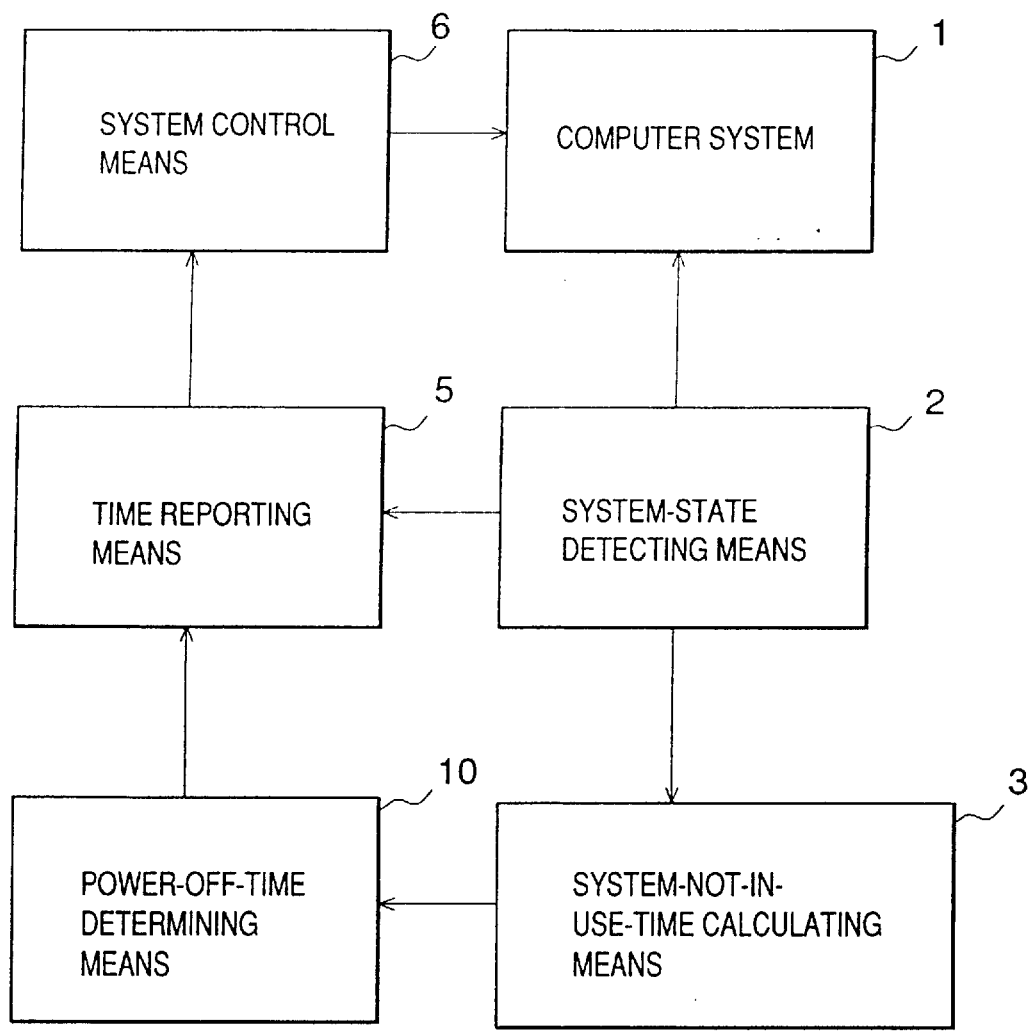
FIG. 11 is a block diagram of the structure of a power control device according to a second embodiment of the present invention.

FIG. 11 is a block diagram of a power control apparatus for controlling the power of the computer system 1, according to another embodiment of the present invention. The same symbols as those used in FIG. 1 indicate the same or corresponding portions.

In FIG. 11, a power-off-time determining unit 10 determines the time period for turning off the computer system while the system is being used, according to the statistics of the system-not-in-use time obtained from the system-not-in-use-time calculating unit 3.

Tauto, Tcont, Tdown, and Twait are the same as those shown in FIG. 2 and Toff is the same as that shown in FIG. 3. The statistics 7 and 8 are the same as those shown in FIG. 4.

Figure 12:
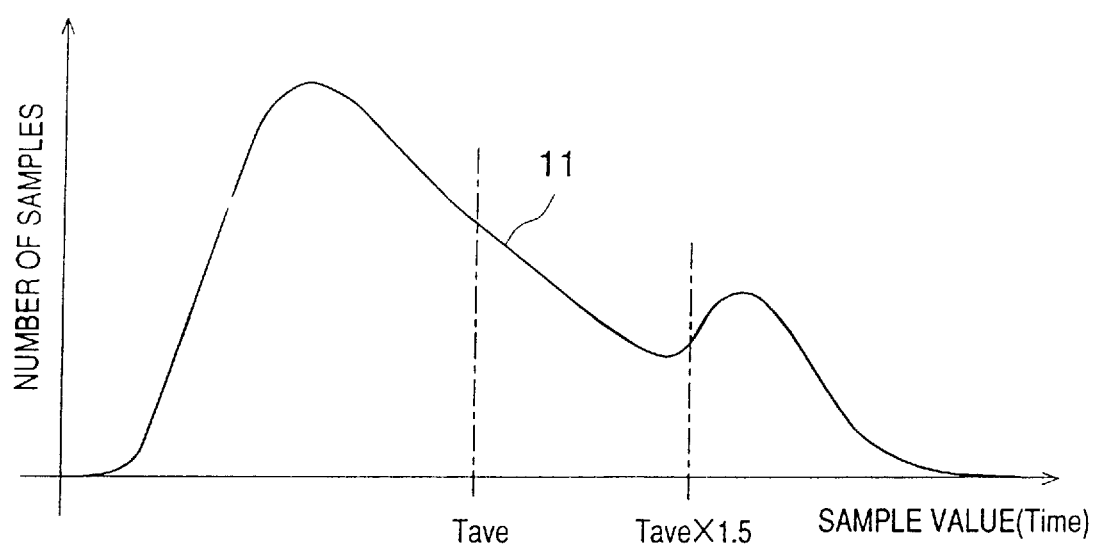
FIG. 12 is an example of statistics according to the second embodiment of the present invention.

FIG. 12 shows an example of the statistics of the sum of Toff and Tcont. The horizontal axis indicates a sample value (time) and the vertical axis indicates the number of samples. Statistics 11 indicates the sum of the samples for Toff and Tcont, which is the same as the sum of the number of the samples in the statistics 7 and 8.

In the second embodiment, the automatic-power-off time Tauto is automatically determined by using a constant multiple method of the average in the statistics shown in the first embodiment.

Figure 13:
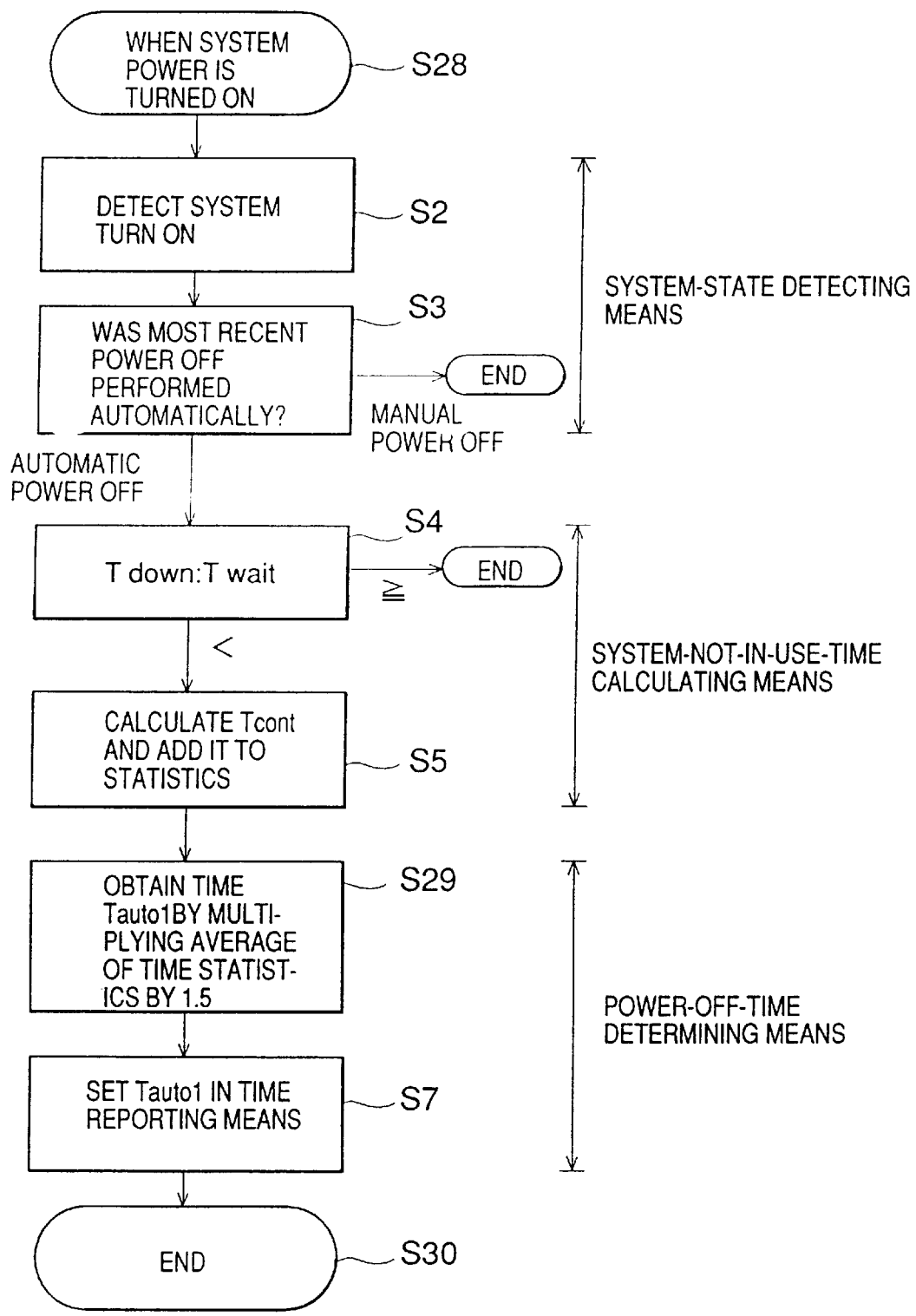
FIG. 13 and FIG. 14 are flowcharts showing operations of the power control device according to the second embodiment of the present invention.

Operations in the second embodiment will be described next referring to FIG. 13 and FIG. 14. FIG. 13 is a flowchart showing the processing in a case in which the computer system 1 is changed from "off" to "on" (s28). The same processing is performed in steps s2 to s5 in FIG. 13 as that in steps s2 to s5 in FIG. 6.

Next, the power-off-time determining unit 10 calculates the average Tave of the samples in the statistics 11 as shown in FIG. 12 and obtains the time Tauto1, which is 1.5 times of Tave (s29). Then, the same processing is performed in step s7 as that in step s7 in FIG. 6, and the processing shown in FIG. 13 is finished (s30).

In the above embodiment, Tauto1 is obtained by automatically multiplying the average time in the statistics by 1.5. It is not necessary that a multiplier is limited to 1.5, but it may be any constant, such as one third of the samples, one fourth of the samples, and the maximum value of the samples in the statistics.

Figure 14:
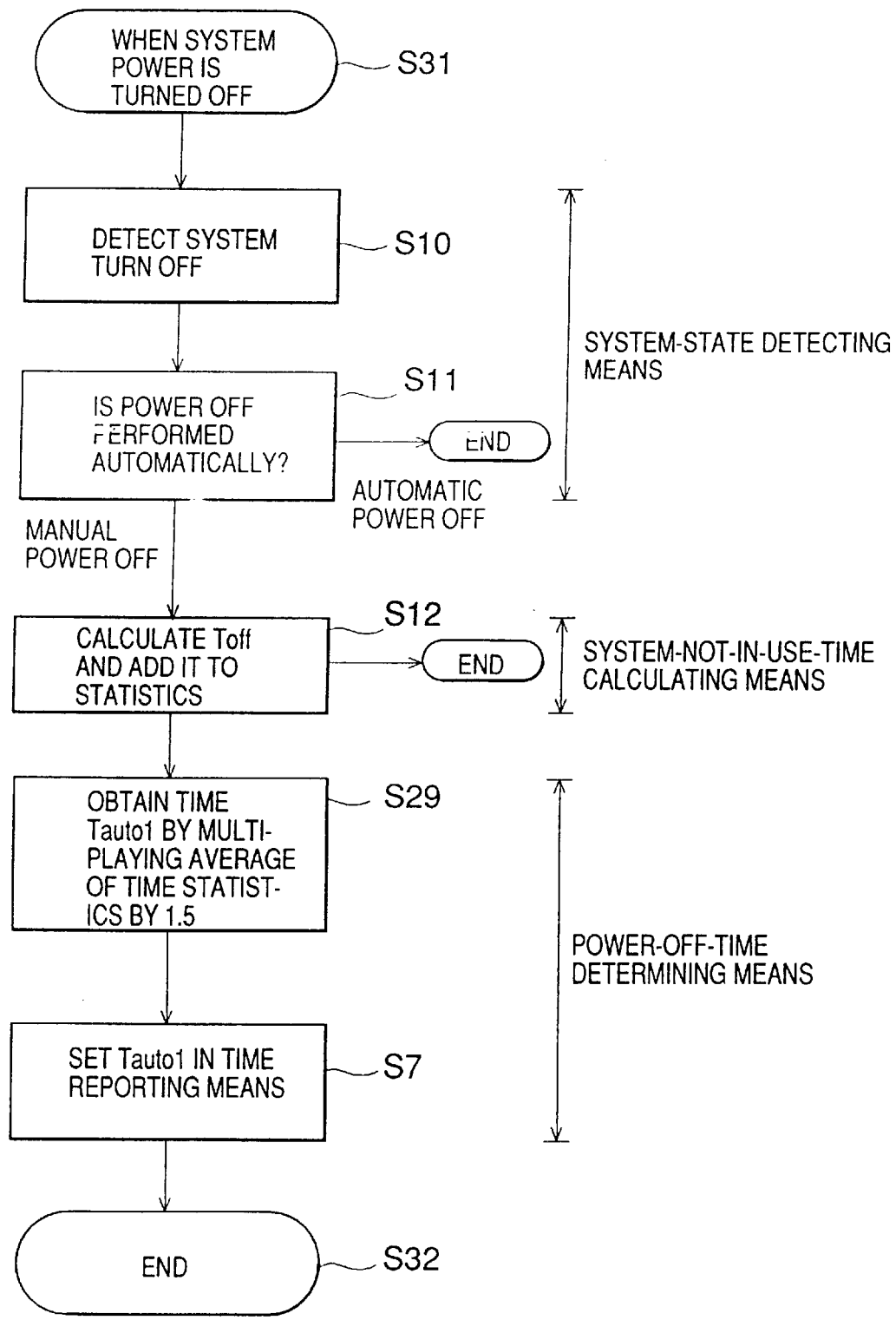

FIG. 14 is a flowchart showing the processing in a case in which the computer system 1 is changed from "on" to "off" (s31). In FIG. 14, the same processing is performed as that in steps s10 to s12 in FIG. 7. Further, the same processing as that in step s29 in FIG. 13 is performed. Then, the same processing as that in step s7 in FIG. 6 is performed, and the processing shown in FIG. 14 is finished (s32).

Operations in a case in which the system changes its state from processing to idling (s14) are the same as those in FIG. 8, and operations in a case in which the system changes its state from idling to processing (s19) are the same as those in FIG. 9. Finally, operations in a case in which the idling time period is equal to or exceeds Tauto (s24) are the same as those in FIG. 10.

This embodiment has not only the advantage of the first embodiment but also another advantage in that Tauto1 can be obtained faster than in the first embodiment because of the simplified algorithm for obtaining Tauto1.

Instead of step s5 in FIG. 13 and step s12 in FIG. 14, a step can be used for obtaining the same result, in which only the total of Toff and Tcont is stored and the average is obtained according to this total value. In this case, while it is required in the first embodiment to store data one by one each time Toff or Tcont is input, it is necessary in the second embodiment to store the total value only, reducing the memory capacity which is needed.

Third Embodiment

Figure 15:
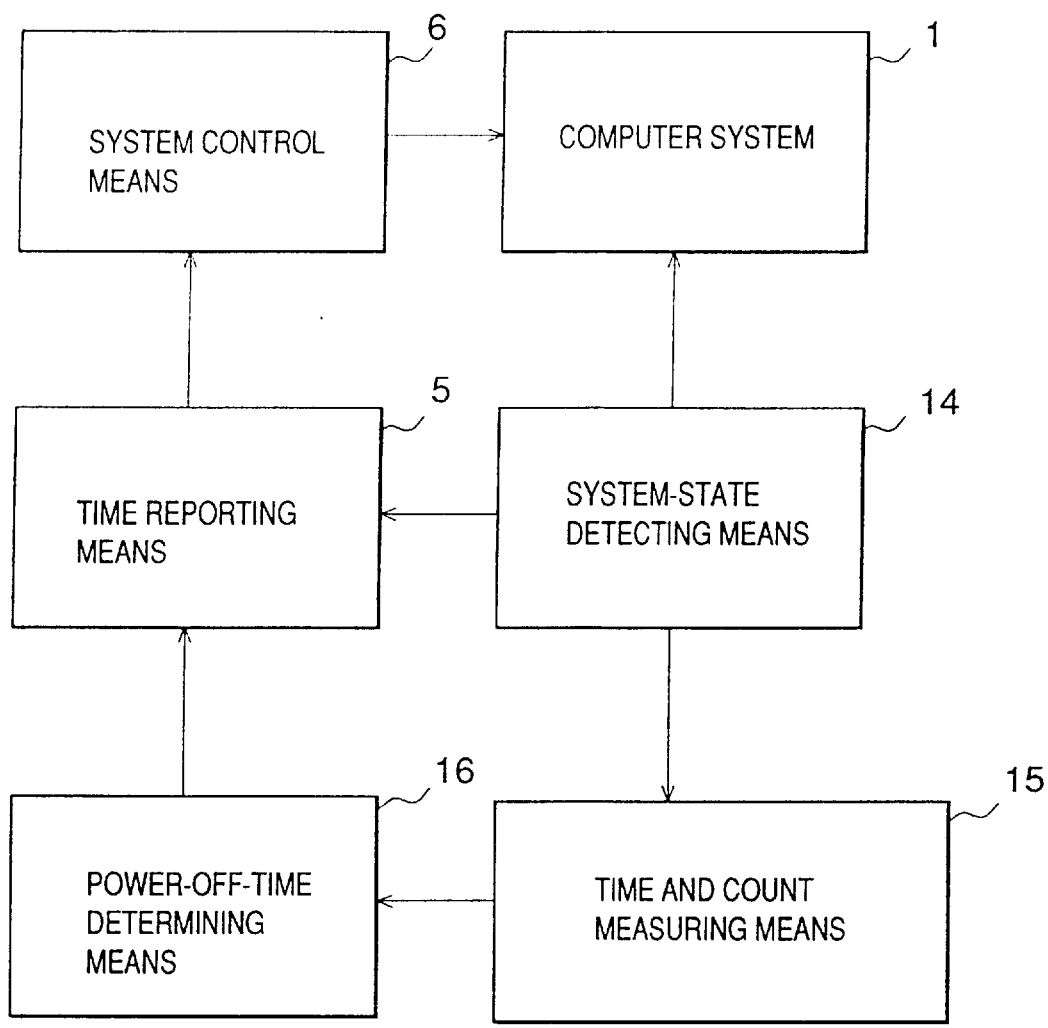
FIG. 15 is a block diagram showing the structure of a power control apparatus according to a third embodiment of the present invention.

FIG. 15 is a block diagram of a power control apparatus for controlling the power of the computer system 1, according to another embodiment of the present invention. The same symbols as those used in FIG. 1 indicate the same or corresponding portions.

In FIG. 15, a system-state detecting unit 14 detects the state of the computer system 1. At time and count measuring unit 15 is provided with a counter Coff for counting the number of times in which manual turning off occurs (Toff) and a counter Cauto for counting the number of times in which automatic turning off occurs (Tauto). Time and count measuring unit 15 calculates the time period in which the system state is held, according to the time when it receives a computer-system-state-change report from the system-state detecting unit 14, and measures the number of times the system state changes. And power-off-time determining unit 16 determines the time period until the time when the power is turned off while the computer system 1 is not used, according to the number of times in which the system state changes obtained from the time and count measuring unit 15. Tauto is the same as that shown in FIG. 2 and Toff is the same as that shown in FIG. 3.

In this embodiment, since the frequent power off increases the inconvenience of having to turn on the power, the automatic power off time is determined in the third embodiment by specifying the ratio of the number of times the user turns the power off to the number of times the power is automatically turned off, with the tradeoff between power saving and inconvenience of having to turn the power on.

The ratio may be determined by the user or it may be automatically determined.

Operations in the third embodiment will be described below in detail.

Figure 16:
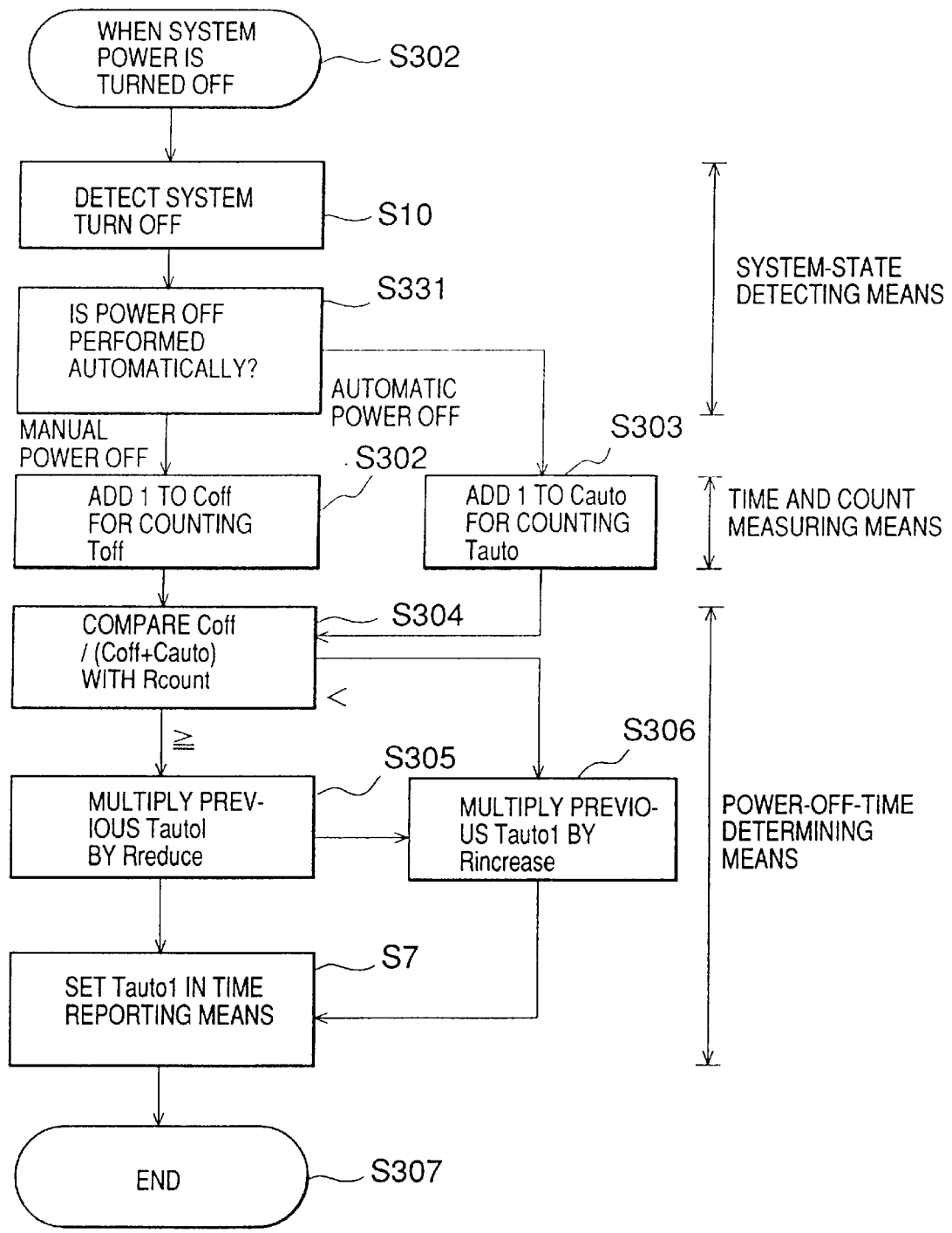
FIG. 16 is a flowchart showing operations of the power control device according to the third embodiment of the present invention.

FIG. 16 is a flowchart showing the processing in a case when the computer system 1 is changed from "on" to "off" (s301). In step s10 in FIG. 16, the same processing as in step s10 in FIG. 7 is performed. The system-state detecting unit 14 reports to the time and count measuring unit 15 the time when the computer system 1 is turned off and the identification information for identifying whether the power is automatically turned off by the system control unit 6 or the power is manually turned off by the user (s331).

When the time and count measuring unit 15 receives a manual-power-off report from the system-state detecting unit 14, it increments a counter Coff, which counts the number of times in which manual-power-off (Toff) occurs (s302). When it receives an automatic-power-off report, it increments a counter Cauto, which counts the number of times automatic-power-off (Tauto) occurs (s303).

The power-off-time determining unit 16 calculates Coff/(Coff+Cauto) and compares its result with a certain value, hereinafter called Rcount, which is a value between 0 and 1 (s304). When Coff/(Coff+Cauto) is equal to or more than Rcount, Tauto1 calculated last time is multiplied by a positive value less than 1, hereinafter called Rreduce, to make it smaller (s305). When Coff/(Coff+Cauto) is less than Rcount, Tauto1 calculated the last time is multiplied by a positive value of more than 1, hereinafter called Rincrease, to make it larger (s306). In any cases, the same processing as in step s7 in FIG. 6 is then performed, and the processing is terminated (s307). Operations in a case when the system changes its state from processing to idling (s14) is the same as those shown in FIG. 8 and operations in a case when the system changes its state from idling to processing (s19) is the same as those shown in FIG. 9. Further, operations in a case when the idling time is equal to or more than Tauto (s24) is the same as those shown in FIG. 10.

Rcount, Rreduce, and Rincrease may be determined by the user or they may be automatically determined.

According to this embodiment, the ratio of the number of manual-power-off times to the number of automatic-power-off times can be easily determined. With this ratio being set appropriately, power consumption is reduced according to the use conditions of the user to allow the computer system to be used for a long period.

Fourth Embodiment

Figure 17:
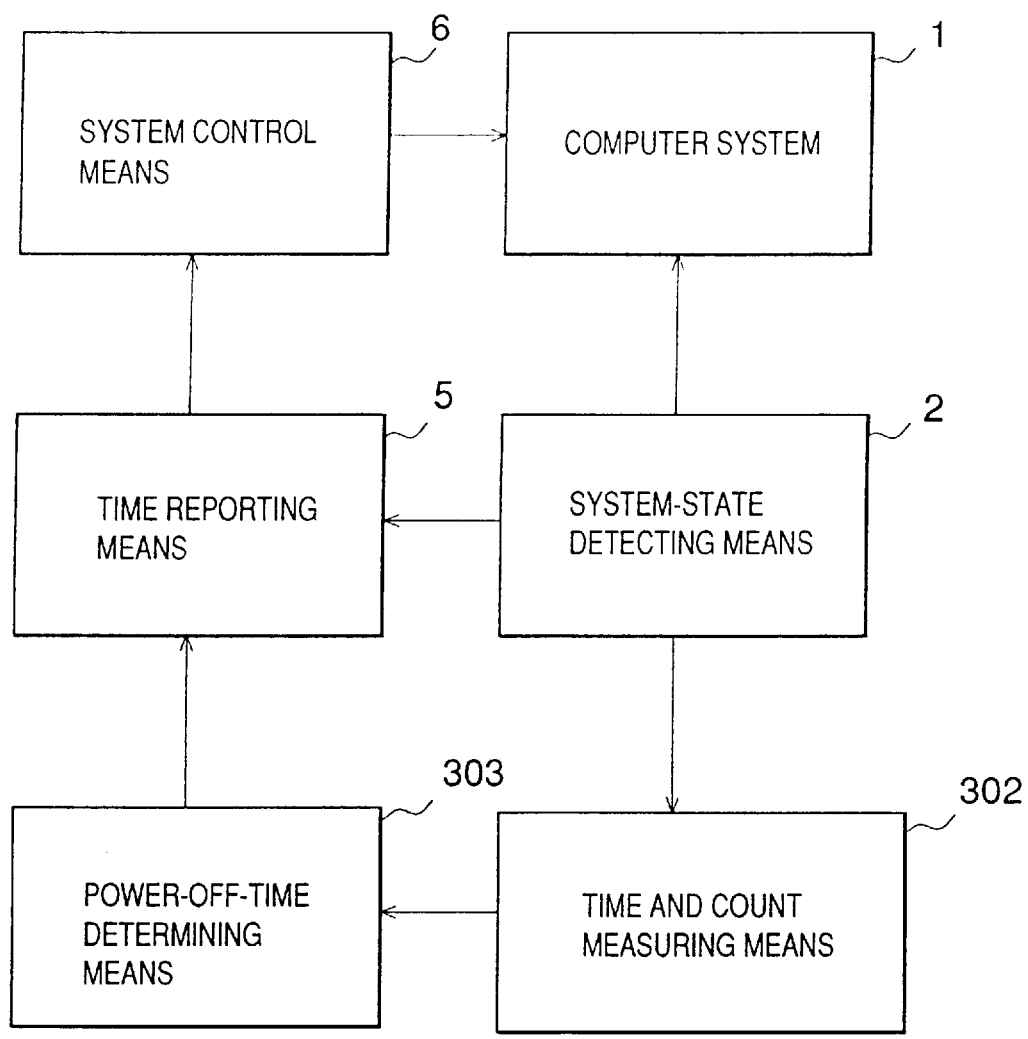
FIG. 17 is a block diagram showing the structure of a power control device according to a fourth embodiment of the present invention.

FIG. 17 is a block diagram of a power control apparatus for controlling the power of the computer system 1, according to another embodiment of the present invention.

In FIG. 17, a system-state detecting unit 2 detects the state of the computer system, and a time and count measuring unit 302 calculates the time period in which the computer system remains in a state from the time when it receives a system-state-change report from the system-state detecting unit 2 and measures the number of changes in the state of the system. Power-off-time determining unit 303 determines the time period until the time when the power is turned off while the computer system 1 is not used, according to the number of changes in the state of the system obtained from the time and count measuring unit 302. Tauto, Tcont, Tdown, and Twait are the same as those shown in FIG. 2.

Figure 18:
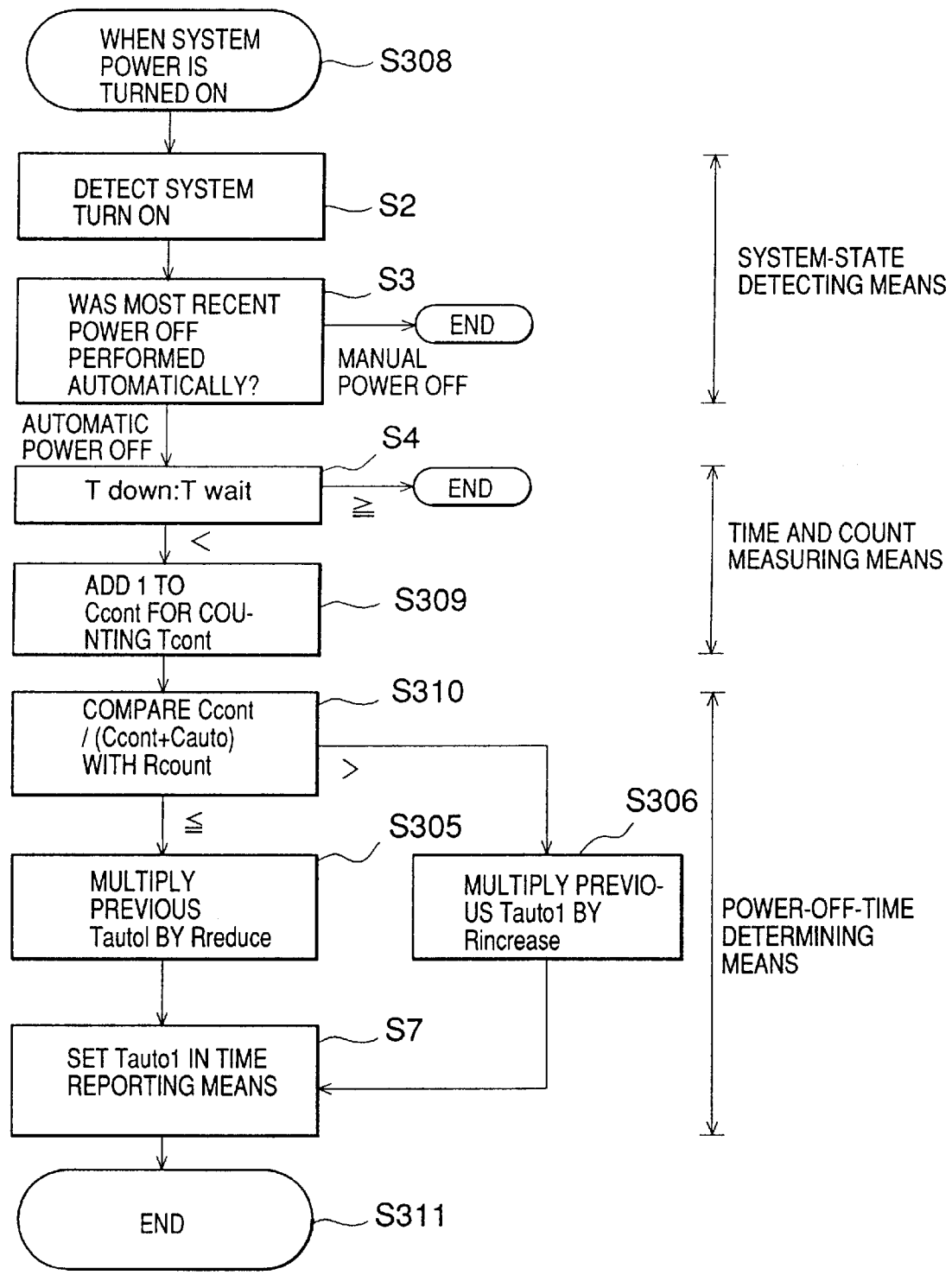
FIG. 18 and FIG. 19 are flowcharts showing operations of the power control device according to the fourth embodiment of the present invention.

Operations will be described next referring to FIG. 18 and FIG. 19. FIG. 18 is a flowchart showing the processing in a case when the computer system 1 is changed from "off" to "on" (s308). In FIG. 18, the same processing as that in steps s2 and s3 in FIG. 6 is performed. The time and count measuring unit 302 performs the same processing as s4 shown in FIG. 6. When Tdown is smaller than Twait, the counter Ccont, which counts the number of times the user turns on the power (Tcont), is incremented (s309).

The power-off-time determining unit 303 calculates Ccont/(Ccont+Cauto) and compares the result with a certain value, hereinafter called Rcount, which is a value between 0 and 1 (s310). When Ccnt/(Ccont+Cauto) is equal to or less than Rcount, the same processing as that shown in step s305 in FIG. 16 is performed. When Coff/(Coff+Cauto) is more than Rcount, the same processing as that shown in step s306 in FIG. 16 is performed. In any cases, the same processing as that shown in step s7 in FIG. 6 is then performed, and the processing is terminated (s311).

Figure 19:
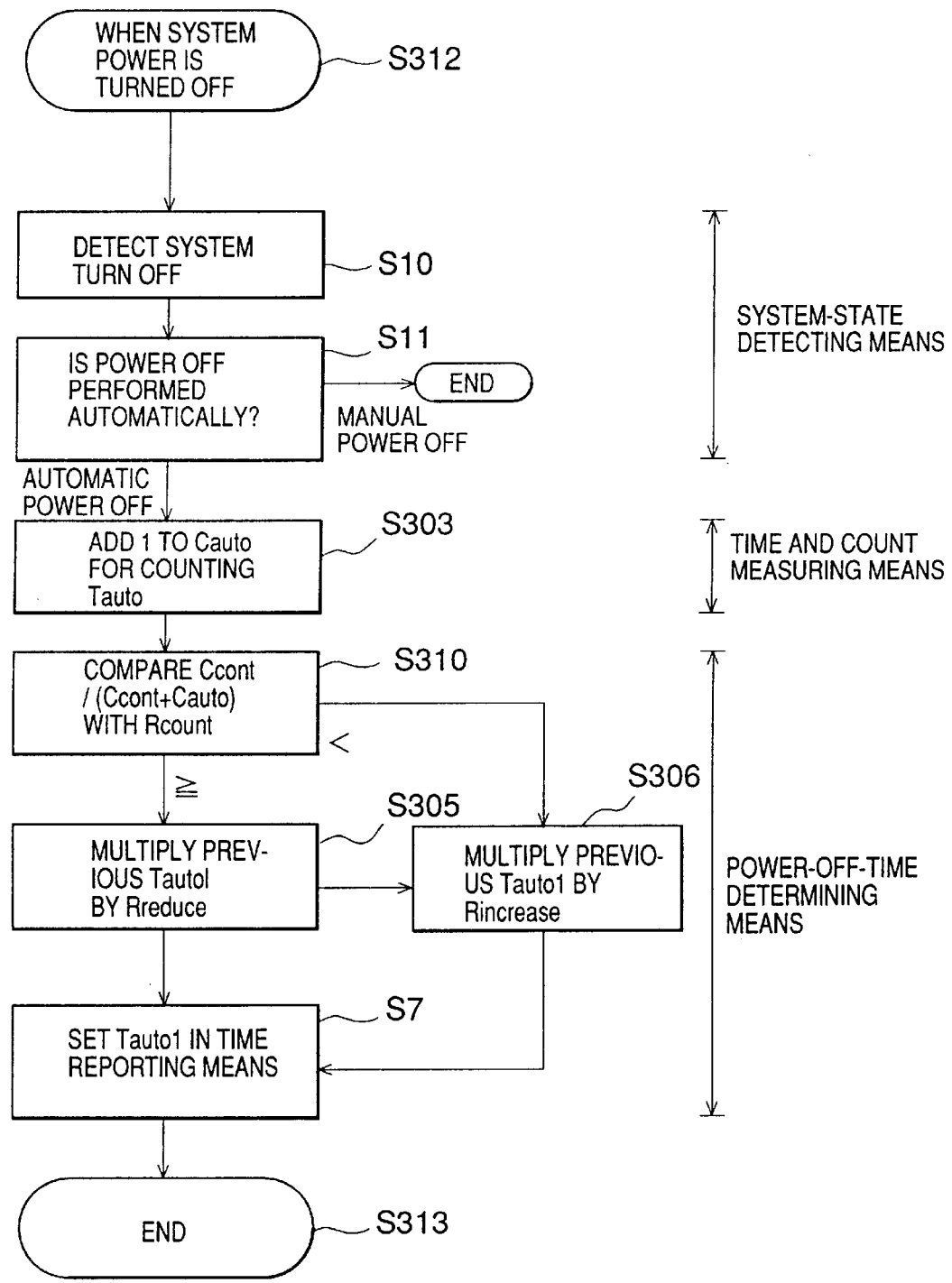

FIG. 19 is a flowchart showing the processing in a case when the computer system 1 is changed from "on" to "off" (s312).

The same processing as that shown in steps s10 and s11 in FIG. 7 is performed.

The time and count measuring unit 302 performs the same processing as that shown in step s303 in FIG. 16 when the power is automatically turned off.

The same processing as that shown in step s310 in FIG. 18, as that shown in steps s305 and s306 in FIG. 16, and as that shown in step s7 in FIG. 6 is performed and the processing is terminated (s313).

Operations in a case in which the system changes its state from processing to idling (s14) are the same as those in FIG. 8. Operations in a case in which the system changes its state from idling to processing (s19) are the same as those in FIG. 9. Operations in a case in which the idling time period is equal to or exceeds Tauto (s24) are the same as those in FIG. 10.

According to this embodiment, the ratio of the number of automatic-power-off times to the number of times the user turns the power on after the power was turned off can be easily determined. With this ratio being set appropriately, power consumption is reduced according to the use conditions of the user to allow the computer system to be used for a long period.

Fifth Embodiment

Figure 20:
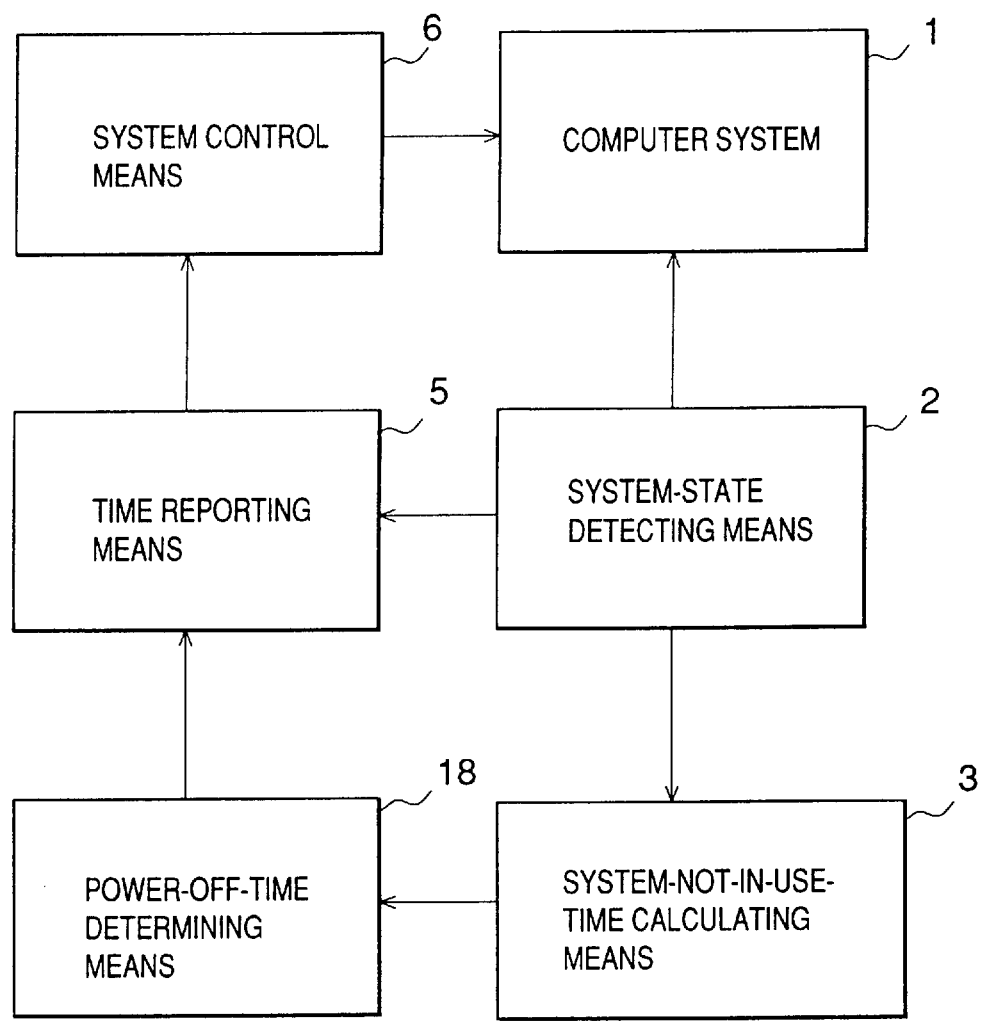
FIG. 20 is a block diagram showing the structure of a power control device according to a fifth embodiment of the present invention.

FIG. 20 is a block diagram of a power control apparatus for controlling the power of the computer system 1, according to another embodiment of the present invention. The same symbols as those used in FIG. 1 indicate the same or corresponding portions.

In FIG. 20, a power-off-time determining unit 18 determines the time for turning the power off while the computer system 1 is not used, according to the statistics of the system-not-in-use time obtained by the system-not-in-use time calculating unit 3. Operations will be described next referring to FIG. 21 and FIG. 22.

In this embodiment, the automatic-power-off time Tauto determined in the first embodiment is restricted by specifying the upper and lower limits in order to prevent the system from being controlled with an exceptional automatic-power-off time.

Figure 21:
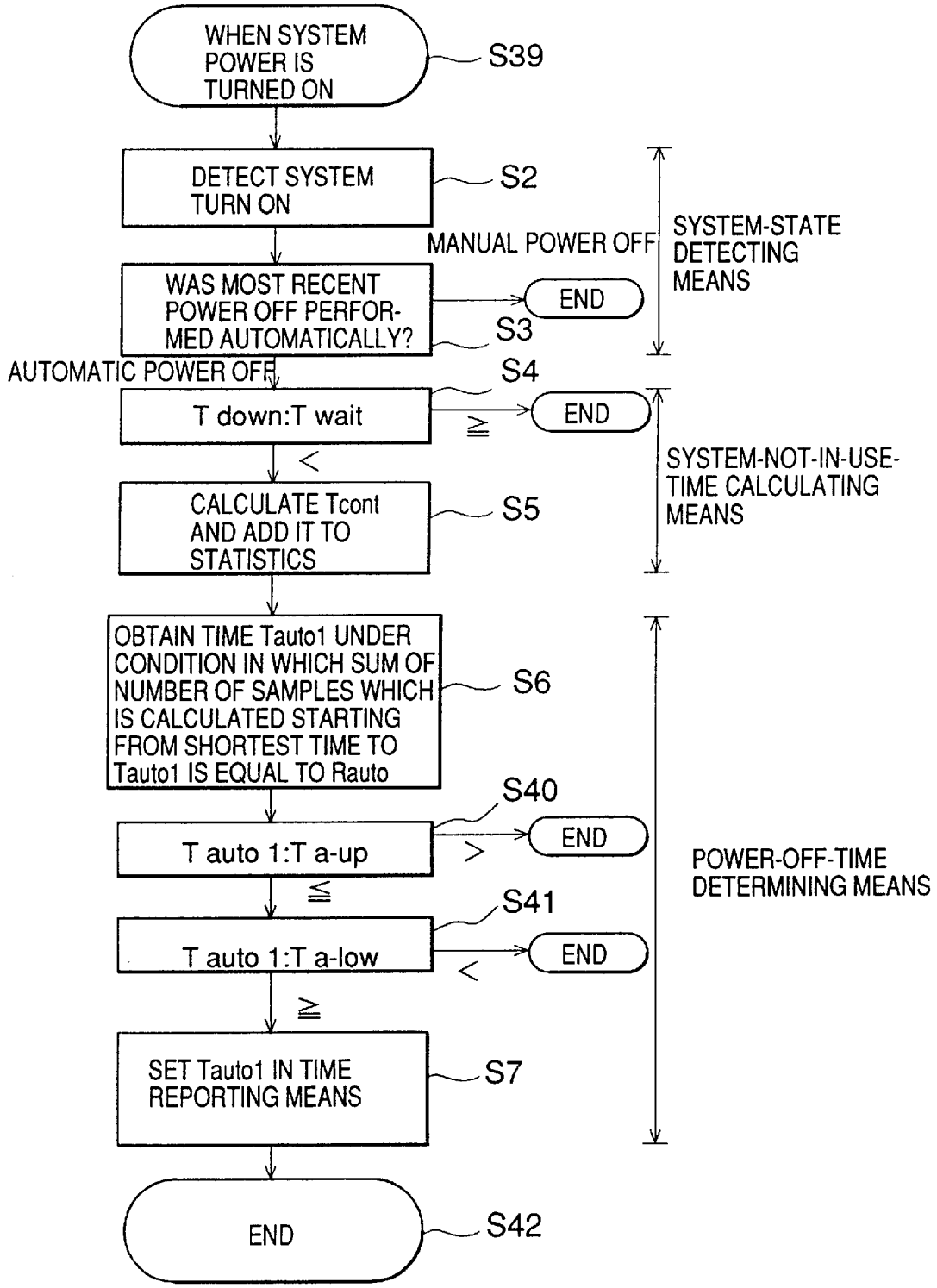
FIG. 21 and FIG. 22 are flowcharts showing operations of the power control device according to the fifth embodiment of the present invention.

FIG. 21 is a flowchart showing the processing in a case when the computer system 1 is changed from "off" to "on" (s39).

The same processing as that shown in steps s2 to s5 in FIG. 6 is performed.

The power-off-time determining unit 18 performs the same processing as that shown in step s6 in FIG. 6. The obtained Tauto1 is compared with the upper limit Ta-up of Tauto. When Tauto1 is larger than Ta-up, the processing is terminated (s40). The obtained Tauto1 is compared with the lower limit Ta-low of Tauto next. When Tauto1 is smaller than Ta-low, the processing is terminated (s41). The same processing as that shown in step s7 in FIG. 6 is performed and the processing is terminated (s42).

Figure 22:
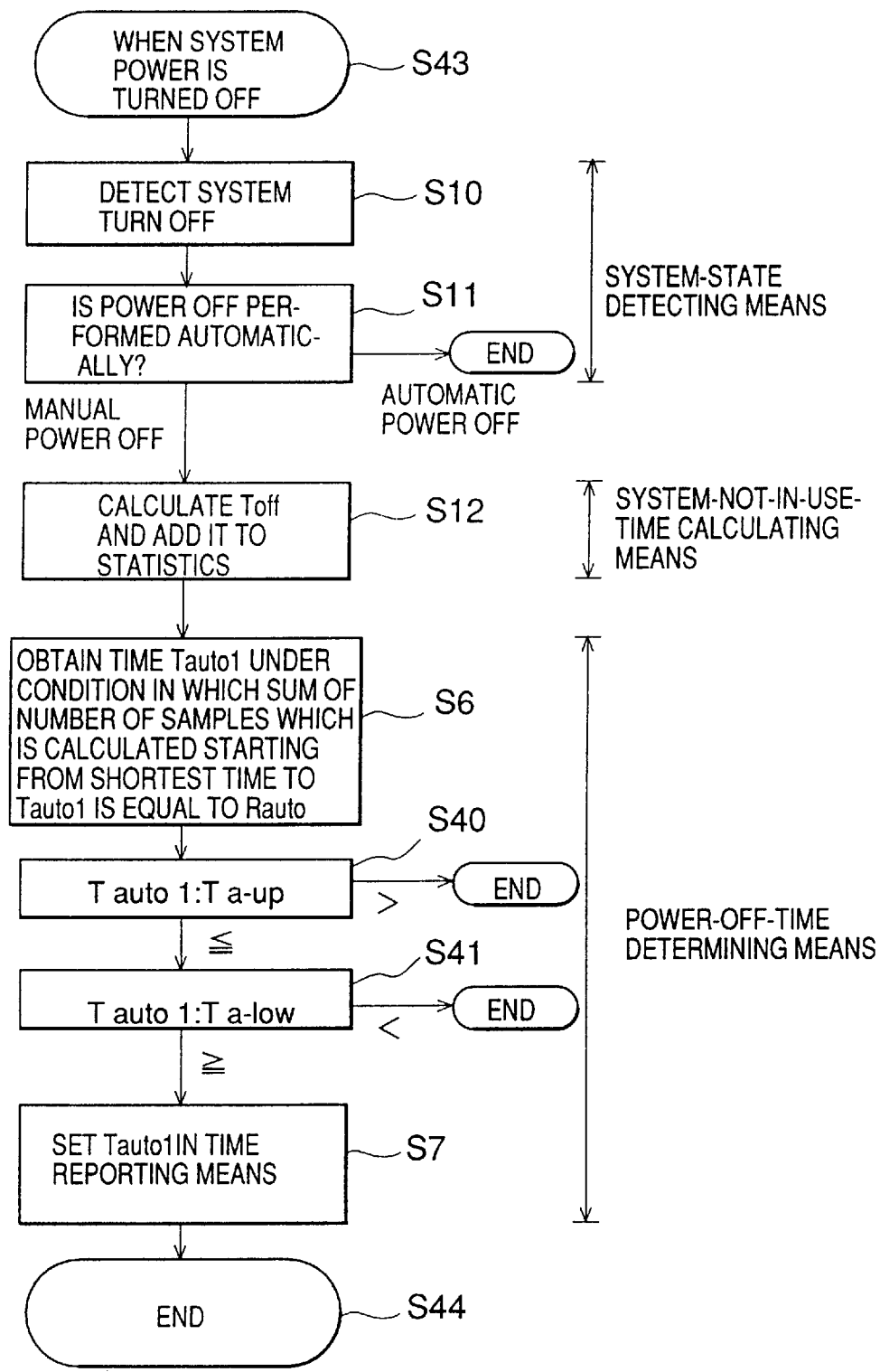

FIG. 22 is a flowchart showing the processing in a case when the computer system 1 is changed from "on" to "off" (s43).

The same processing as that shown in steps s10 to s12 in FIG. 7 is performed.

The power-off-time determining unit 18 performs the same processing as that shown in step s6 in FIG. 6. The same processing as that shown in steps s40 and s41 in FIG. 21 is performed. Then, the same processing as that shown in step s7 in FIG. 6 is performed, and the processing is terminated (s44).

Operations in a case in which the system changes its state from processing to idling (s14) are the same as those in FIG. 8, and operations in a case in which the system changes its state from idling to processing (s19) are the same as those in FIG. 9.

Further, operations in a case in which the idling time period is equal to or exceeds Tauto (s24) are the same as those in FIG. 10.

According to this embodiment, since the computer system is prevented from being controlled with an exceptional automatic-power-off time due to the upper and lower limits of the automatic-power-off time, user-friendly operations are performed by preventing the system from being stopped within a short period after the system becomes idle when the system repeats operating and stopping in a short time due to some reason. In addition, when the system is operating for an extremely long period while idling due to some reason, the system is prevented from operating for a long period while idling, preventing power from being wasted and allowing the system to be used for a long period.

Sixth Embodiment

Figure 23:
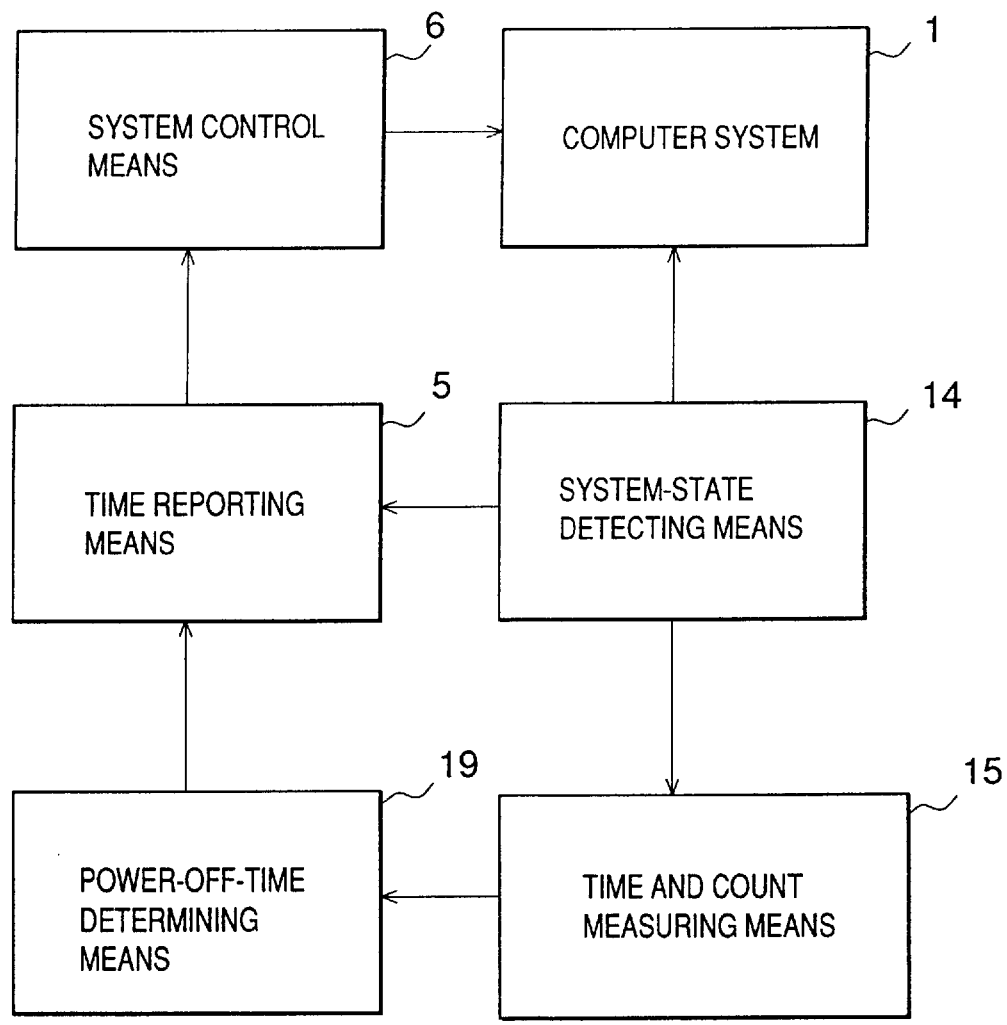
FIG. 23 is a block diagram showing the structure of a power control device according to a sixth embodiment of the present invention.

FIG. 23 is a block diagram of a power control apparatus for controlling the power of the computer system 1, according to another embodiment of the present invention. The same symbols as those used in FIG. 1 and FIG. 15 indicate the same or corresponding portions.

In FIG. 23, a power-off-time determining unit 19 determines the time period until the time when the power is turned off while the computer system 1 is not used, according to the number of times the system state changes, obtained by the time and count measuring unit 15.

In this embodiment, the automatic-power-off time Tauto determined in the third embodiment is restricted by specifying the upper and lower limits in order to prevent the system from being controlled with an exceptional automatic-power-off time.

Operations in the sixth embodiment will be described below in detail.

Figure 24:
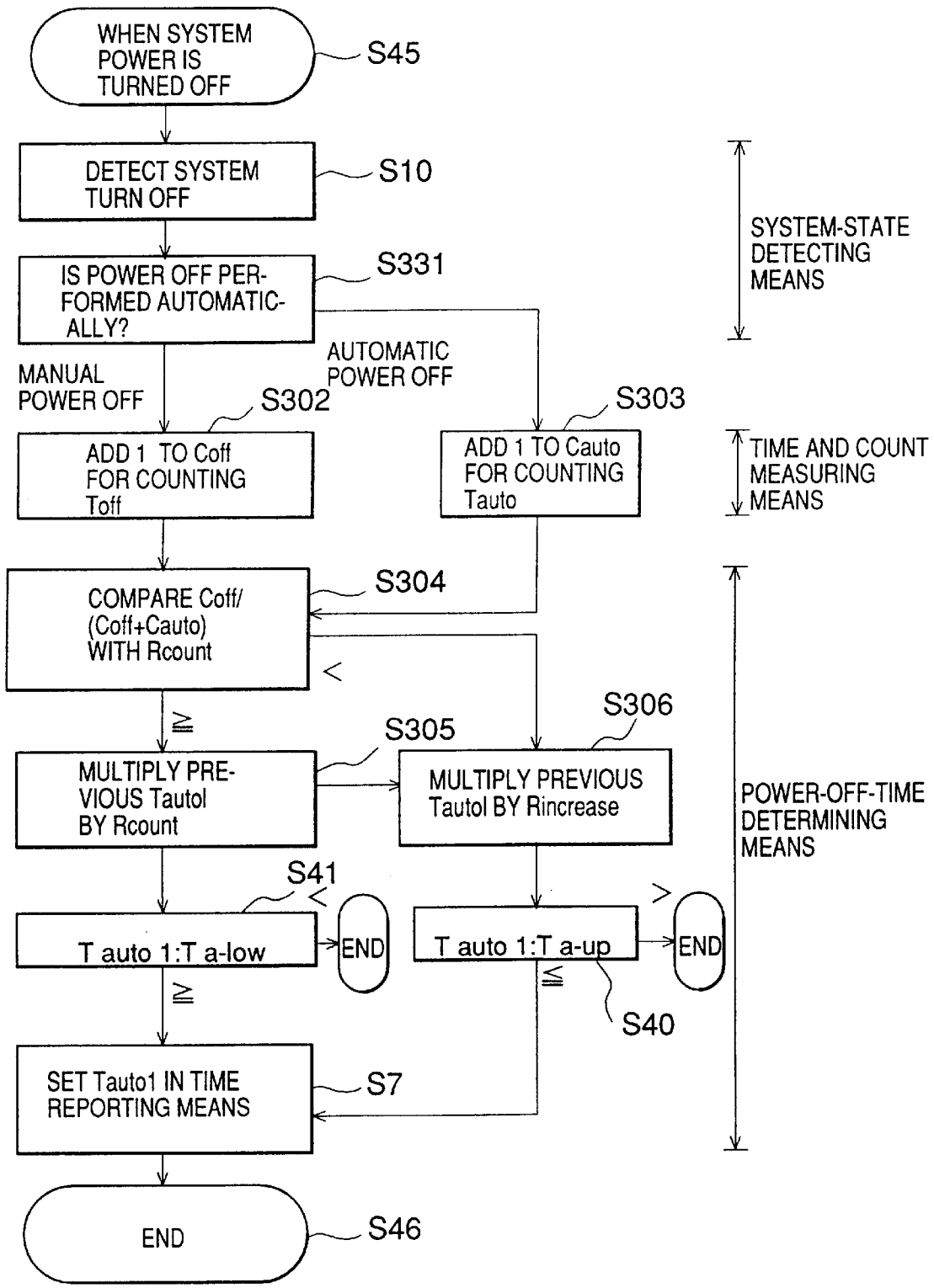
FIG. 24 is a flowchart showing operations of the power control device according to the sixth embodiment of the present invention.

FIG. 24 is a flowchart showing the processing in a case when the computer system 1 is changed from "on" to "off" (s45).

The same processing as that shown in step s10 in FIG. 7, and as that shown in steps s331, s302, and s303 in FIG. 16 is performed.

The power-off-time determining unit 19 performs the same processing as that shown in step s304 in FIG. 16. When Coff/(Coff+Cauto) is equal to or more than Rcount, the same processing as that shown in step s305 in FIG. 16 and step s41 in FIG. 21 is performed. When Coff/(Coff+Cauto) is less than Rcount, the same processing as that shown in step s306 in FIG. 16 and step s40 in FIG. 21 is performed. In any cases, the same processing as that shown in step s7 in FIG. 6 is then performed, and the processing is terminated (s46).

Operations in a case in which the system changes its state from processing to idling (s14) are the same as those in FIG. 8 and operations in a case in which the system changes its state from idling to processing (s19) are the same as those in FIG. 9.

Further, operations in a case in which the idling time period is equal to or exceeds Tauto (s24) are the same as those in FIG. 10.

According to this embodiment, since the computer system is prevented from being controlled with an exceptional automatic-power-off time due to the upper and lower limits of the automatic-power-off time Tauto, the same effects with the previous embodiment are obtained.

Seventh Embodiment

Figure 25:
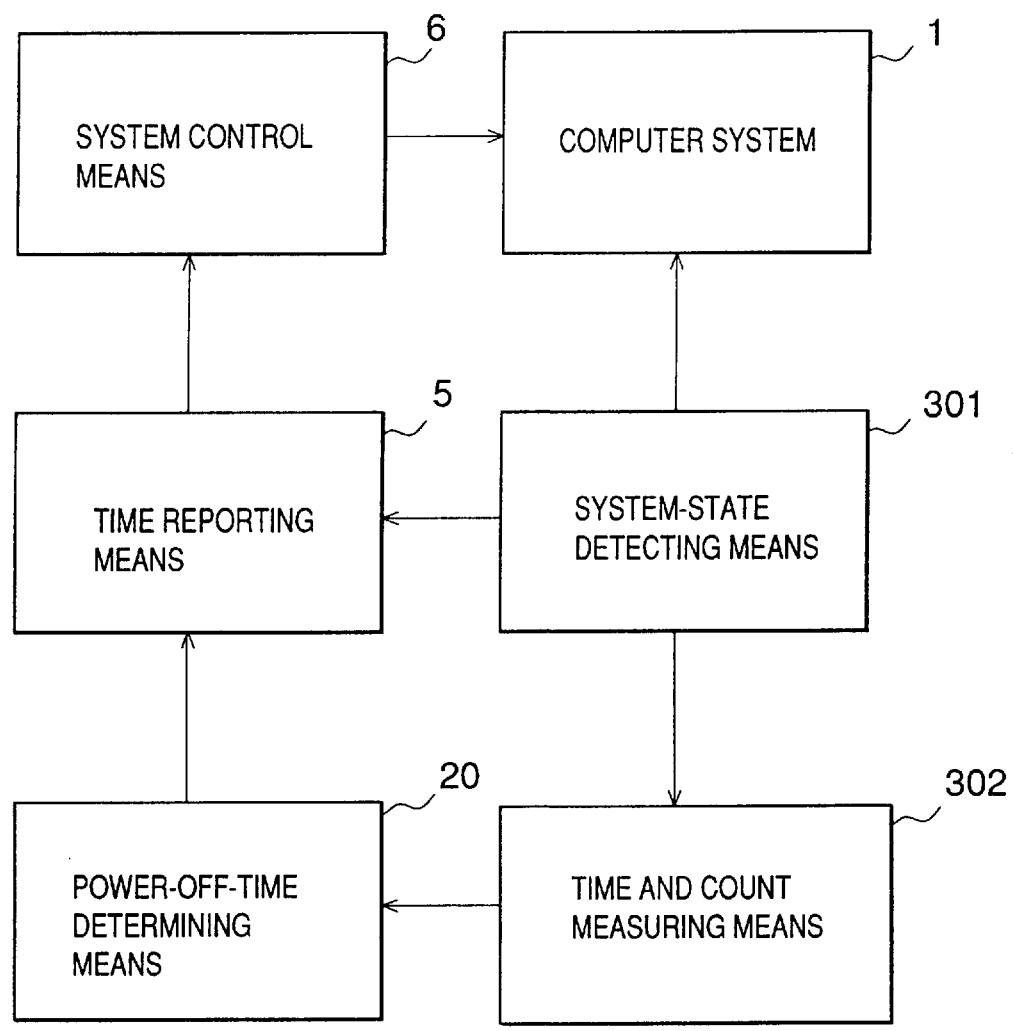
FIG. 25 is a block diagram showing the structure of a power control device according to a seventh embodiment of the present invention.

FIG. 25 is a block diagram of a power control apparatus for controlling the power of the computer system 1, according to another embodiment of the present invention.

In FIG. 25, a power-off-time determining unit 20 determines the time period until the time when the power is turned off while the computer system 1 is not used, according to the number of times the system state changes, obtained by the time and count measuring unit 302.

In this embodiment, the automatic-power-off time determined in the fourth embodiment is restricted by specifying the upper and lower limits in order to prevent the system from being controlled with an exceptional automatic-power-off time.

Operations in the seventh embodiment will be described below in detail referring to FIG. 26 and FIG. 27.

Figure 26:
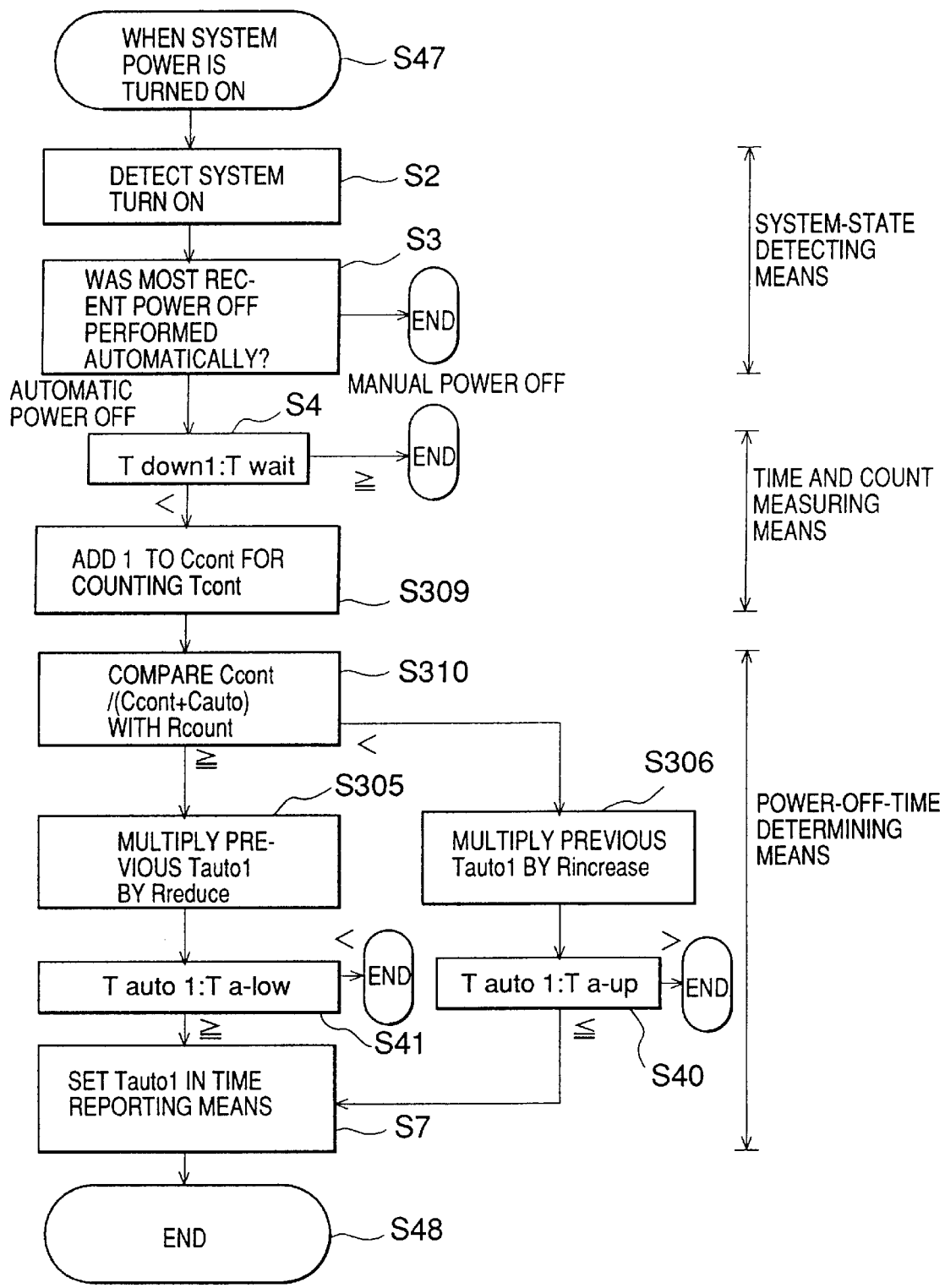
FIG. 26 and FIG. 27 are flowcharts showing operations of the power control apparatus according to the seventh embodiment of the present invention.

FIG. 26 is a flowchart showing the processing in a case when the computer system 1 is changed from "off" to "on" (s47). In FIG. 26, the same processing as that shown in steps s2 and s3 in FIG. 6 is performed, and the same processing as that shown in steps s4 in FIG. 6 and s309 in FIG. 18 is performed.

The power-off-time determining unit 20 performs the same processing as that shown in step s310 in FIG. 18. When Ccont/(Ccont+Cauto) is equal to or more than Rcount, the same processing as that shown in step s305 in FIG. 16 and step s41 in FIG. 21 is performed. When Ccont/(Ccont+Cauto) is less than Rcount, the same processing as that shown in step s306 in FIG. 16 and step s40 in FIG. 21 is performed. In any cases, the same processing as that shown in step s7 in FIG. 6 is then performed, and the processing is terminated (s48).

Figure 27:
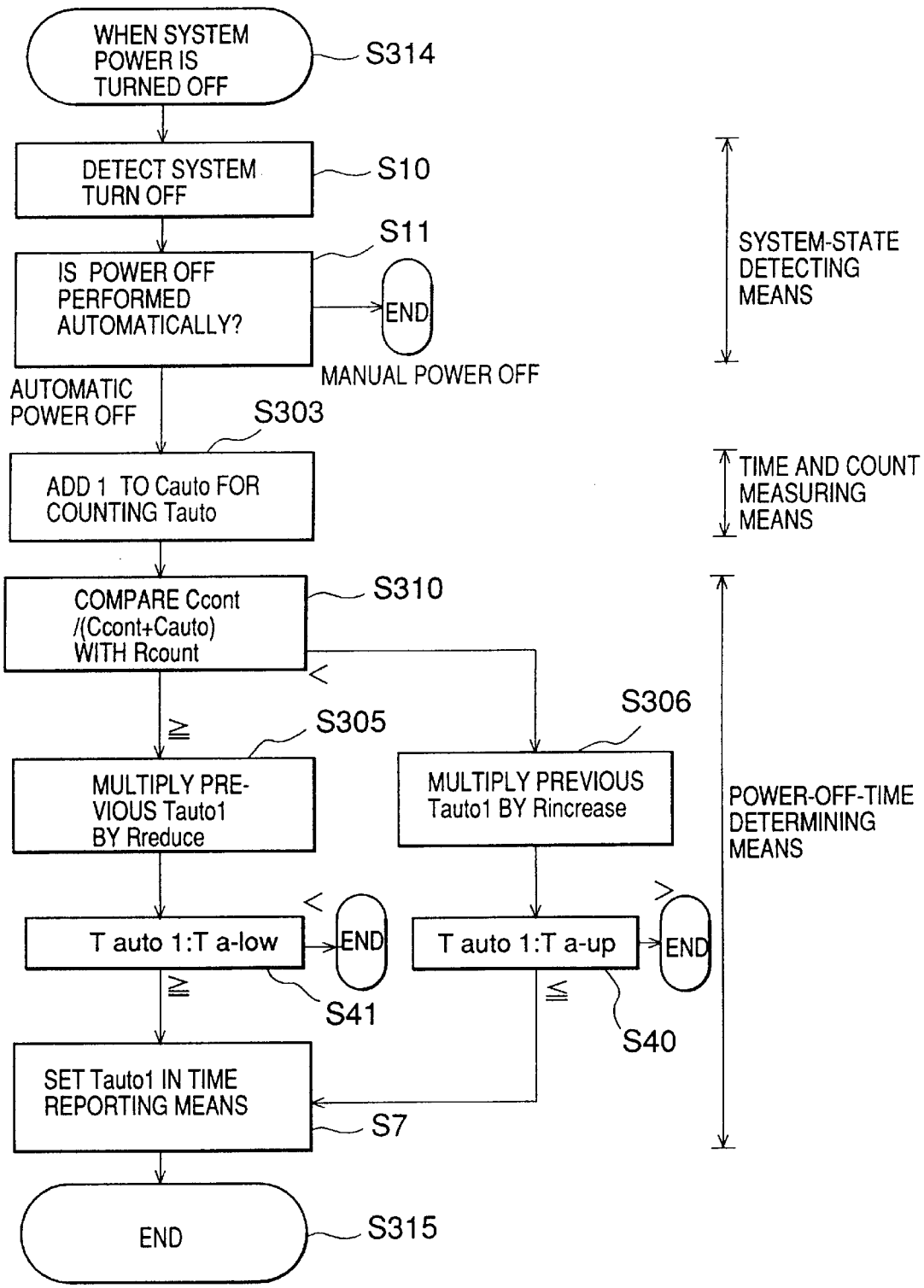

FIG. 27 is a flowchart showing the processing in a case when the computer system 1 is changed from "on" to "off" (s314).

The same processing as that shown in steps s10 and s11 in FIG. 7 is performed, and the same processing as that shown in step s303 in FIG. 16 is performed.

The power-off-time determining unit 20 performs the same processing as that shown in step s310 in FIG. 18. When Ccont/(Ccont+Cauto) is equal to or more than Rcount, the same processing as that shown in step s305 in FIG. 16 and step s41 in FIG. 21 is performed. When Ccont/(Ccont+Cauto) is less than Rcount, the same processing as that shown in step s306 in FIG. 16 and step s40 in FIG. 21 is performed. In any cases, the same processing as that shown in step s7 in FIG. 6 is then performed, and the processing is terminated (s315).

Operations in a cases in which the system changes its state from processing to idling (s14), the system changes its state from idling to processing (s19) and the idling time period is equal to or exceeds Tauto (s24) are the same as those in FIG. 8, FIG. 9 and FIG. 10.

Eighth Embodiment

Figure 28:
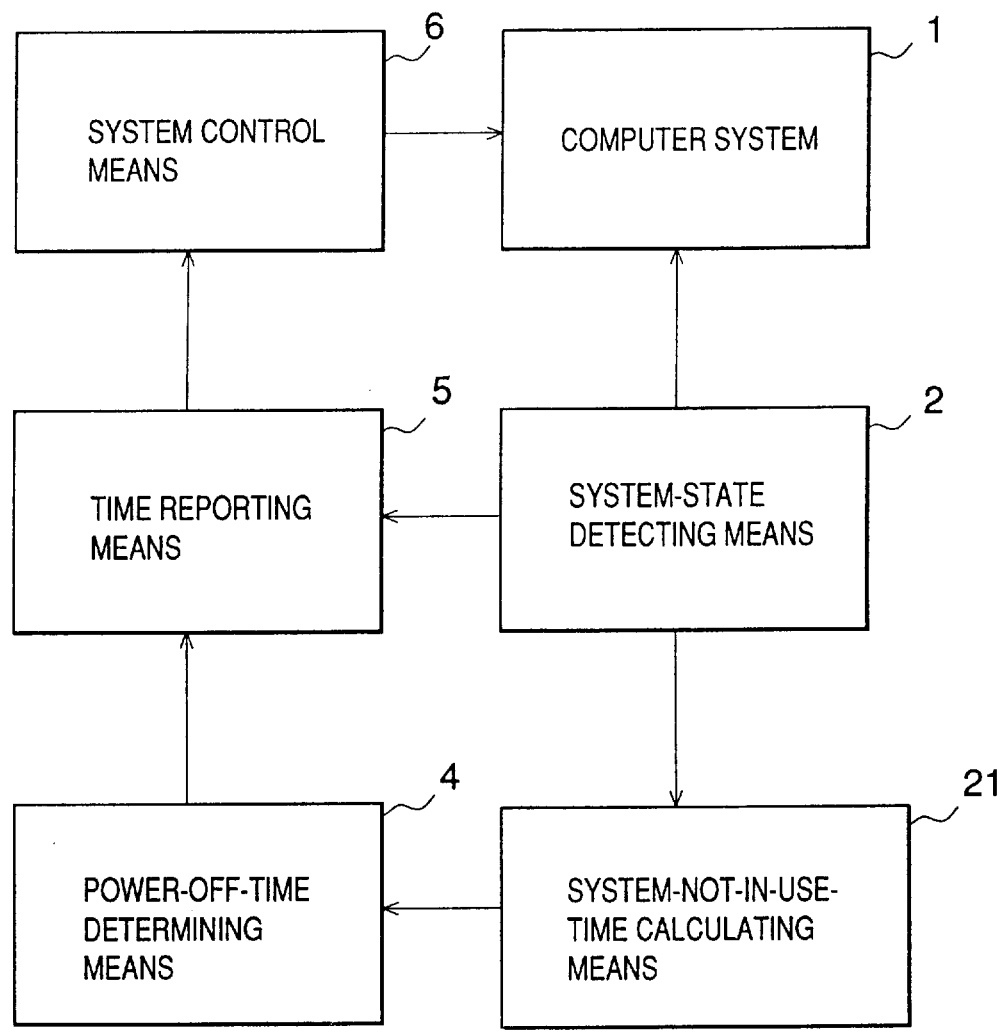
FIG. 28 is a block diagram showing the structure of a power control device according to an eighth embodiment of the present invention.

FIG. 28 is a block diagram of a power control apparatus for controlling the power of the computer system 1, according to another embodiment of the present invention.

In FIG. 28, a system-not-in-use-time calculating unit 21 calculates the time period when the system is not in use, from the time when the system-state detecting unit 2 reports a system-state change, and obtains the statistics of the time period.

In this embodiment, the time period used as a sample in the statistics in the first embodiment is restricted by specifying the upper and lower limits in order to prevent the system from being controlled with an exceptional automatic-power-off time.

Operations in the eighth embodiment will be described below in detail referring to FIG. 29 and FIG. 30.

Figure 29:
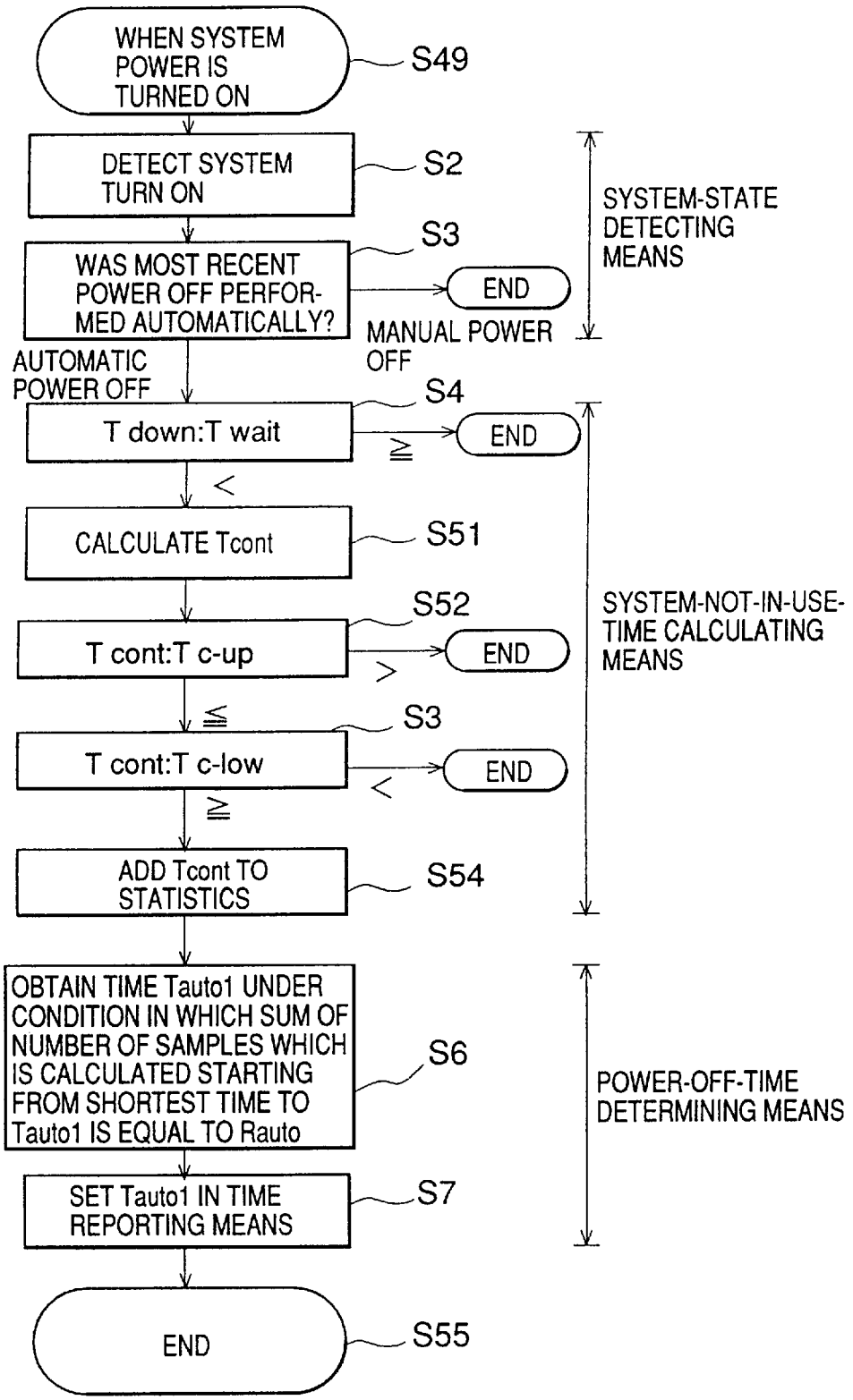
FIG. 29 and FIG. 30 are flowcharts showing operations of the power control device according to the eighth embodiment of the present invention.

FIG. 29 is a flowchart showing the processing in a case when the computer system 1 is changed from "off" to "on" (s49).

The same processing as that shown in steps s2 and s3 in FIG. 6 is performed.

The system-not-in-use-time calculating unit 21 performs the same processing as that shown in step s4 in FIG. 6 and calculates Tcont (s51). The obtained Tcont is compared with the upper limit Tc-up of Tcont. When the obtained Tcont is larger than Tc-up, the processing is terminated (s52). Then, the obtained Tcont is compared with the lower limit Tc-low of Tcont. When the obtained Tcont is smaller than Tc-low, the processing is terminated (s53). The obtained Tcont is added to the statistics 8 (s54). The same processing as that shown in steps s6 and s7 in FIG. 6 is performed and the processing is terminated (s55).

Figure 30:
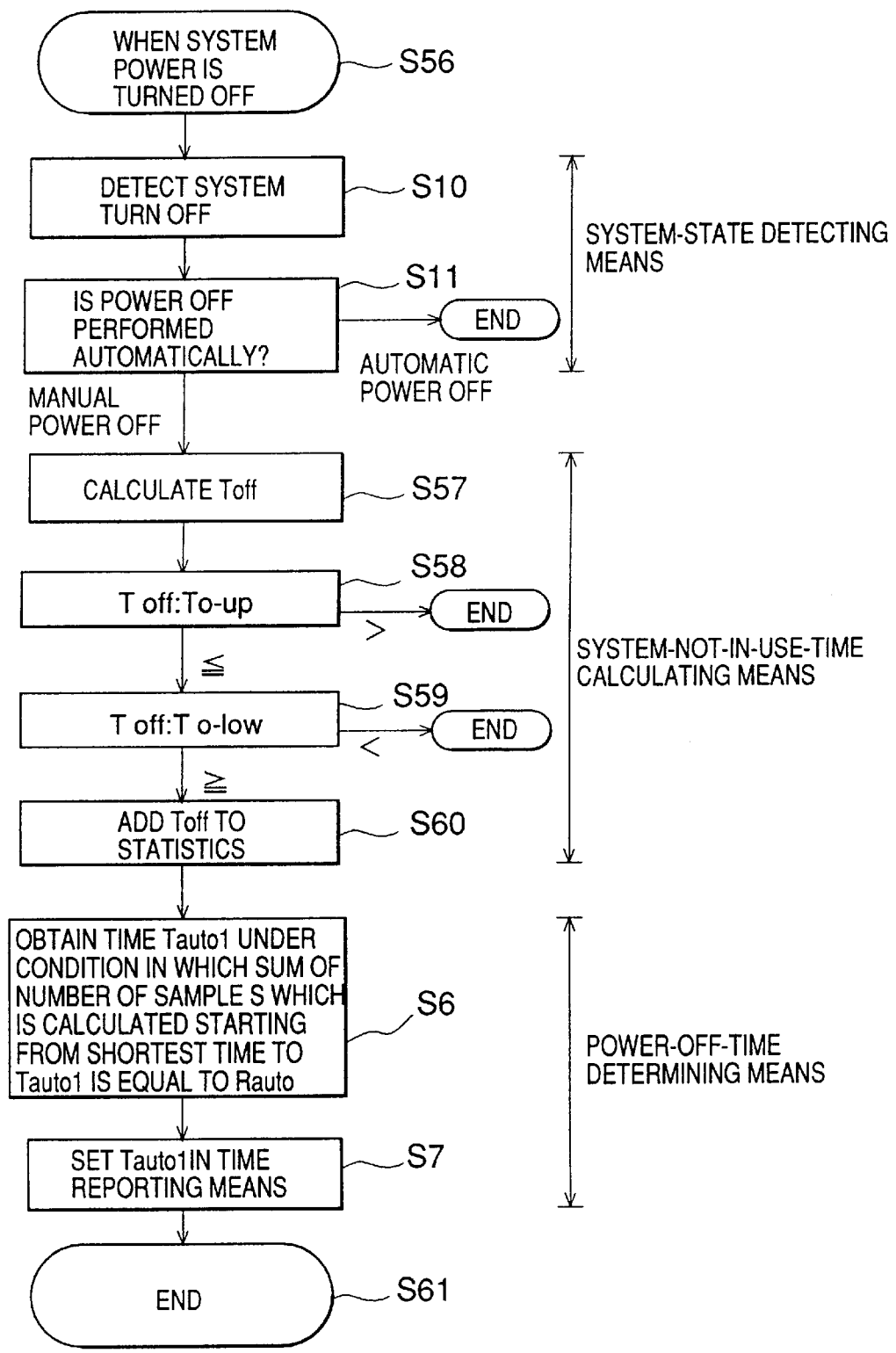

FIG. 30 is a flowchart showing the processing in a case when the computer system 1 is changed from "on" to "off" (s56). The same processing as that shown in steps s10 and s11 in FIG. 7 is performed.

The system-not-in-use-time calculating unit 21 calculates Toff (s57). The obtained Toff is compared with the upper limit To-up of Toff. When the obtained Toff is larger than To-up, the processing is terminated (s58). The obtained Toff is compared with the lower limit To-low of Toff. When the obtained Toff is smaller than To-low, the processing is terminated (s59). The obtained Toff is added to the statistics 7 (s60).

The power-off-time determining unit 4 performs the same processing as that shown in steps s6 and s7 in FIG. 6 and the processing is terminated (s61).

Operations in FIG. 8 to FIG. 10 are also applied to this embodiment.

According to this embodiment, the same effects with the previous embodiments are performed. There is also another advantage that the automatic-power-off time can be set highly precisely.

Ninth Embodiment

Figure 31:
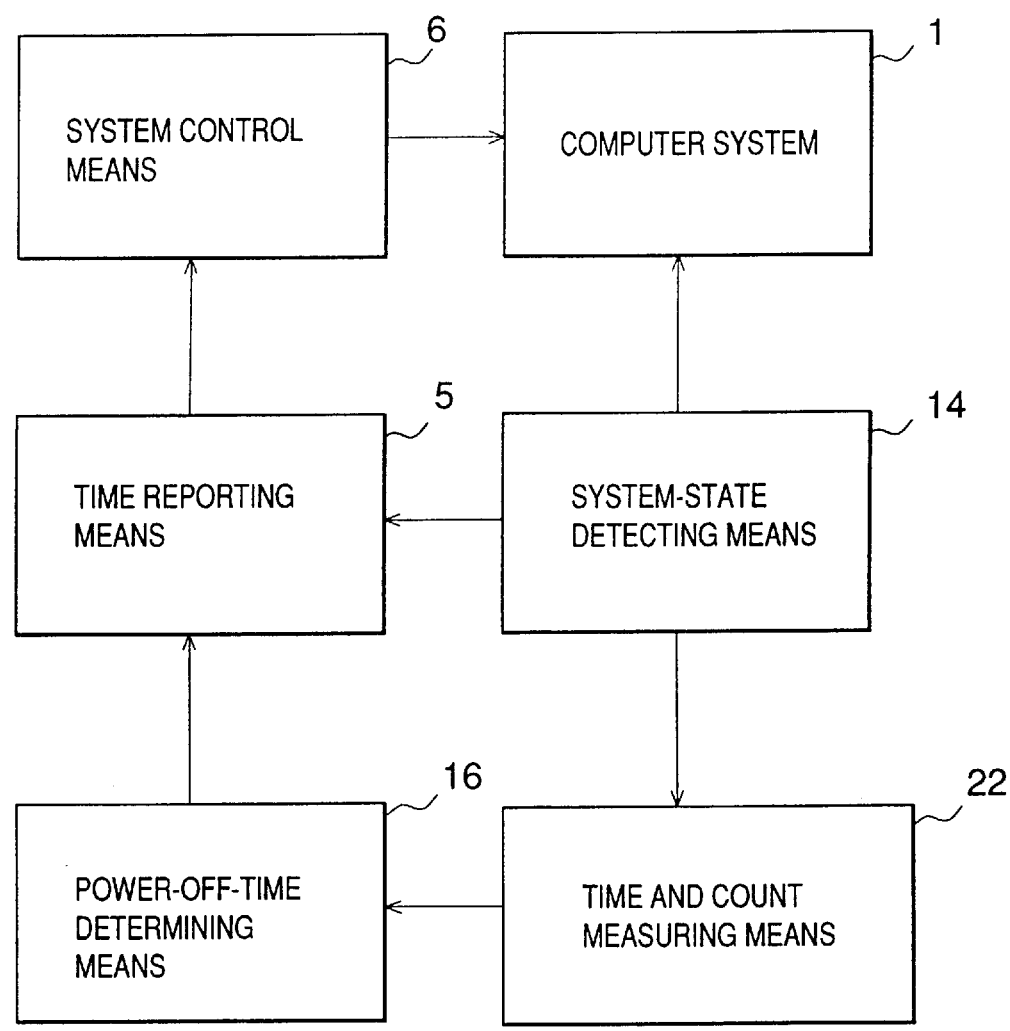
FIG. 31 is a block diagram showing the structure of a power control device according to a ninth embodiment of the present invention.

FIG. 31 shows another embodiment of the present invention. The same symbols as those used in FIG. 1 and FIG. 15 indicate the same or corresponding portions.

In FIG. 31, the time and count measuring unit 22 calculates the time period when the system is in a state, from the time when the system-state detecting unit 14 reports a system-state change, and measures the number of times the system state changes.

In this embodiment, the manual-power-off time determined in the third embodiment is restricted by specifying the lower limit in order to prevent the system from being controlled with an exceptional automatic-power-off time.

Operations in the ninth embodiment will be described below referring to FIG. 32.

Figure 32:
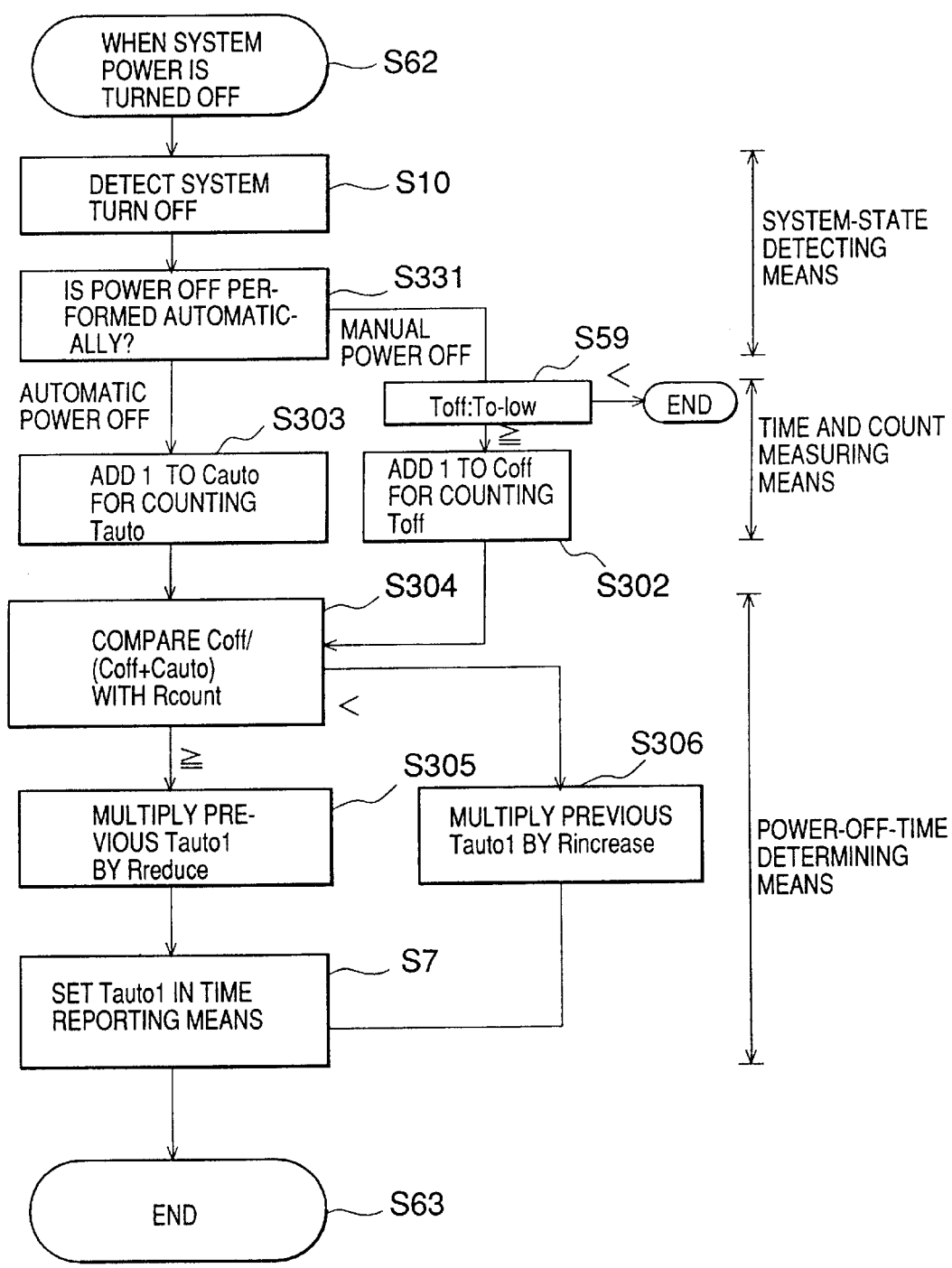
FIG. 32 is a flowchart showing operations of the power control device according to the ninth embodiment of the present invention.

FIG. 32 is a flowchart showing the processing in a case when the computer system 1 is changed from "on" to "off" (s62).

The same processing as that shown in steps s10 in FIG. 7 and s331 in FIG. 16 is performed. The time and count measuring unit 22 performs the same processing as that shown in step s303 in FIG. 16 when the power is automatically turned off. It performs the same processing as that shown in steps 59 in FIG. 30 and s302 in FIG. 16 when the power is manually turned off.

In any case, the same processing as that shown in steps s304 and s305 in FIG. 16, or as that shown in step s306 in FIG. 16 is performed. Then the same processing as that shown in step s7 in FIG. 6 is performed and the processing is terminated (s63).

Operations in FIG. 8 to FIG. 10 are also applied to this embodiment.

According to this embodiment, the same effects with the previous embodiments are performed.

Tenth Embodiment

Figure 33:
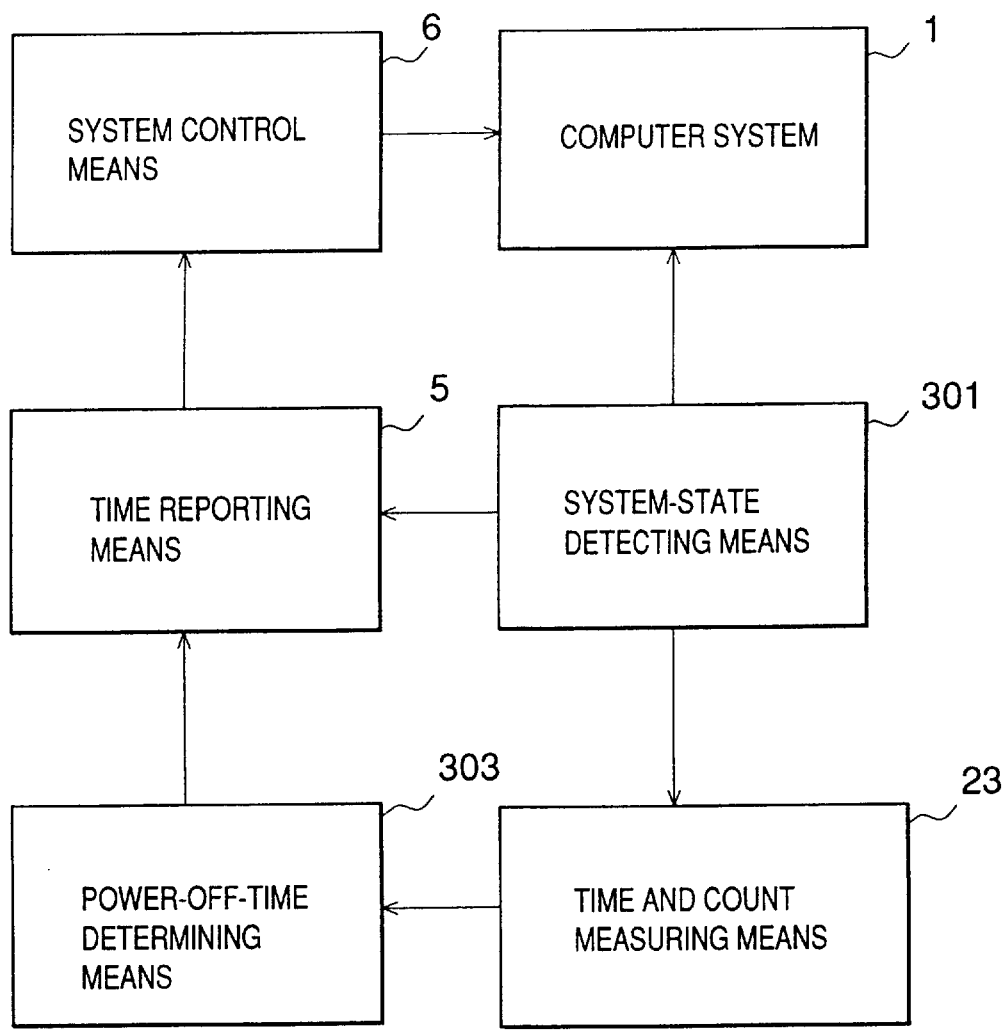
FIG. 33 is a block diagram showing the structure of a power control device according to a tenth embodiment of the present invention.

FIG. 33 shows another embodiment of the present invention. The same symbols as those used in FIG. 1 and FIG. 7 indicate the same or corresponding portions.

In FIG. 33, the time and count measuring unit 23 calculates the time period when the system remains in a state, from the time when the system-state detecting unit 301 reports a system-state change, and measures the number of times the system changes.

In this embodiment, the time period used as a sample in the statistics of the number of times the system changes its state in the fourth embodiment is restricted by specifying the lower limit in order to prevent the system from being controlled with an exceptional automatic-power-off time.

Figure 34:
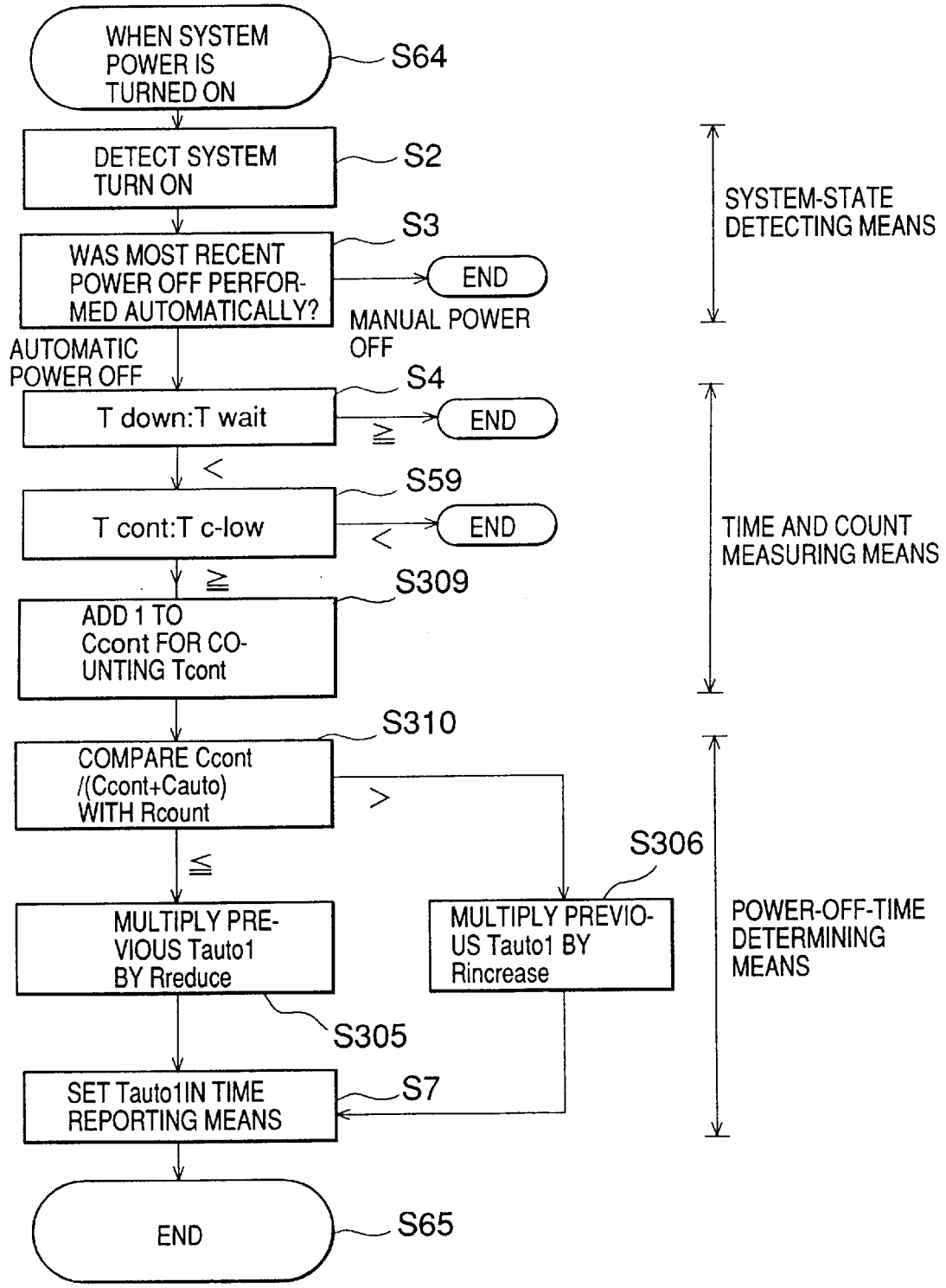
FIG. 34 is a flowchart showing operations of the power control device according to the tenth embodiment of the present invention.

FIG. 34 is a flowchart showing the processing in a case when the computer system 1 is turned on. The same processing as that shown in steps s2 and s3 in FIG. 6 is performed. The same processing as that shown in steps s4 in FIG. 6, s59 in FIG. 30, and s309 in FIG. 18 is performed. The same processing as that shown in steps s310 in FIG. 18, s305 and s306 in FIG. 16, and s7 in FIG. 6 is performed. Then the same processing as that shown in step s7 in FIG. 6 is performed and the processing is terminated (s65).

Operations in a case when the computer system 1 is turned off (s312) are the same as those shown in FIG. 19. Operations in FIG. 8 to FIG. 10 are also applied to this embodiment.

According to this embodiment, the same effects with the previous embodiments are performed.

Eleventh Embodiment

Figure 35:
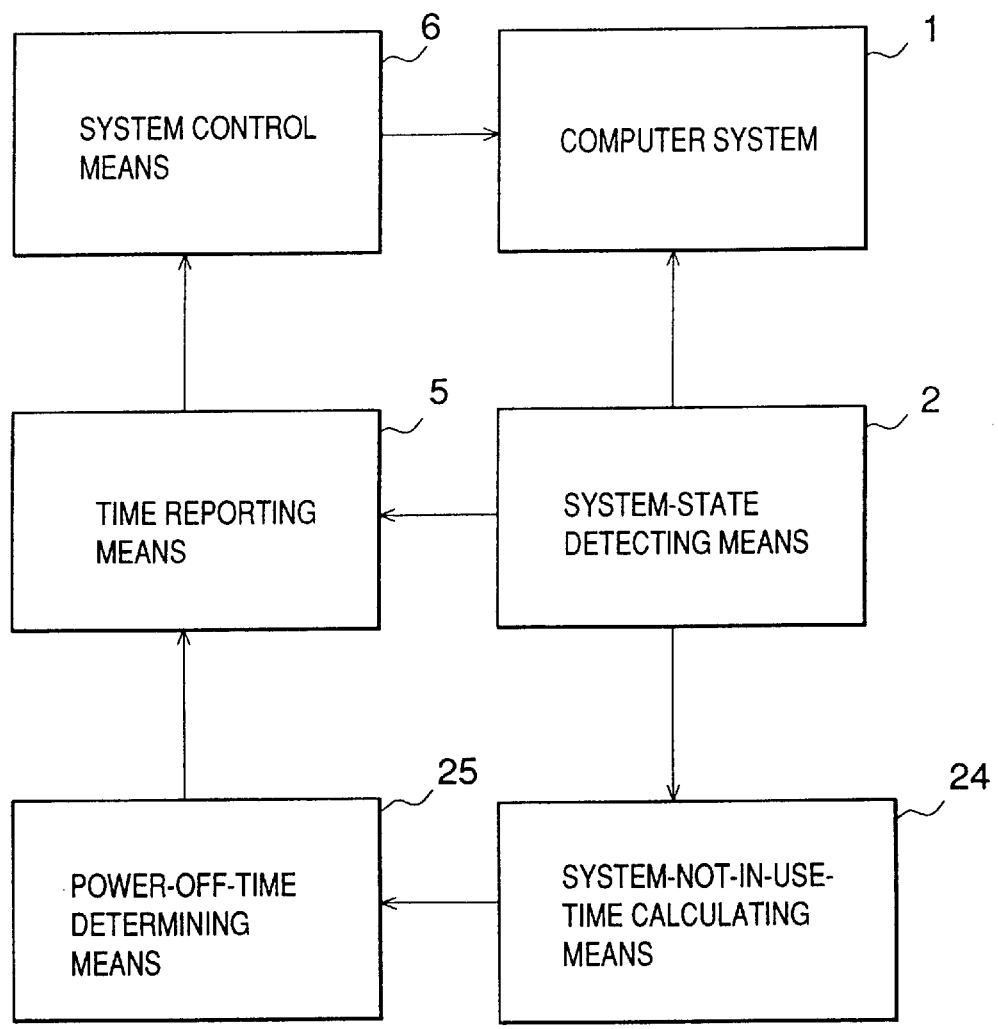
FIG. 35 is a block diagram showing the structure of a power control device according to an eleventh embodiment of the present invention.

FIG. 35 shows another embodiment of the present invention. The same symbols as those used in FIG. 1 indicate the same or corresponding portions.

In FIG. 35, a system-not-in-use-time calculating unit 24 calculates the time period in which the system is not being used from the time when the system-state detecting unit 2 reports a system change, and obtains the time period statistics, and power-off-time determining unit 25 determines the time period until the time when the power is turned off while the computer system 1 is not being used, according to the statistics of the time period in which the system is not used obtained from the system-not-in-use-time calculating unit 24.

In this embodiment, when the number of times the system is automatically turned off consecutively in the first embodiment is large, the automatic-power-off time Tauto is made shorter to reduce power consumption, since it can be determined that the user does not turn off the power in many cases.

Figure 36:
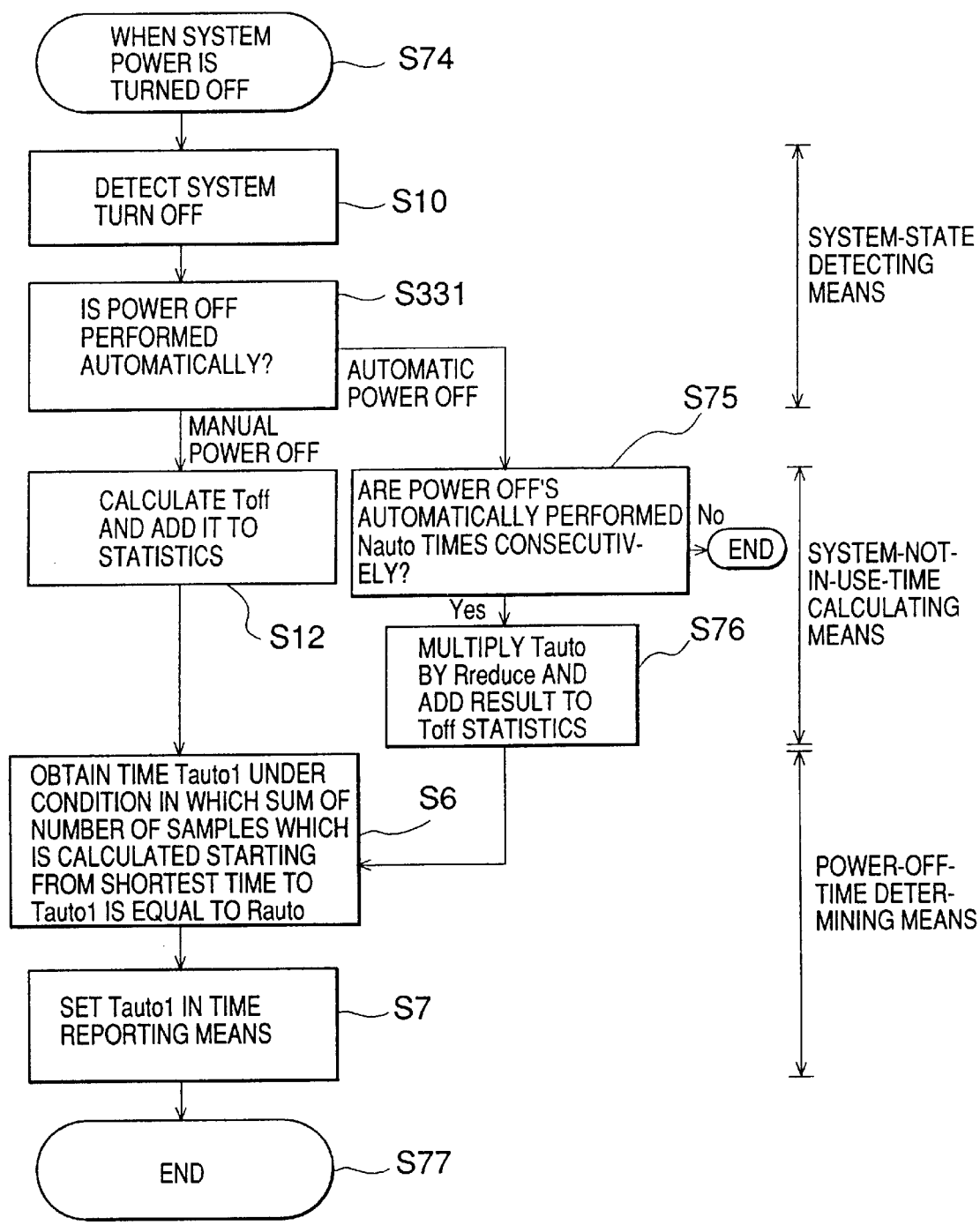
FIG. 36 is a flowchart showing operations of the power control device according to the eleventh embodiment of the present invention.

Operations in the eleventh embodiment will be described below referring to FIG. 36 which is a flowchart showing the processing in a case when the computer system 1 is changed from "on" to "off" (s74). The same processing as that shown in steps s10 in FIG. 7 and s331 in FIG. 16 is performed.

The system-not-in-use-time calculating unit 24 performs the same processing as that shown in step s12 in FIG. 7 when it receives a manual-power-off report. When it receives an automatic-power-off report, it checks whether the system is automatically turned off Nauto times consecutively (s75). If not, the processing is terminated. If the system is automatically turned off Nauto times consecutively, Tauto (the same as Tauto1 set previously) is multiplied by Rreduce (<1) to make it smaller and the obtained value is added to the Toff statistics (s76).

In any case, the same processing as that shown in steps s6 and s7 in FIG. 6 is performed and the processing is terminated (s77).

Operations in a case when the system is turned on (s1) are the same as those shown in FIG. 6. Operations in FIG. 8 to FIG. 10 are also applied to this embodiment.

According to this embodiment, even when the user never turns off the power, that is, Nauto times automatic-power-off reports is done consecutively, waste in power consumption is prevented and the system can be used for a long period.

Twelfth Embodiment

Figure 37:
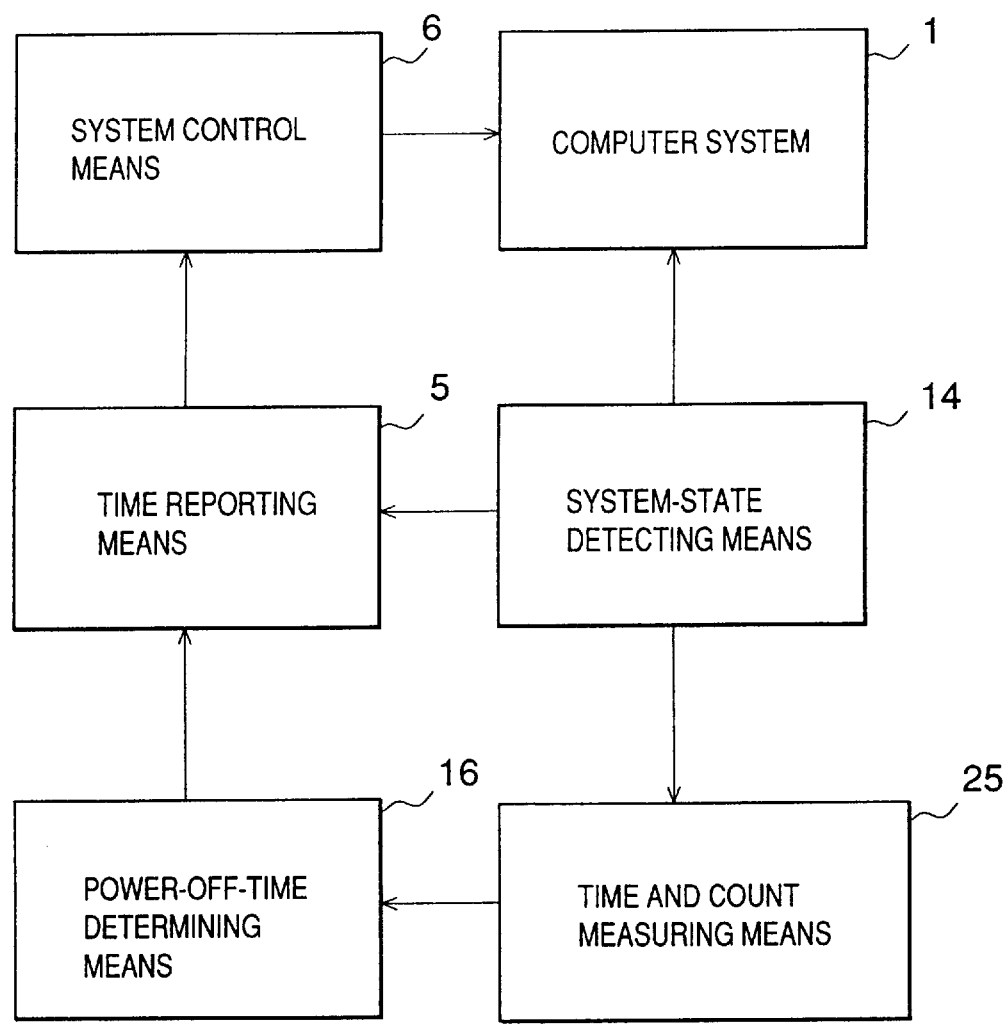
FIG. 37 is a block diagram showing the structure of a power control device according to a twelfth embodiment of the present invention.

FIG. 37 shows another embodiment of the present invention. The same symbols as those used in FIG. 1 indicate the same or corresponding portions.

In FIG. 37, the time and count measuring unit 25 calculates the time period when the system is being changed in its state from the time when the system-state detecting unit 14 reported a system-state change, and measures the number of times the system state changed.

This embodiment is a modification of the third embodiment and characterized by that since it can be judged that the user does not turn the power off in many cases when the number of times the system is automatically turned off consecutively is large in the third embodiment, the automatic-power-off time is made shorter to reduce power consumption, by pseudo-increasing the number of times the power is turned off.

Figure 38:
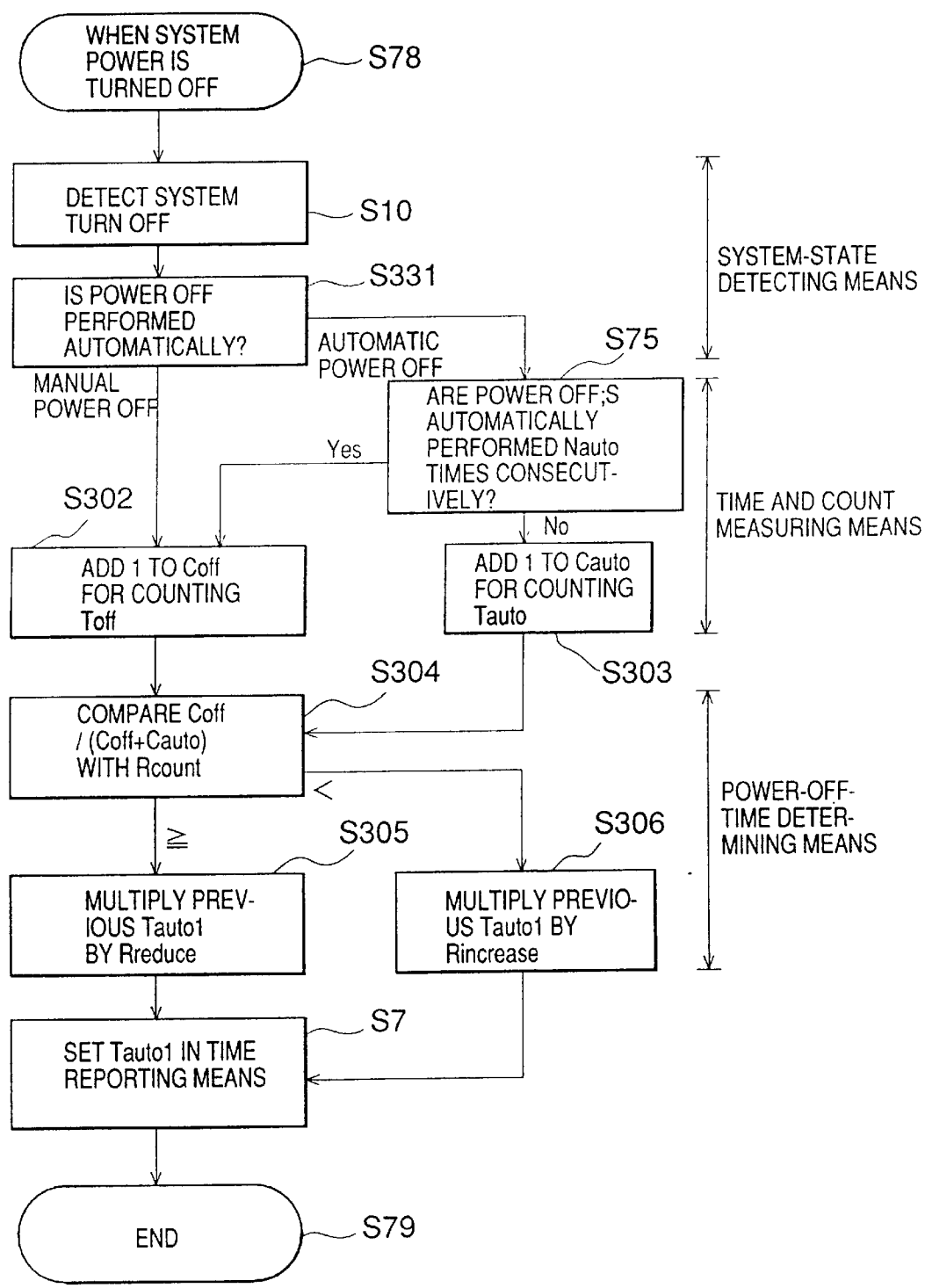
FIG. 38 is a flowchart showing operations of the power control device according to the twelfth embodiment of the present invention.

Operations in the twelfth embodiment will be described below referring to FIG. 38 which is a flowchart showing the processing in a case when the computer system 1 is changed from "on" to "off" (s78).

The same processing as those shown in steps s10 in FIG. 7 and s331 in FIG. 16 are performed.

The time and count measuring unit 25 performs the same processing as that shown in step s302 in FIG. 16 when the power is manually turned off. It performs the same processing as that shown in step s75 in FIG. 36 when the power is automatically turned off. When the power is turned off Nauto times consecutively, the processing shown in step s302 in FIG. 16 is performed in the same way as for manual power off. When the power is not consecutively turned off, the same processing as that shown in step s303 in FIG. 16 is performed.

In any case, the same processing as that shown in steps s304 and s305 in FIG. 16, or as that shown in step s306 in FIG. 16 is performed. Then the same processing as that shown in step s7 in FIG. 6 is performed and the processing is terminated (s79).

According to this embodiment, even when the user never turns off the power, waste in power consumption is prevented and the system can be used for a long period.

Thirteenth Embodiment

Figure 39:
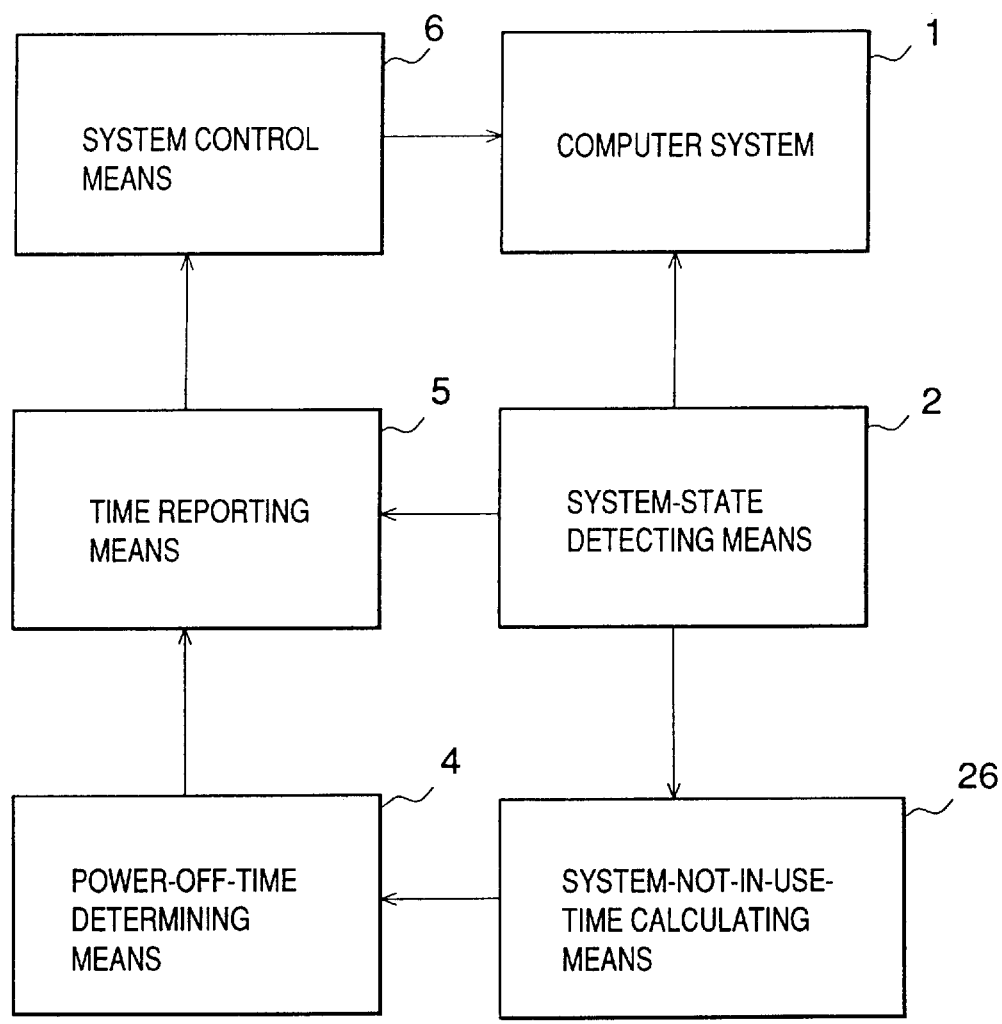
FIG. 39 is a block diagram showing the structure of a power control device according to a thirteenth embodiment of the present invention.

FIG. 39 is a block diagram of a power control apparatus for controlling the power of the computer system 1, according to another embodiment of the present invention. The same symbols as those used in FIG. 1 indicate the same or corresponding portions.

In FIG. 39, the system-not-in-use-time calculating unit 26 calculates the time period in which the system is not being used from the time when the system-state detecting unit 2 reports a system change, and obtains the time period statistics.

In this embodiment which is an improvement of the first embodiment, the automatic-power-off time is made shorter to reduce power consumption by adding the time period used as a sample in the statistics to the statistics after it is made smaller, when the user does not turn off the power for a while or in other cases.

Operations in the thirteenth embodiment will be described below in detail.

Figure 40:
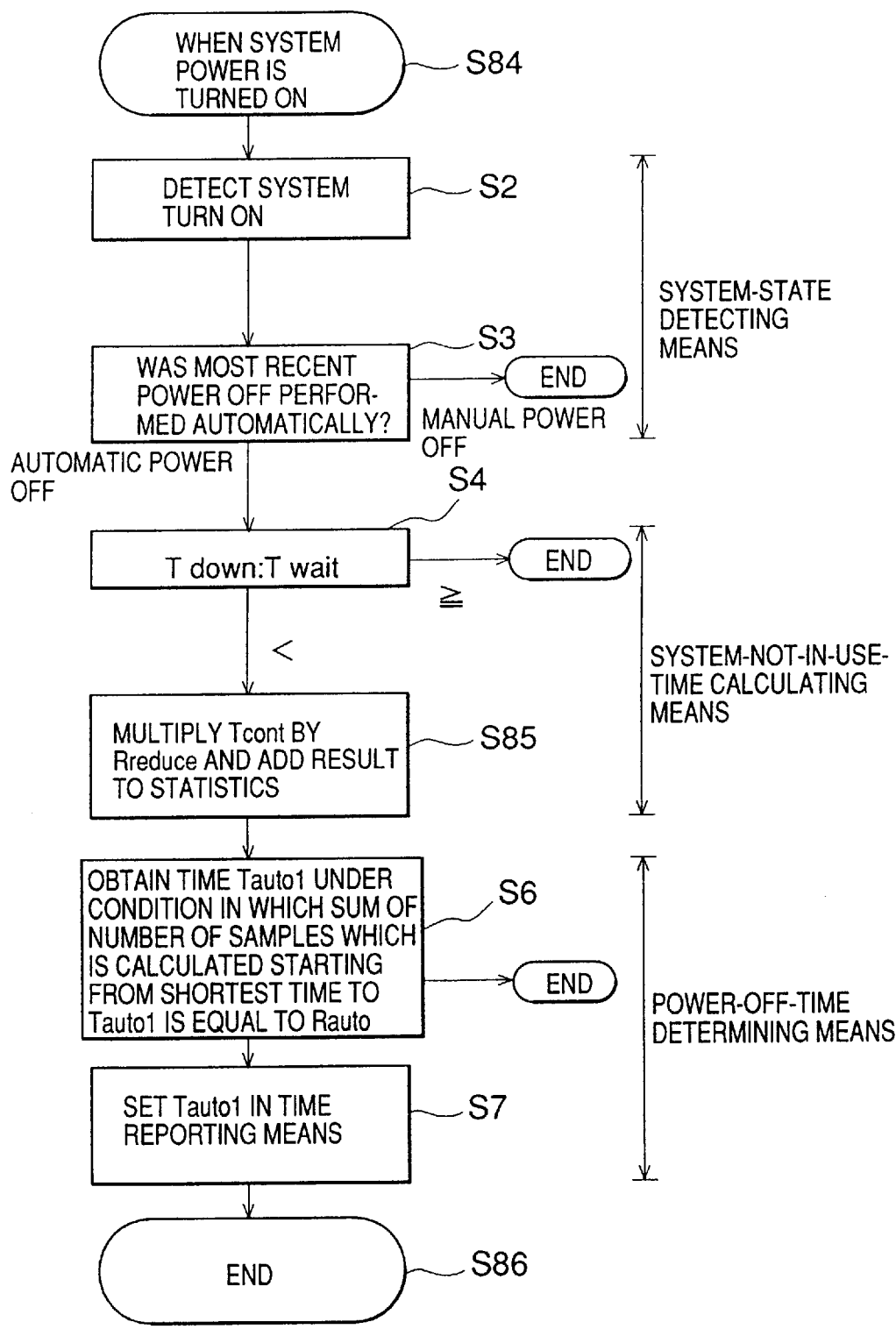
FIG. 40 and FIG. 41 are flowcharts showing operations of the power control device according to the thirteenth embodiment of the present invention.

FIG. 40 is a flowchart showing the processing in a case when the computer system 1 is changed from "off" to "on" (s84).

The same processing as that shown in steps s2 and s3 in FIG. 6 is performed.

The system-not-in-use-time calculating unit 26 performs the same processing as that shown step s4 in FIG. 6 to calculate Tcont. Then it multiplies Tcont by Rreduce to make Tcont smaller and adds the result to the statistics (s85).

The same processing as that shown in steps s6 and s7 in FIG. 6 is performed and the processing is terminated (s86).

Figure 41:
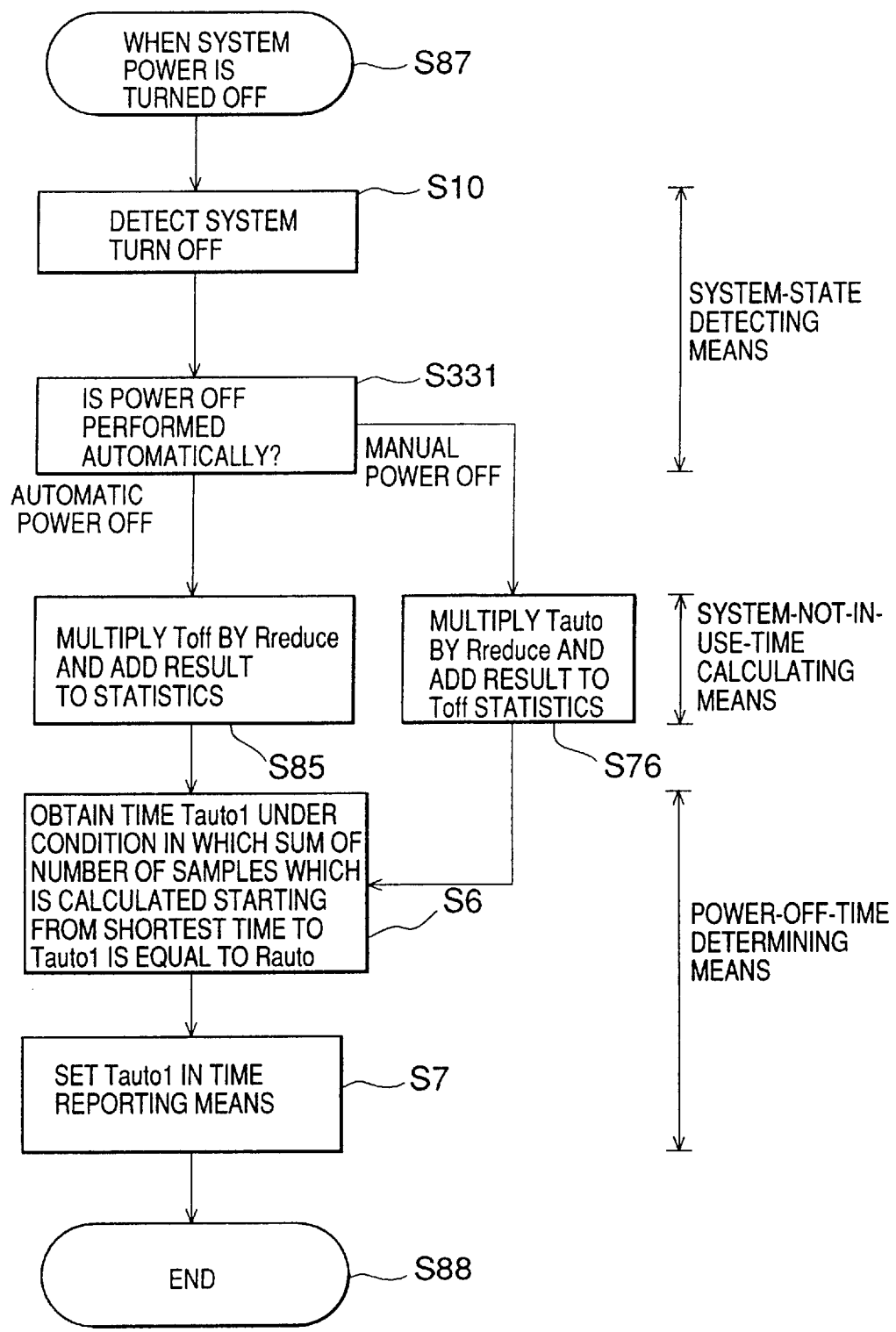

FIG. 41 is a flowchart showing the processing in a case when the computer system 1 is changed from "on" to "off" (s87).

The same processing as that shown in steps s10 in FIG. 7 and s331 in FIG. 16 is performed.

The system-not-in-use time calculating unit 26 multiplies Toff by Rreduce to make Toff smaller and adds the result to the statistics (s85) when the power is manually turned off. When the power is automatically turned off, the same processing as in step s76 in FIG. 36 is performed.

In any cases, the same processing as that shown in steps s6 and s7 in FIG. 6 is performed and the processing is terminated (s88).

Operations in a case in which the system changes its state from processing to idling (s14) and operations in a case in which the system changes its state from idling to processing (s19) are the same as those in FIG. 8 and FIG. 9. Further, operations in a case in which the idling time period is equal to or exceeds Tauto (s24) are the same as those in FIG. 10.

According to this embodiment, even when the user never turns off the power, waste in power consumption is prevented and the system can be used for a long period.

Fourteenth Embodiment

Figure 42:
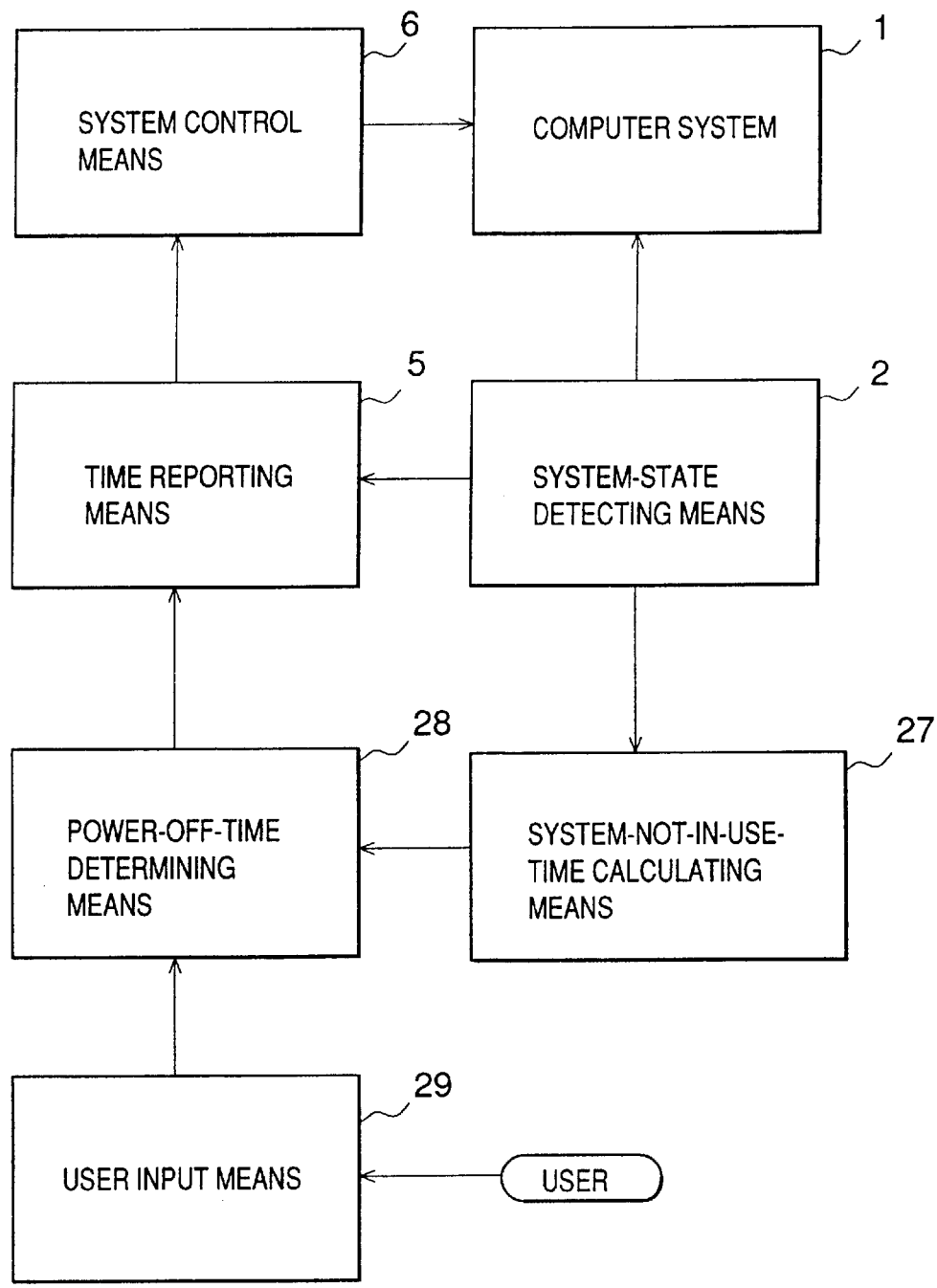
FIG. 42 is a block diagram showing the structure of a power control device according to a fourteenth embodiment of the present invention.

FIG. 42 is a block diagram of a power control apparatus for controlling the power of the computer system 1, according to another embodiment of the present invention. In FIG. 42, the system-not-in-use-time calculating unit 27 calculates the time period in which the system is not being used from the time when the system-state detecting unit 2 reports a system change, and obtains its time period statistics. Power-off-time determining unit 28 determines the time period till the time when the power is turned off while the computer system 1 is not being used, according to the statistics of the time period in which the system is not used obtained from the system-not-in-use-time calculating unit 27. And, user input unit 29 receives an input signal from the user and reports the information to the power-off-time determining unit 28.

Figure 43:
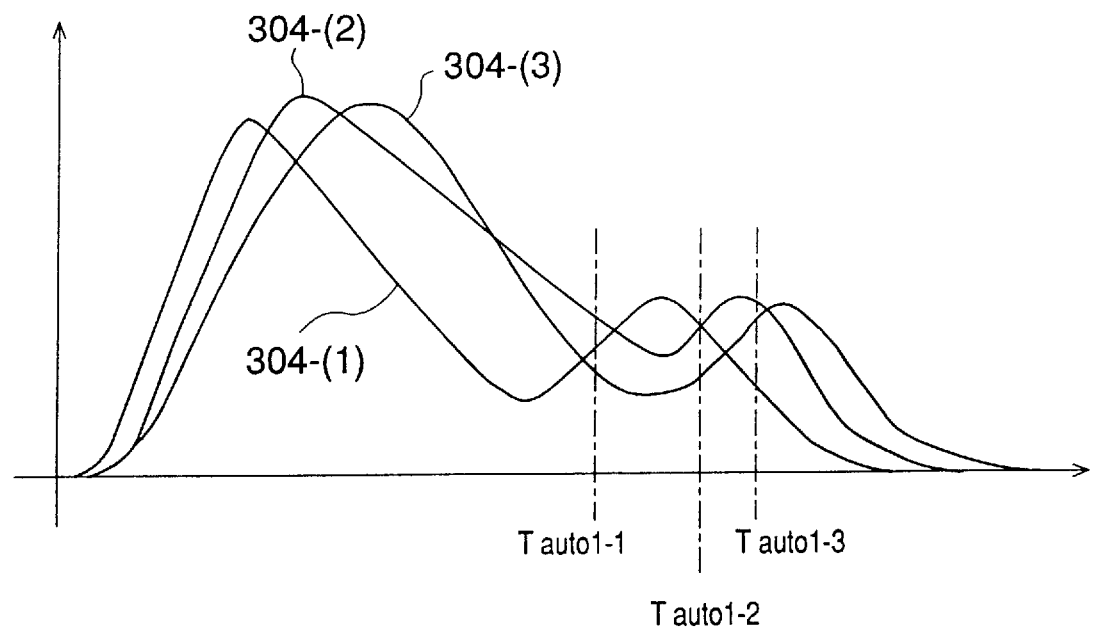
FIG. 43 is an example of statistics according to the fourteenth embodiment of the present invention.

FIG. 43 is an example of the statistics of Toff and Tcont totaled for each user. The horizontal axis indicates a sample value (time) and the vertical axis indicates the number of samples. Statistics 304-($i$) shows the total of the samples of Toff-i and Tcont-i for the user Ui with i being 1, 2, and 3.

In this embodiment which is an improvement of the first embodiment, control is performed according to the variety of usage of the user by collecting the statistics of the time period for each user and by determining the automatic-power-off time for each user.

Operations in the fourteenth embodiment will be described below in detail.

Figure 44:
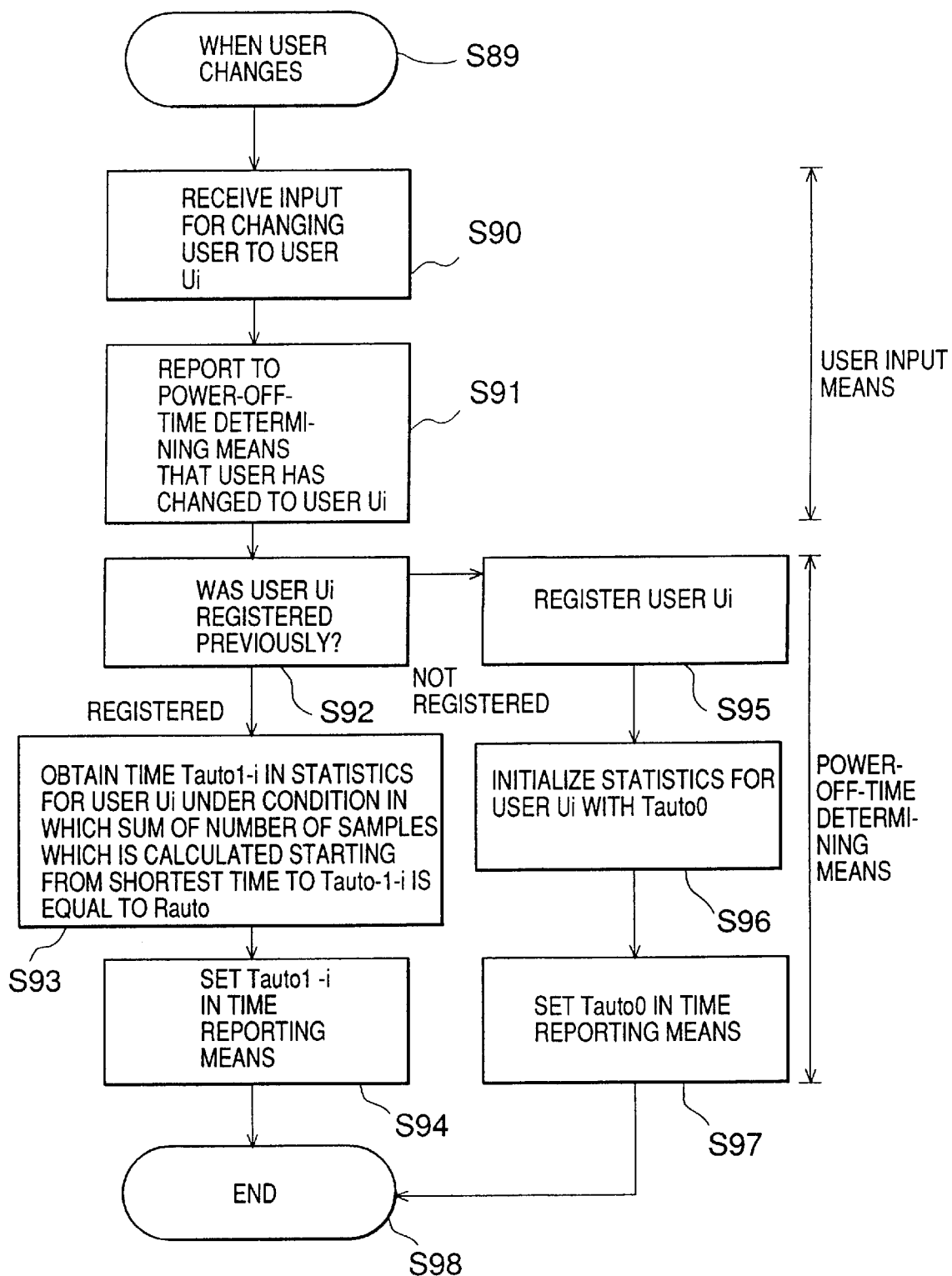
FIG. 44 is a flowchart showing operations of the power control device according to the fourteenth embodiment of the present invention.

FIG. 44 is a flowchart indicating the processing in a case in which the user is changed (s89). The user input unit 29 receives an input from user indicating that the user is changed to user Ui (s90) and reports user Ui to the power-off-time determining unit 28 (s91). The power-off-time determining unit 28 checks whether user Ui was registered before (s92). If user Ui was registered, time Tauto1-i is obtained such that the sum of the number of samples counted starting from the smallest time to Tauto1-i in the statistics 304-(i) reaches ratio Rauto (s93). Then, Tauto1-i is set in the time reporting unit 5 as Tauto (s94) and the processing is terminated (s98). When it was found in step s92 that the user Ui was not registered, the user Ui is registered (s95) and the statistics for user Ui is initialized (s96). If this initialization is performed with some appropriate initial values Tauto0's being used as samples, Tauto1-i is stably calculated in the next step s93. Tauto0 is set in the time reporting unit 5 as Tauto0(s97) and the processing is terminated (s98).

Figure 45:
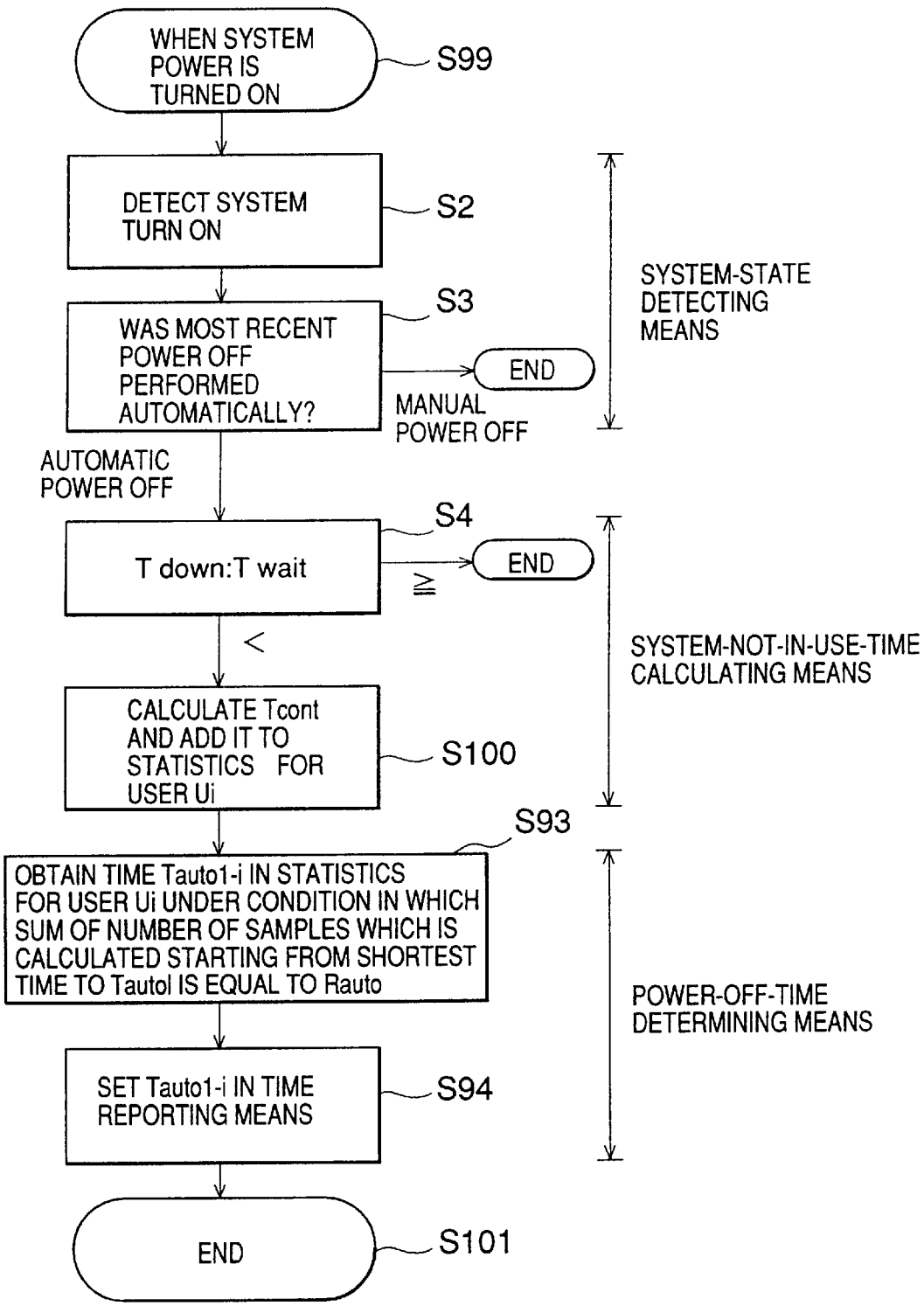
FIG. 45 and FIG. 46 are flowcharts showing operations of the power control device according to the fourteenth embodiment of the present invention.

FIG. 45 is a flowchart showing the processing in a case in which the computer system 1 is changed from "off" to "on" (s99).

The same processing as that shown in steps s2 and s3 in FIG. 6 is performed.

The system-not-in-use time calculating unit 27 performs the same processing as that shown step s4 in FIG. 6 to calculate Tcont. Then the value is added to the statistics 304-(i) as a sample when the user is the user Ui (s100).

The same processing as that shown in steps s93 and s94 in FIG. 44 is performed and the processing is terminated (s101).

Figure 46:
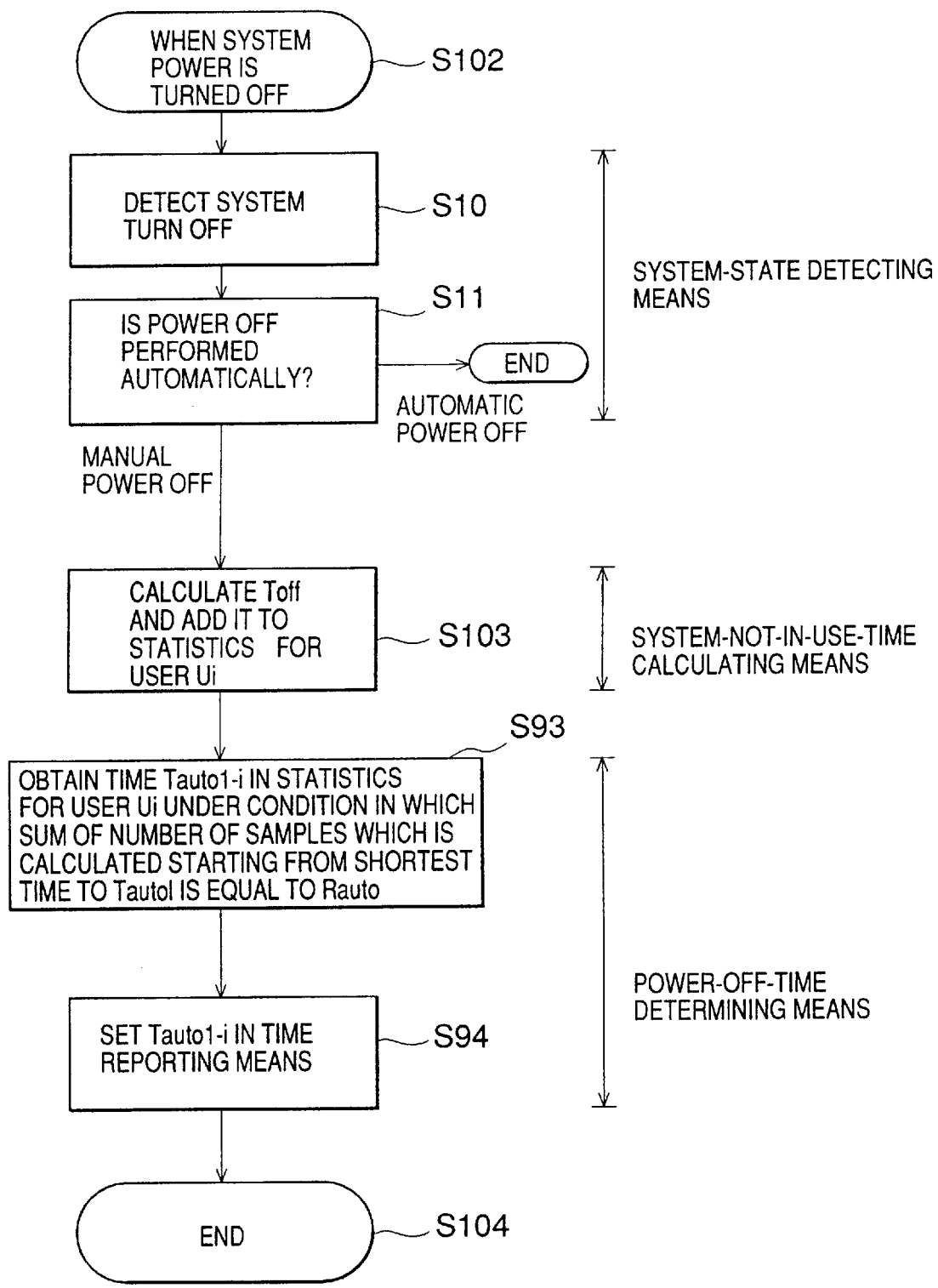

FIG. 46 is a flowchart showing the processing in a case in which the computer system 1 is changed from "on" to "off" (s102). The same processing as that shown in steps s10 and s11 in FIG. 7 is performed. The system-not-in-use-time calculating unit 27 calculates Toff and adds it to the statistics 304-(i) when the user is the user Ui (s103).
The same processing as that shown in steps s93 and s94 in FIG. 44 is performed and the processing is terminated (s104)

Operations in FIG. 8, FIG. 9 and FIG. 10 are the same as those in this embodiment.

According to this embodiment, even when the user is changed, power consumption is reduced according to the use conditions and the system can be used for a long period.

Fifteenth Embodiment

Figure 47:
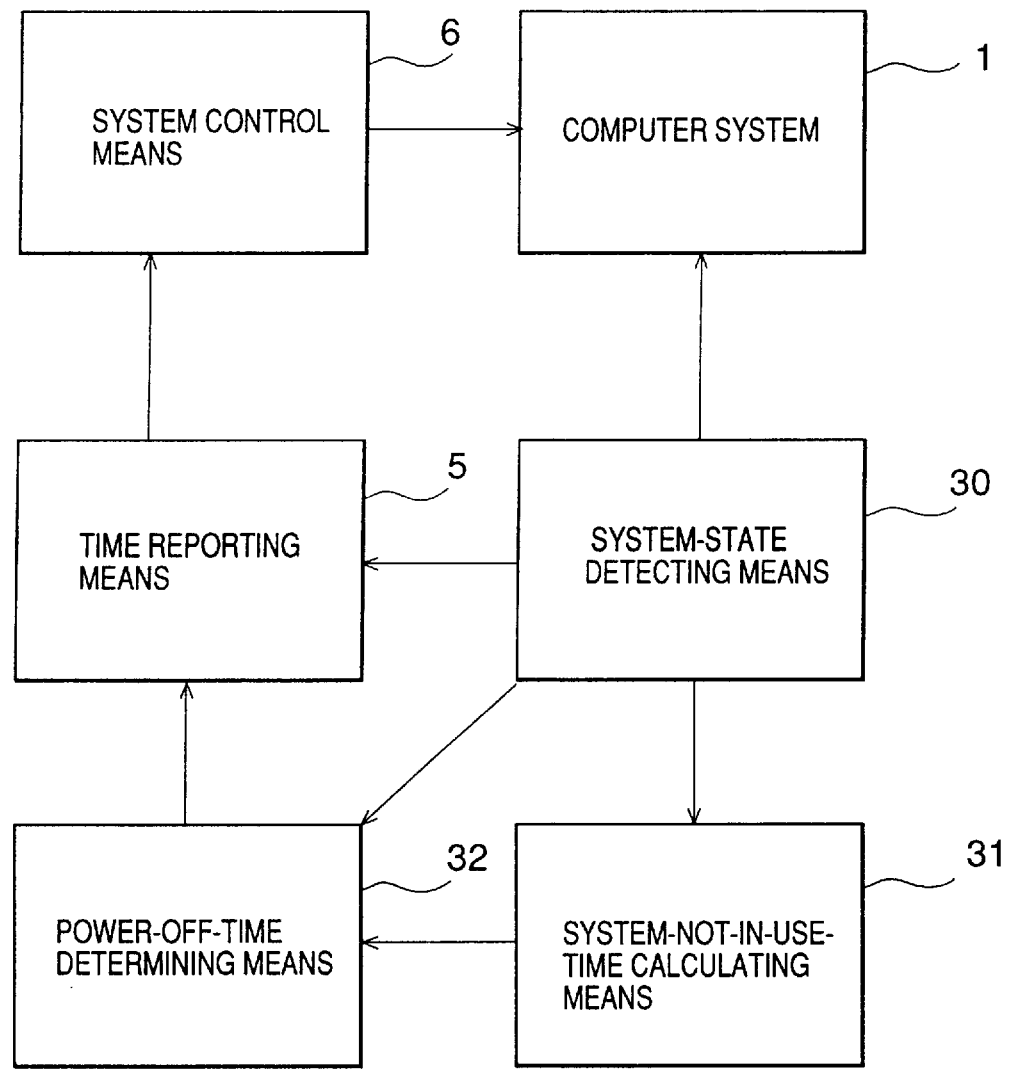
FIG. 47 is a block diagram showing the structure of a power control device according to a fifteenth embodiment of the present invention.

FIG. 47 is a block diagram of a power control apparatus for controlling the power of the computer system 1, according to another embodiment of the present invention.

In FIG. 47, the system-state detecting unit 30 detects the state of the computer system 1, the system-not-in-use-time calculating unit 31 calculates the time period in which the system is not being used from the time when the system-state detecting unit 30 reports a system change, and obtains the time period statistics, power-off-time determining unit 32 determines the time period till the time when the power is turned off while the computer system 1 is not being used, according to the statistics of the time period in which the system is not used obtained from the system-not-in-use-time calculating unit 31.

Figure 48:
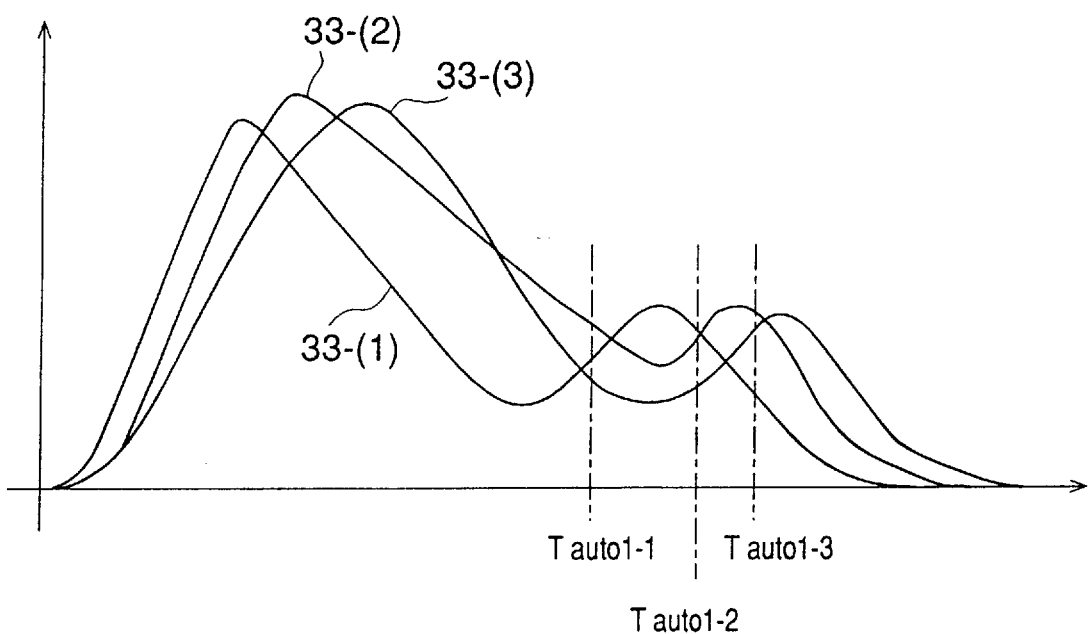
FIG. 48 is an example of statistics according to the fifteenth embodiment of the present invention.

FIG. 48 is an example of the statistics of Toff and Tcont totaled for each user. The horizontal axis indicates a sample value (time) and the vertical axis indicates the number of samples. Statistics 33-(j) shows the total of the samples in Toff-j and Tcont-j for each function Fj with j being 1, 2, and 3.

In this embodiment which is an improvement of the first embodiment, power is controlled according to the use condition of each function by collecting the statistics for each function which is being used while the power is off and by determining the automatic-power-off time for each function in the first embodiment.

Operations in the fifteenth embodiment will be described below in detail.

Figure 49:
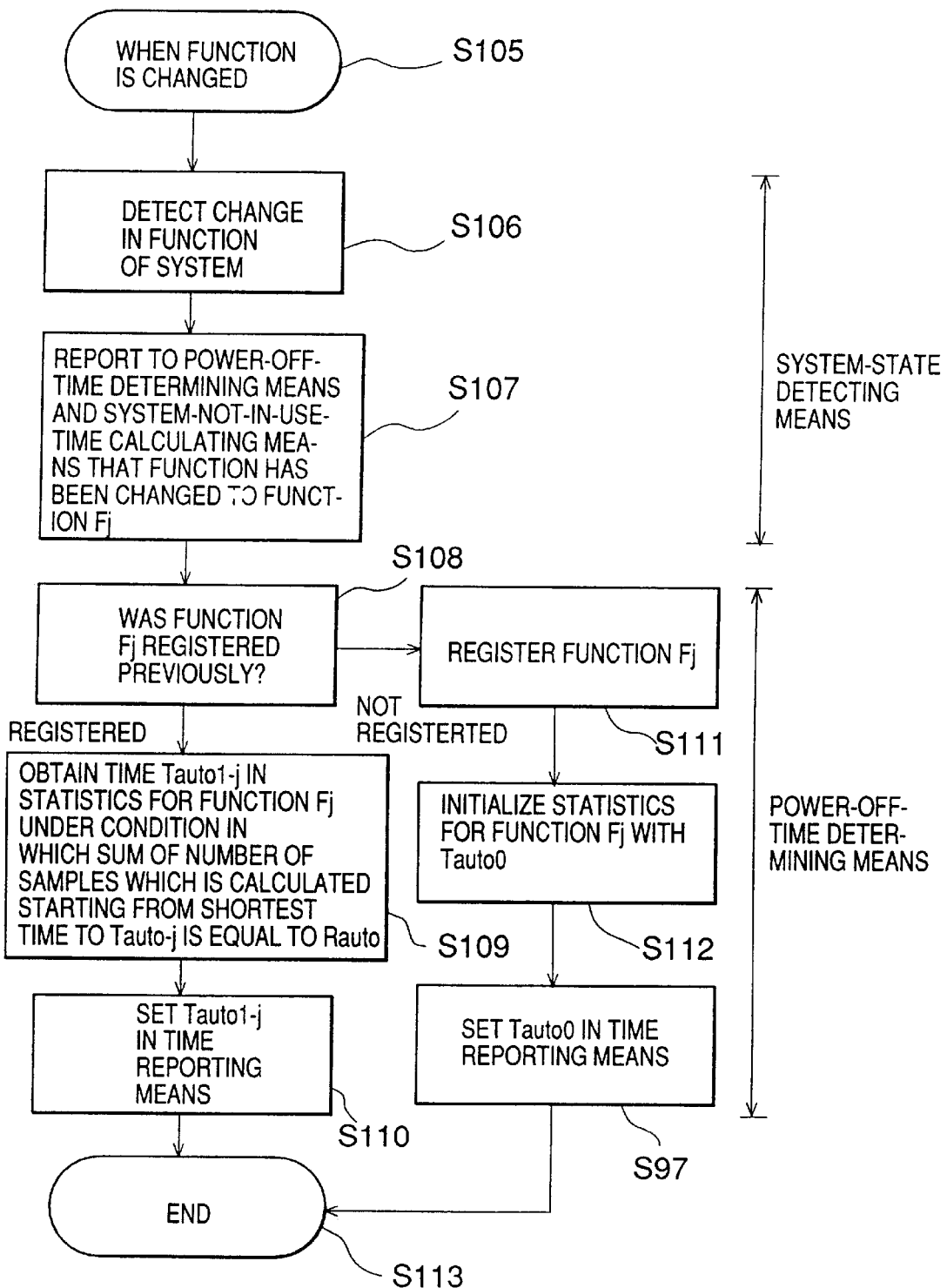
FIGS. 49 to 51 are flowcharts showing operations of the power control device according to the fifteenth embodiment of the present invention.

FIG. 49 is a flowchart indicating the processing in a case in which the function is changed (s105).

The system-state detecting unit 30 detects a state in which function Fj of the computer system is changed (s106) and reports function Fj to the system-not-in-use-time calculating unit 31 and the power-off-time determining unit 32 (s107).

The power-off-time determining unit 32 checks whether function Fj was registered before (s108). If function Fj was registered, time Tauto1-j is obtained such that the sum of the number of samples counted starting from the smallest time to Tauto1-j in the statistics 33-(j) reaches the ratio Rauto (s109). Then, Tauto1-j is set in the time reporting unit 5 as Tauto (s110) and the processing is terminated (s113). When it was found in step s108 that function Fj was not registered, the function is registered (s111) and the statistics for function Fj is initialized (s112). This initialization is performed with some appropriate initial values Tauto0's being used as samples. Tauto1-j is stably calculated in step s109 in the next and subsequent processing. Tauto0 is set in the time reporting unit 5 as Tauto (initial value) (s97) and the processing is terminated (s113).

Figure 50:
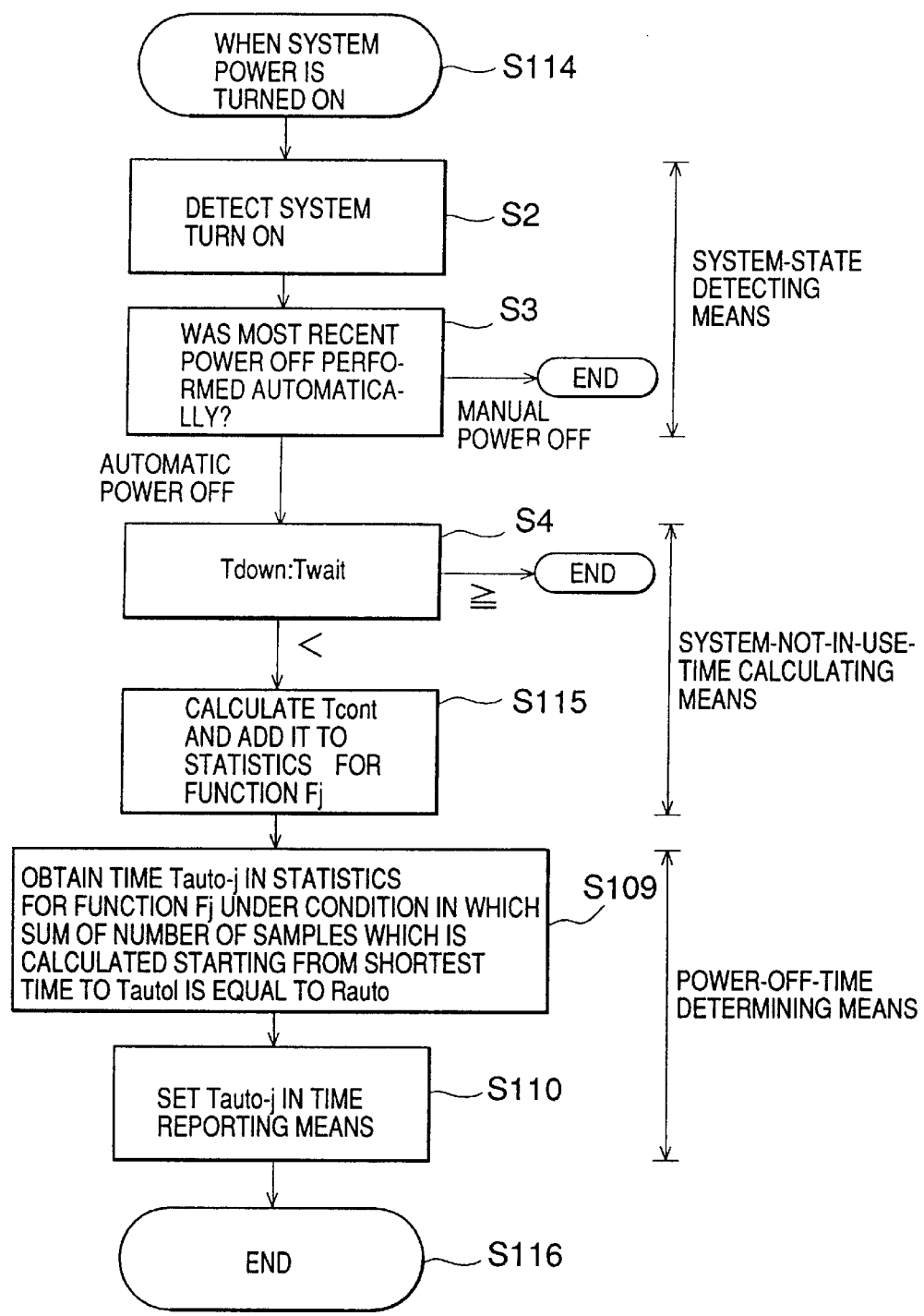

FIG. 50 is a flowchart showing the processing in a case in which the computer system 1 is changed from "off" to "on" (s114).

The same processing as that shown steps s2 and s3 in FIG. 6 is performed. The system-not-in-use-time calculating unit 31 performs the same processing as that shown step s4 in FIG. 6 to calculate Tcont. Then the value is added to the statistics 33-(j) as a sample when the function used is function Fj (s115).

The same processing as that shown in steps s109 and s110 in FIG. 49 is performed and the processing is terminated (s116).

Figure 51:
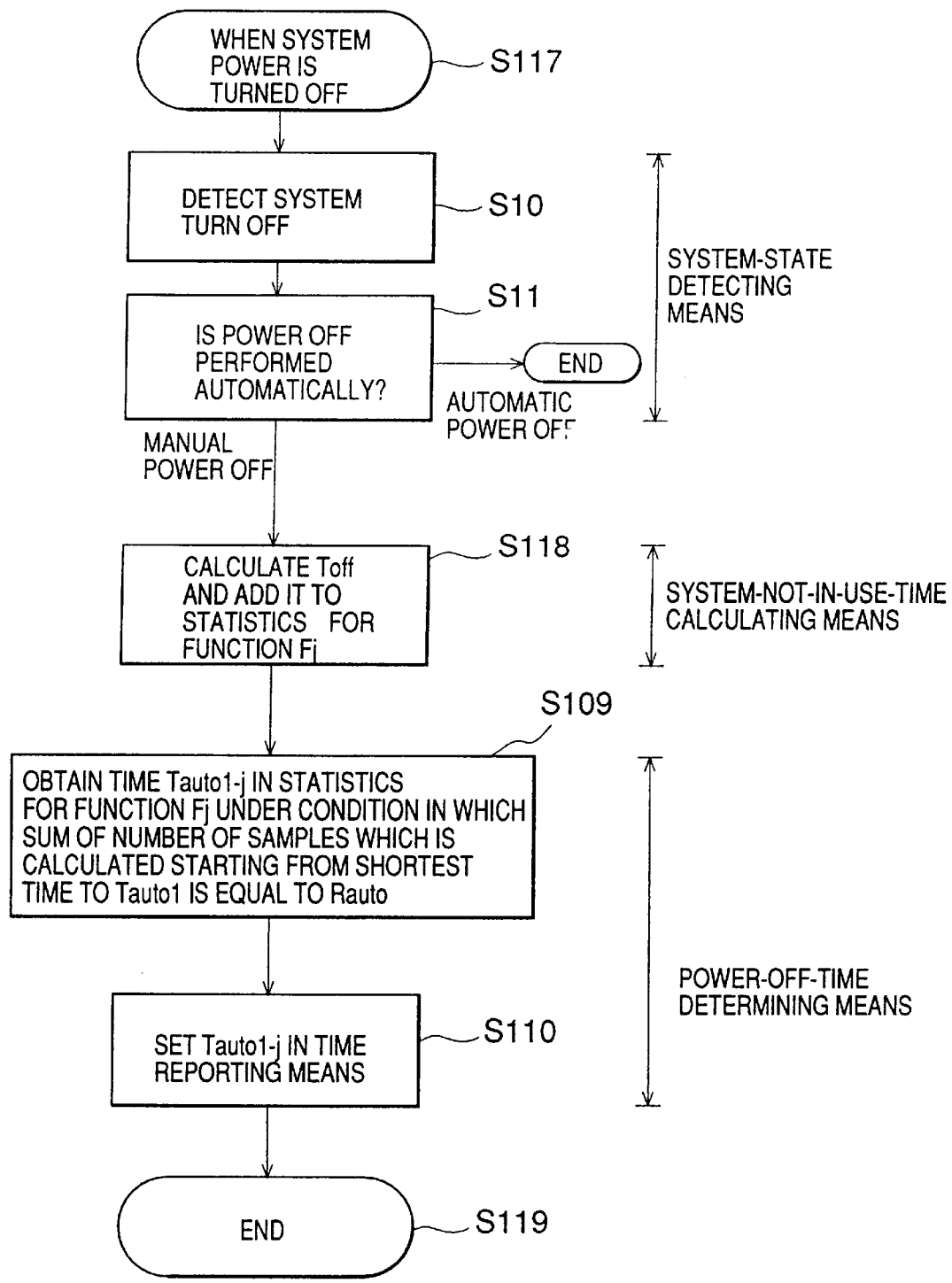

FIG. 51 is a flowchart showing the processing in a case in which the computer system 1 is changed from "on" to "off" (s117). The same processing as that shown in steps s10 and s11 in FIG. 7 is performed. The system-not-in-use-time calculating unit 31 calculates Toff and adds it to the statistics 33-(j) when the function used is function Fj (s118). The same processing as that shown in steps s109 and s110 in FIG. 49 is performed and the processing is terminated (s119).

Operations in FIG. 8 to FIG. 10 are the same as those in this embodiment.

According to this embodiment, control is performed according to the use condition for each function of the computer system 1.

Sixteenth Embodiment

Figure 52:
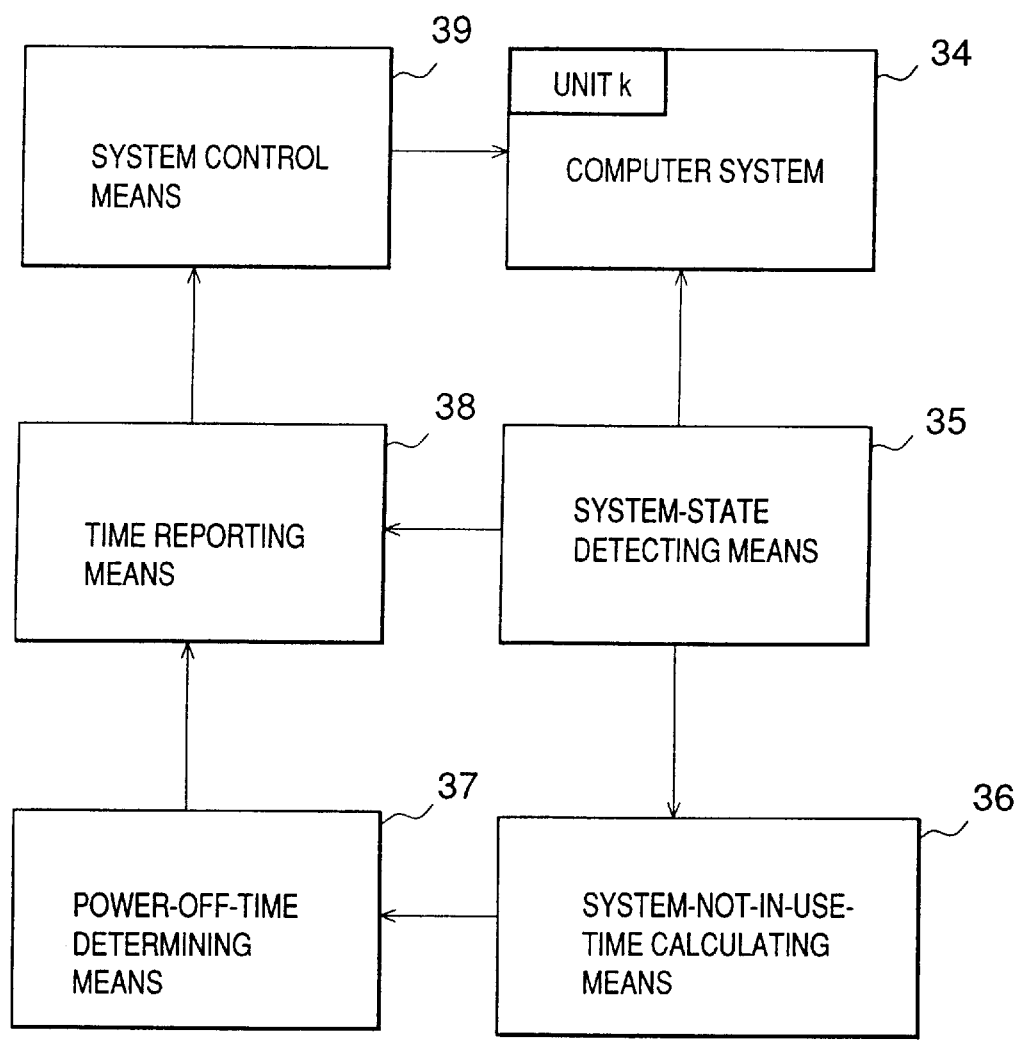
FIG. 52 is a block diagram showing the structure of a power control device according to a sixteenth embodiment of the present invention.

FIG. 52 is a block diagram of a power control apparatus for controlling the power of the computer system 1, according to another embodiment of the present invention.

In FIG. 52, there is shown a computer system 34 having a plurality of units to be power-controlled, a system-state detecting unit 35 for detecting the state of the computer system 34, and a system-not-in-use-time calculating unit 36 for calculating the time period in which the system is not being used from the time when the system-state detecting unit 35 reports a system change and for obtaining the time period statistics. In the same drawing, there is shown a power-off-time determining unit 37 for determining the time period till the time when the power is turned off while the computer system 34 is not being used, according to the statistics of the time period in which the system is not used obtained from the system-not-in-use-time calculating unit 36, time reporting unit 38 having the same number of timers as that of the units to be power-controlled, for counting the time period determined by the power-off-time determining unit 37, and system control unit 39 for turning off the power of the computer system 34 when the time reporting unit 38 sends a report.

Figure 53:
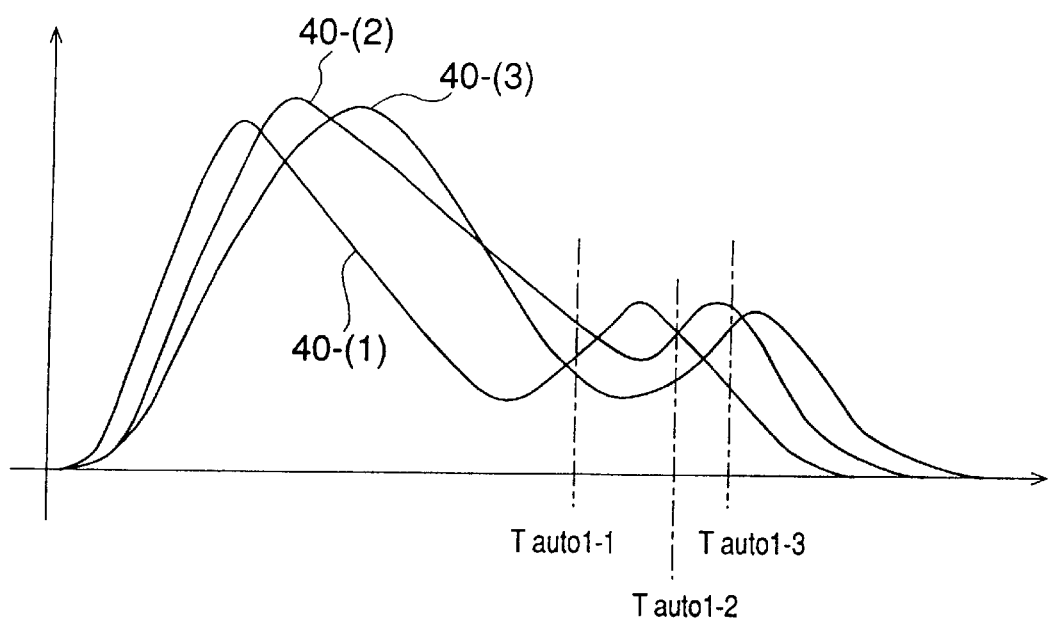
FIG. 53 is an example of statistics according to the sixteenth embodiment of the present invention.

FIG. 53 is an example of the statistics of Toff and Tcont totaled for each unit of the computer system 34. The horizontal axis indicates a sample value (time) and the vertical axis indicates the number of samples. Statistics 40-(k) show the total of the samples of Toff and Tcont for each unit k, with k being 1, 2, and 3.

In this embodiment which is relating to the first embodiment, the power of each unit is controlled by collecting the statistics of the time period for each unit of the computer system, which has a plurality of units, and by determining the automatic-power-off time for each unit.

Operations in the sixteenth embodiment will be described below in detail.

Figure 54:
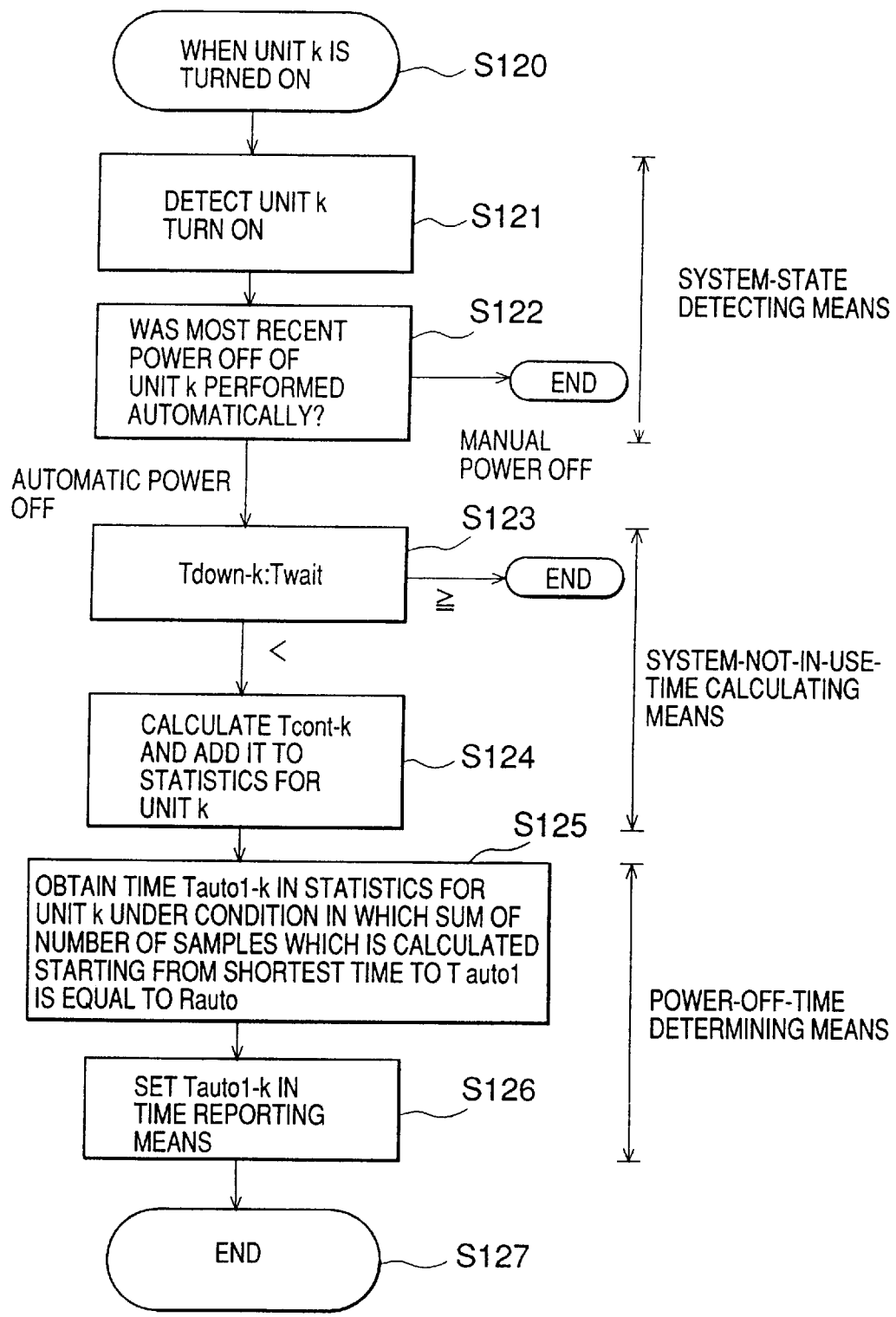
FIGS. 54 to 58 are flowcharts showing operations of the power control device according to the sixteenth embodiment of the present invention.

FIG. 54 is a flowchart indicating the processing in a case in which the computer system 1 is changed from "off" to "on" (s120).

The system-state detecting unit 35 detects the state in which the power of the unit k of the computer system 34 is turned on (s121). The system-state detecting unit 35 stores information for identifying the power-off mode, whether the system control unit 39 automatically turned the power off or the user turned the power off manually when the unit k was turned on the most recent time. When the power was turned off manually the last time, this processing terminates. When the power was automatically turned off the last time, the system-state detecting unit 35 reports to the system-not-in-use-time calculating unit 36 the time when the unit k is turned on this time (s122).

The system-not-in-use-time calculating unit 36 compares Tdown-k, which is Tdown for the unit k, and Twait. When Tdown-k is not smaller than Twait, the processing is terminated (s123). When Tdown-k is smaller than Twait, the system-not-in-use-time calculating unit 36 calculates Tcont-k, which is Tcont for the unit k, and adds it to the statistics 40-(k) as a sample (s124).

The power-off-time determining unit 37 obtains Tauto1-k, which is Tauto for the unit k, under the condition in which the sum of the number of samples which is calculated starting from the shortest time to Tauto1-k is equal to the ratio Rauto (s125). The obtained Tauto1-k is set in the time reporting unit (s126) and the processing is terminated (s127).

Figure 55:
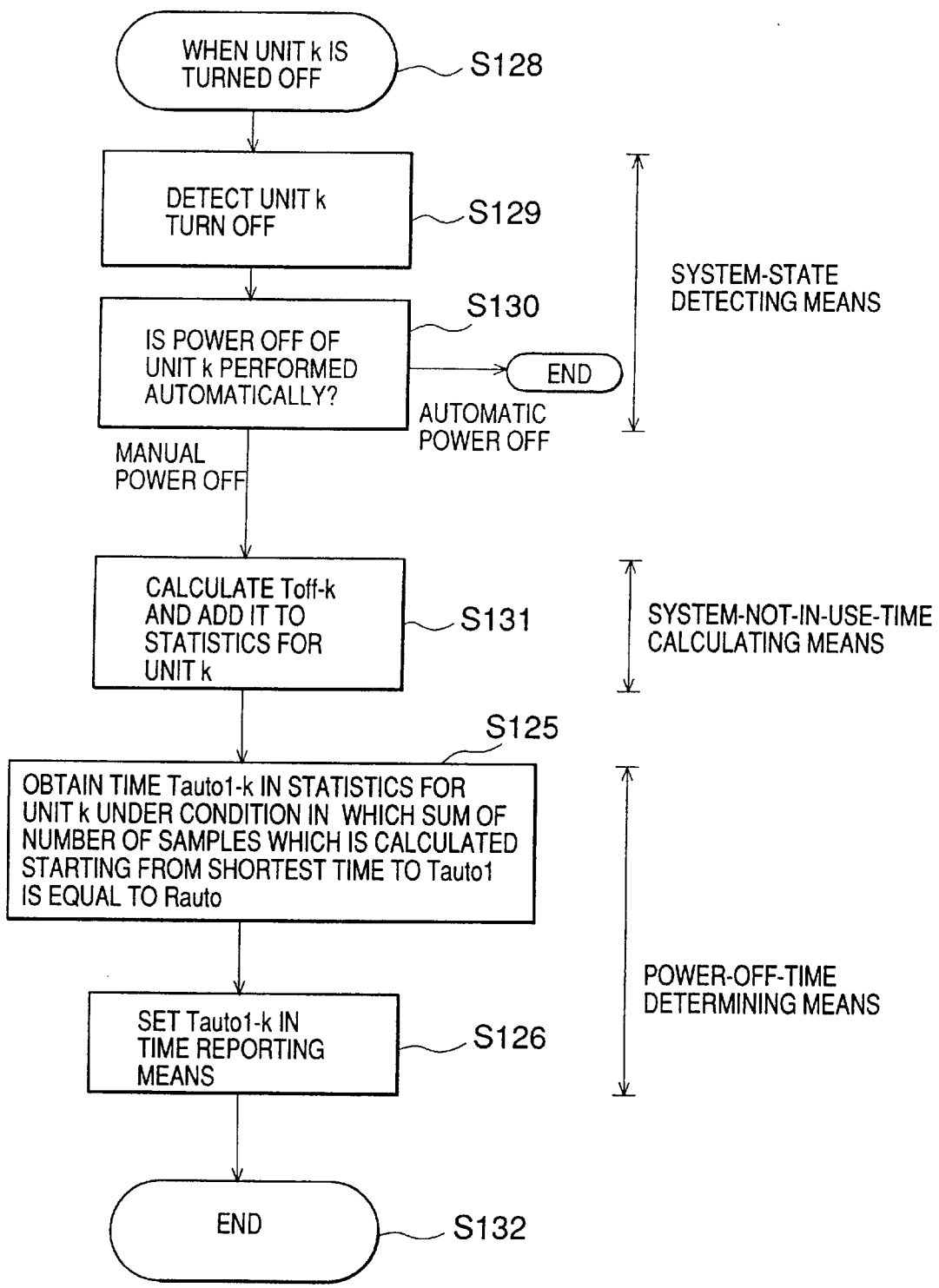

FIG. 55 is a flowchart indicating the processing in a case in which the computer system 1 is changed from "on" to "off" (s128).

The system-state detecting unit 35 detects the state in which the power of the unit k of the computer system 34 is turned off (s129). When the system control unit 39 turns off the power automatically, the processing is terminated. When the power is manually turned off by the user, the system-state detecting unit 35 reports to the system-not-in-use-time calculating unit 36 the time when the unit k is turned off (s130).

The system-not-in-use-time calculating unit 35 calculates Toff-k, which is Toff of the unit k, and adds it to the statistics 40-(k) (s131).

The processing as that shown in steps s125 and s126 in FIG. 54 is performed, and the processing is terminated (s132).

Figure 56:
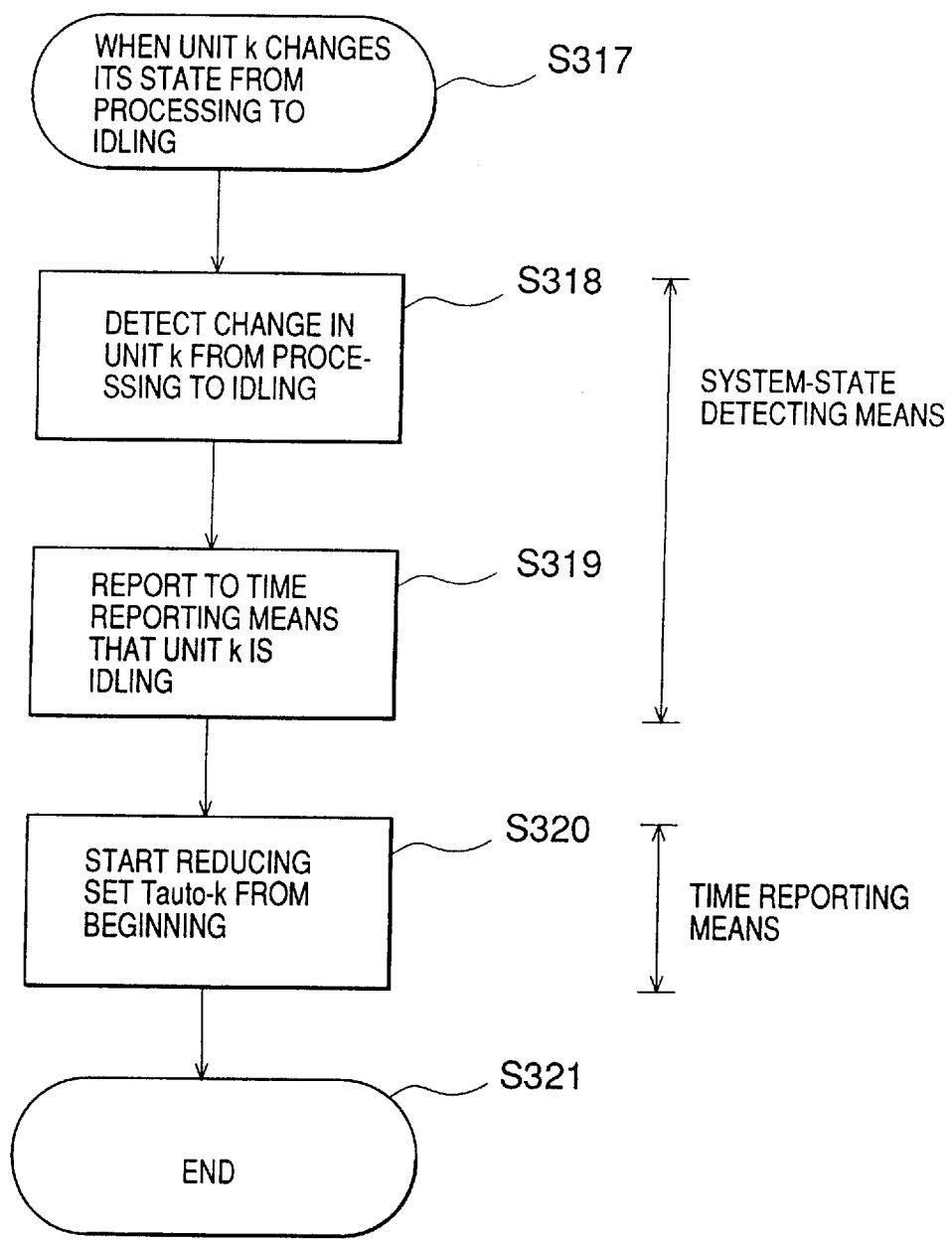

FIG. 56 is a flowchart indicating the processing in a case in which the unit k becomes idle from the processing state. With FIG. 56, operations in a case in which the unit k becomes idle from the processing state (s317) will be described below.

The system-state detecting unit 35 detects the state in which the unit k becomes idle from the processing state (s318). The system-state detecting unit 35 reports to the time reporting unit 38 that the unit k is idling (s319).

When the time reporting unit 38 receives a report indicating that the unit k is idle, it starts reducing Tauto-k from the beginning (s320), and the processing is terminated (s321).

Figure 57:
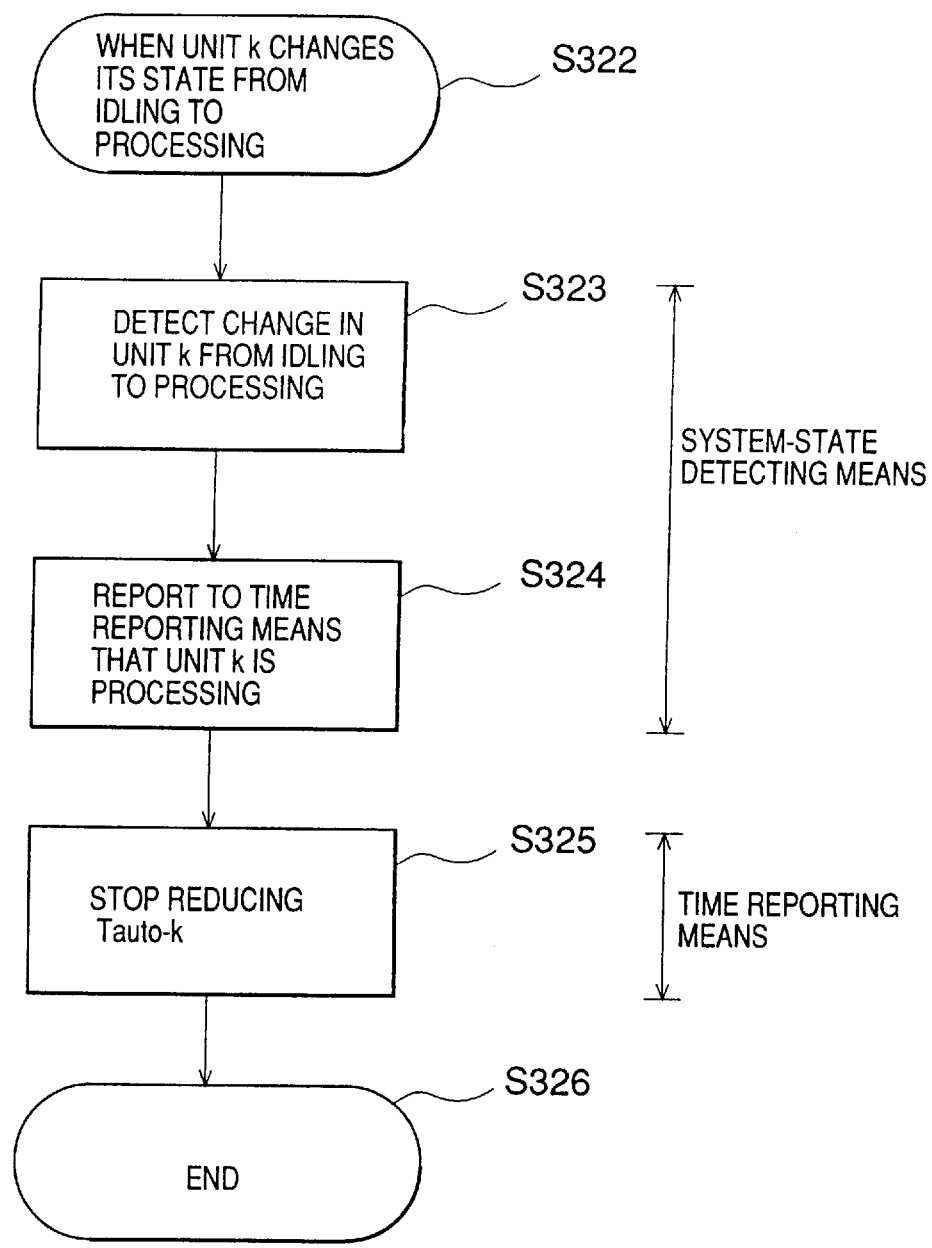

FIG. 57 is a flowchart indicating the processing in a case in which the unit k changes its state from idling to processing(s322).

The system-state detecting unit 35 detects the state in which the unit k changes its state from idling to processing (s323). The system-state detecting unit 35 reports to the time reporting unit 38 that the unit k is now processing (s324).

When the time reporting unit 38 receives a report indicating that the unit k is now processing, it stops reducing Tauto-k (s325), and the processing is terminated (s326).

Figure 58:
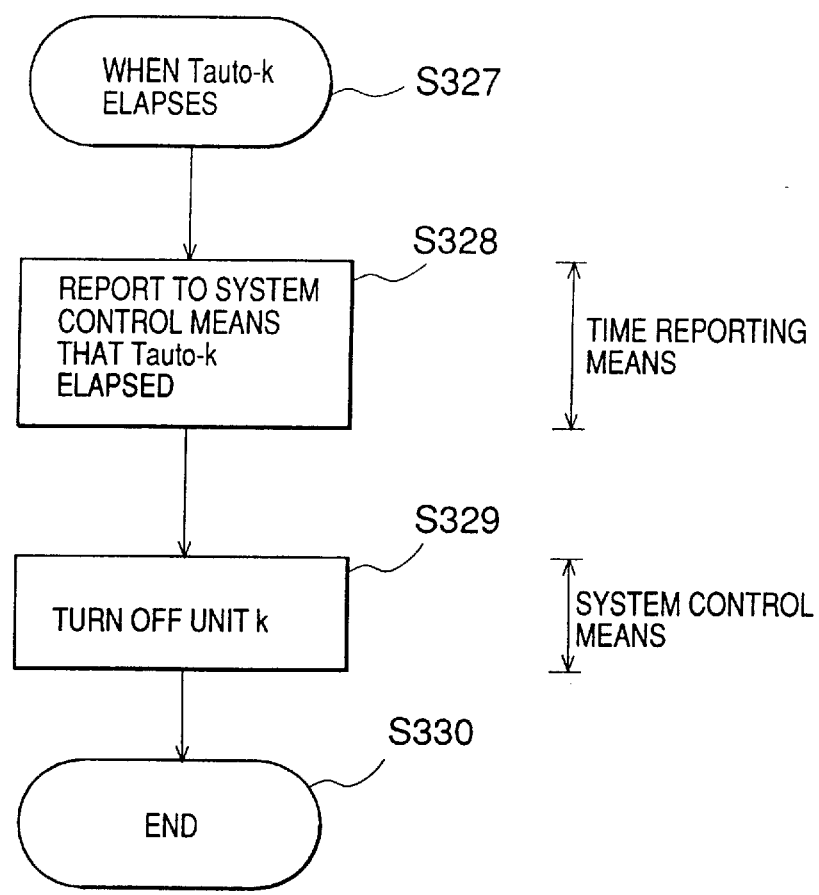

FIG. 58 is a flowchart indicating the processing in a case in which Tauto-k elapses. By referring to FIG. 79, operations in a case in which Tauto-k elapses in the time reporting unit 38 (s327).

The time reporting unit 38 reports to the system control unit 39 that Tauto-k has elapsed (s328).

When the system control unit 39 receives the report, it turns off the unit k of the computer system 34 (s329), and the processing is terminated (s330).

According to this embodiment, there is an advantage that power consumption is reduced according to the use condition of each unit of the computer system 34 and the system can be used for a long period.

Seventeenth Embodiment

Figure 59:
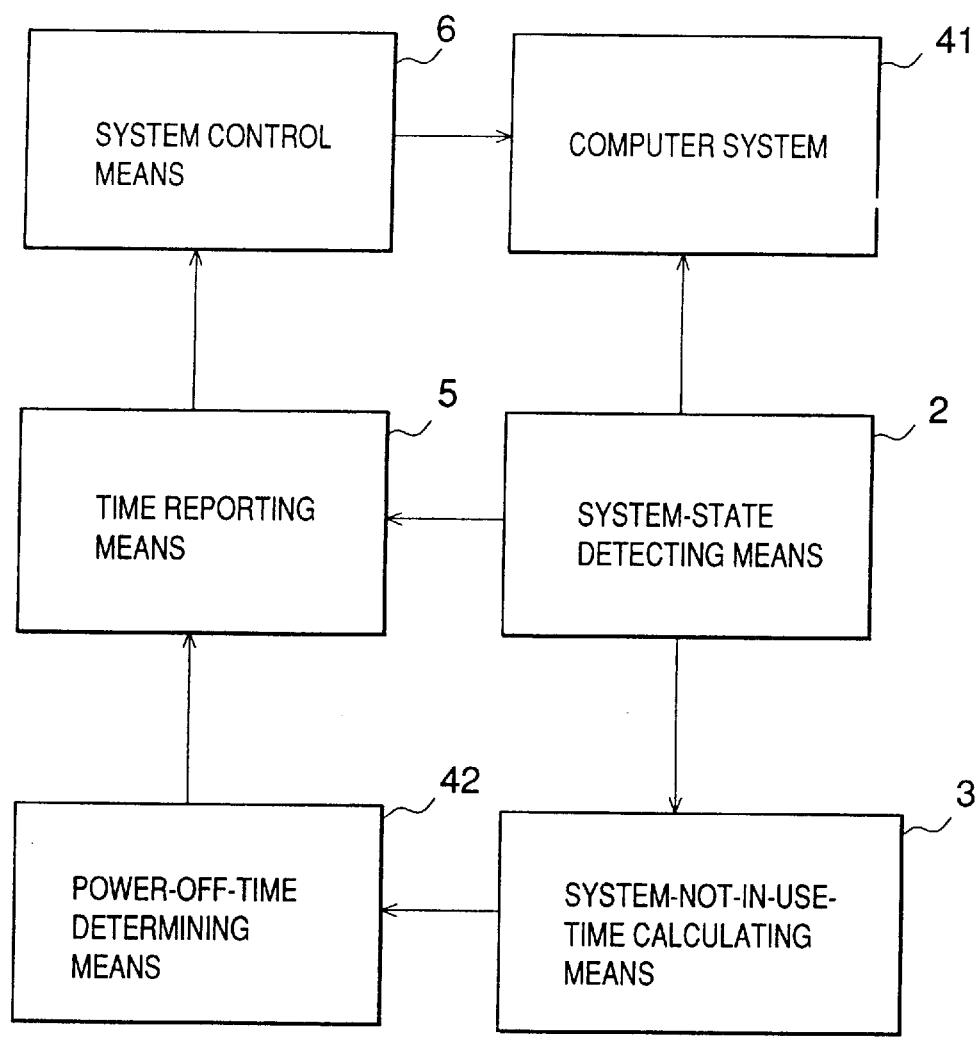
FIG. 59 is a block diagram showing the structure of a power control device according to a seventeenth embodiment of the present invention.

FIG. 59 is a block diagram of a power control apparatus for controlling the power of the computer system 1, according to another embodiment of the present invention.

In FIG. 59, there is shown a computer system 41 to be power-controlled which uses a large amount of electric power when it is activated, and power-off-time determining unit 42 is used for determining the time period with the power is turned off while the computer system is not being used, according to the statistics of the time period in which the system is not used obtained from the system-not-in-use-time calculating unit 3.

Figure 60:
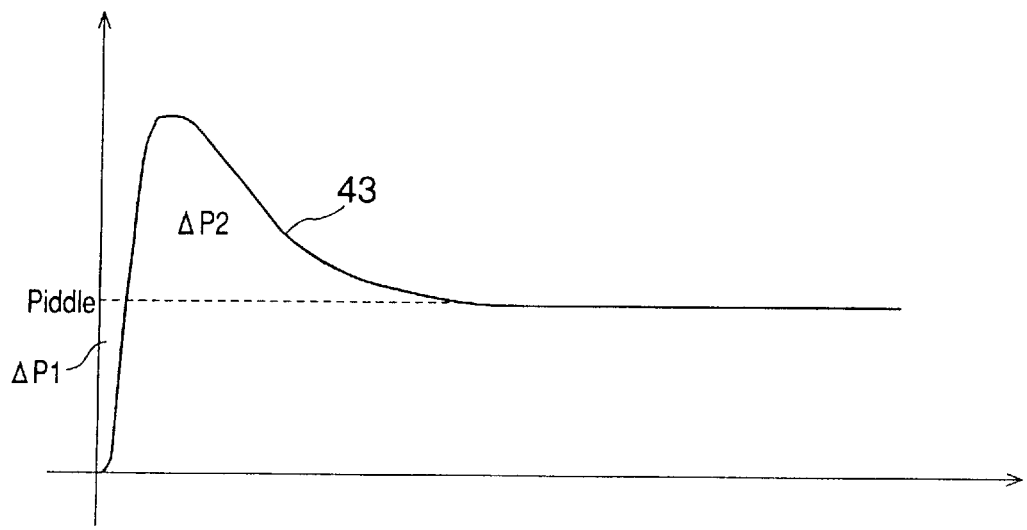
FIG. 60 is a graph showing changes in power consumption along the time axis, of a computer system according to the seventeenth embodiment of the present invention.

FIG. 60 shows changes in power consumption of the computer system on the time axis. The horizontal axis indicates the time which elapses from the time when the computer system is activated, and the vertical axis indicates the power consumption of the computer system at each time.

Piddle indicates the stationary power consumption in a state in which the computer system is idle. Let ΔWon be the difference between ΔP1 and ΔP2, that is, ΔWon=ΔP2−ΔP1, which is the power consumed in surplus compared with Piddle when the power is turned on. ΔWon shall be positive.

Figure 61:
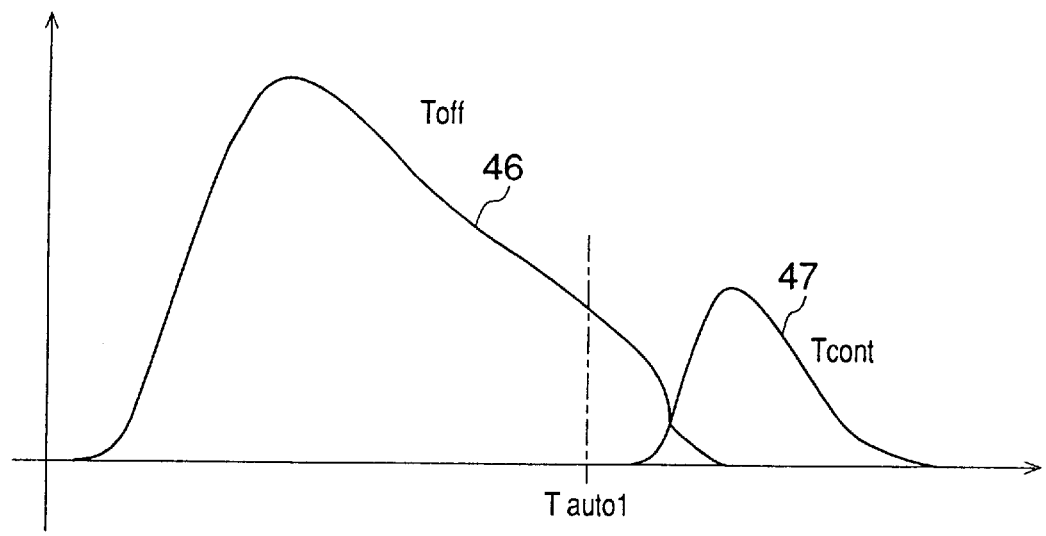
FIG. 61 is an example of statistics according to the seventeenth embodiment of the present invention.

FIG. 61 is an example of the statistics of Toff and Tcont. The horizontal axis indicates a sample value (time) and the vertical axis indicates the number of samples. Statistics 46 show the statistics of Toff and statistics 47 show those of Tcont.

When power consumption increases at power on in the first embodiment, the automatic power-off time which makes power consumption minimum is obtained from the obtained statistics in this embodiment with an increase of the power consumed at power on being taken into account.

Operations in the seventeenth embodiment will be described below in detail.

Figure 62:
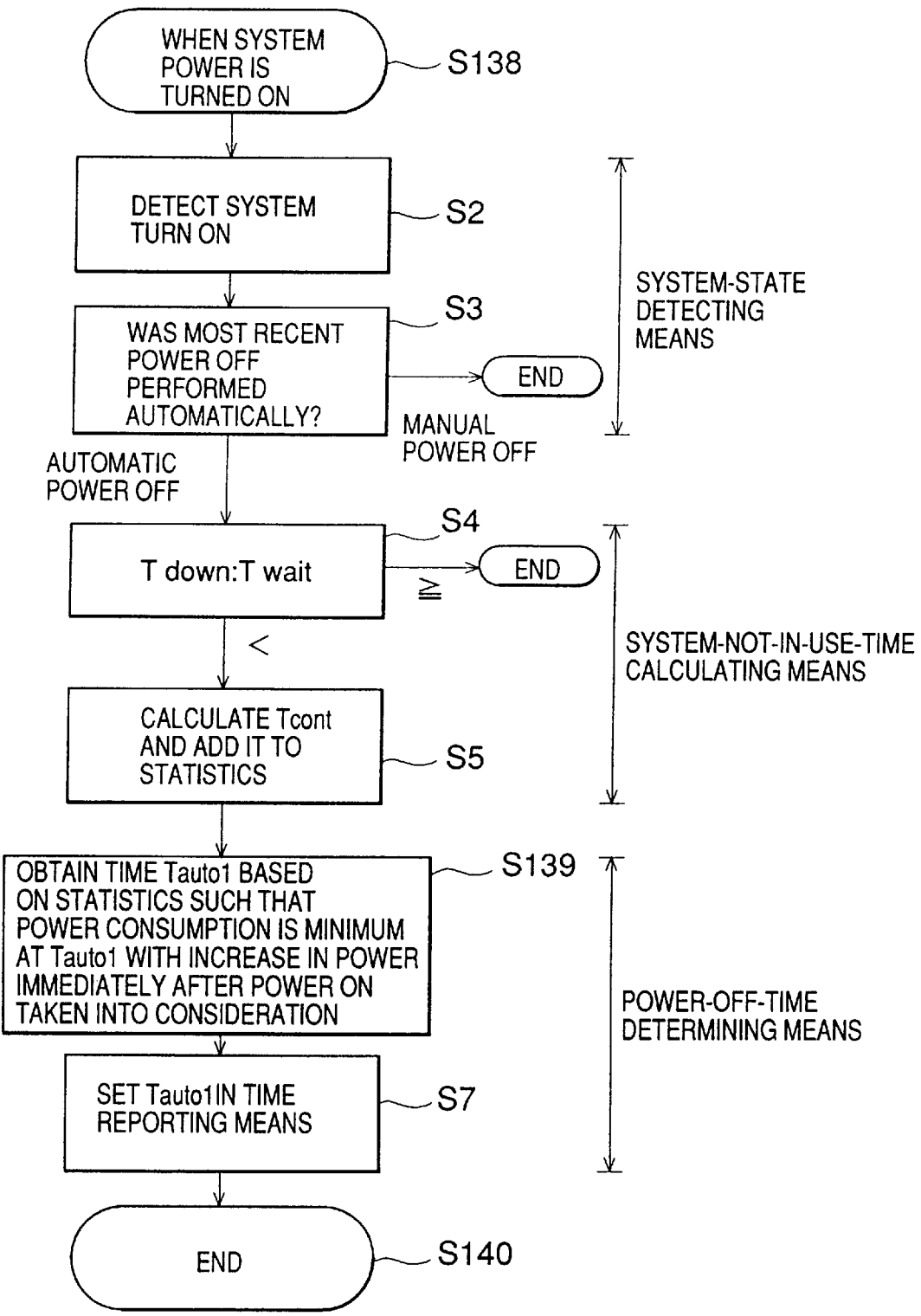
FIG. 62 and FIG. 63 are flowcharts showing operations of the power control device according to the seventeenth embodiment of the present invention.

FIG. 62 is a flowchart showing the processing in a case in which the computer system 41 is changed from "off" to "on".

The same processing as that shown in steps s2 to s5 in FIG. 6 is performed.

The power-off-time determining unit 42 obtains time Tauto1 with the power consumption 43 being taken into account (s139) assuming that the distribution of Toff conforms to the statistics 46 and the distribution of Tcont conforms to the statistics 47 in the computer system 41. Although Tauto1 changes power consumption such that the stationary power consumption in the idle state becomes large when Tauto1 is made larger and the stationary power consumption in the idle state becomes small when Tauto1 is made smaller, Tcont increases and the power is frequently turned on, increasing the power consumption of úoWon. Therefore, Tauto1 is obtained such that power consumption is the minimum, from the distributions of Toff and Tcont with an appropriate method.

The same processing as that shown in step s7 in FIG. 6 is performed and the processing is terminated (s140).

Figure 63:
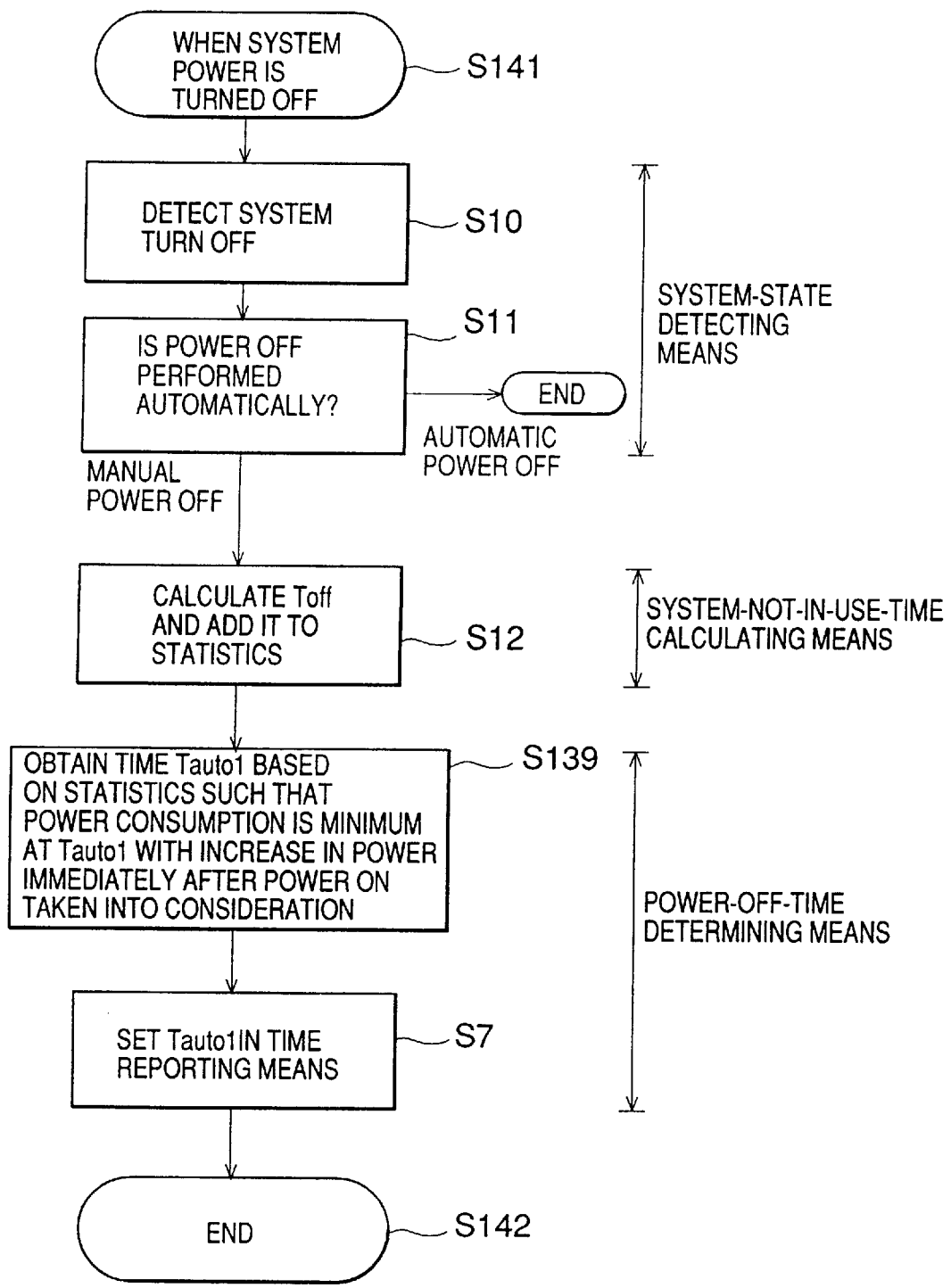

FIG. 63 is a flowchart showing the processing in a case when the computer system 41 is changed from "on" to "off" (s141).

The same processing as that shown in steps s10 to s12 in FIG. 7 is performed.

The same processing as that shown in step s139 in FIG. 62 is performed, the same processing as that shown in step s7 in FIG. 6 is performed, and the processing is terminated (s142). Operations in FIG. 8 to FIG. 10 are the same as those in this embodiment.

According to this embodiment, even when the power consumed at power on in the computer system 41 is larger than the average power consumption in operation, power consumption is reduced according to the use conditions of the user in the computer system 41 and the system can be used for a long period.

Eighteenth Embodiment

Figure 64:
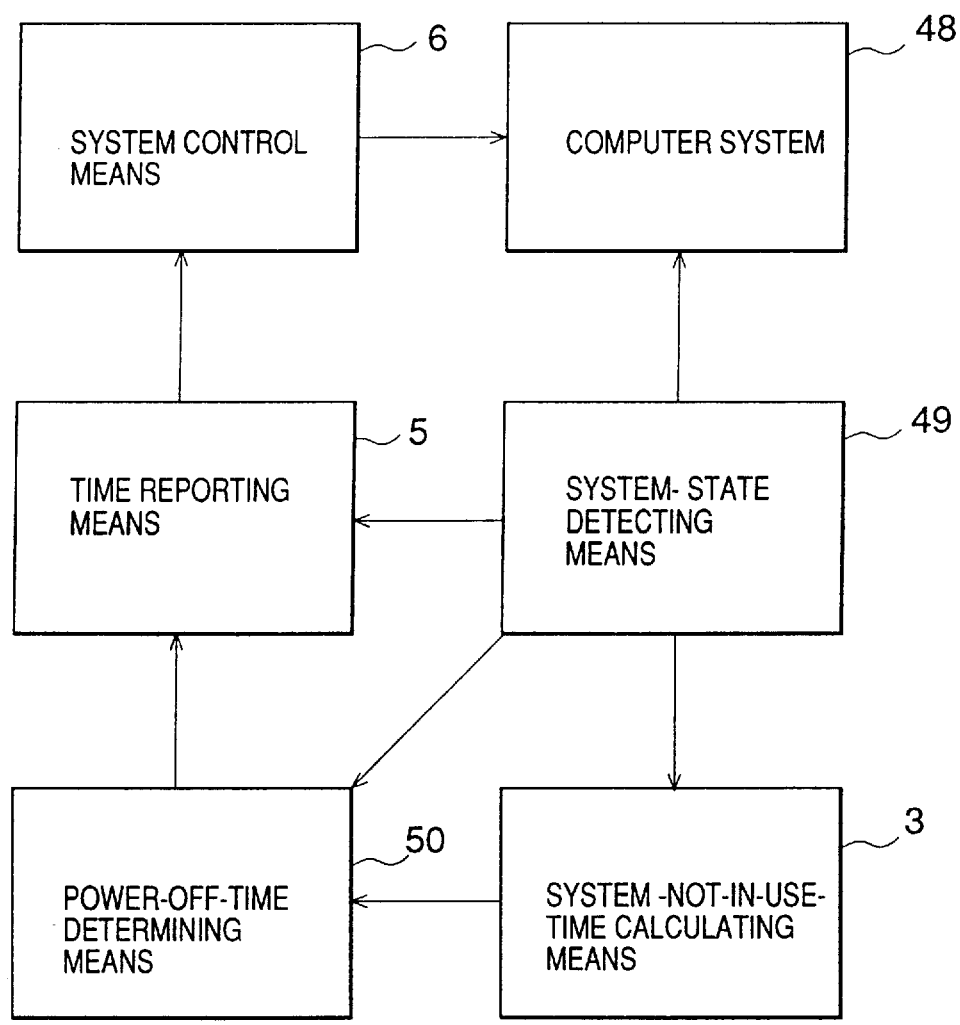
FIG. 64 is a block diagram showing the structure of a power control device according to an eighteenth embodiment of the present invention.

FIG. 64 is a block diagram of a power control apparatus for controlling the power of the computer system 48, according to another embodiment of the present invention.

In FIG. 64, there is shown a computer system 48 using a consumable battery to be power-controlled as a power supply, a system-state detecting unit 49 for detecting the state of the computer system 48, and power-off-time determining unit 50 for determining the time period till the time when the power is turned off while the computer system is not being used, according to the statistics of the time period in which the computer system 48 is not used obtained from the system-not-in-use-time calculating unit 3.

In this embodiment, when the system has a small remaining amount of power in the first embodiment, the calculated automatic-power-off time is made smaller to reduce power consumption even if the inconvenience of having to turn on the power increases.

Operations in the eighteenth embodiment will be described below in detail.

Figure 65:
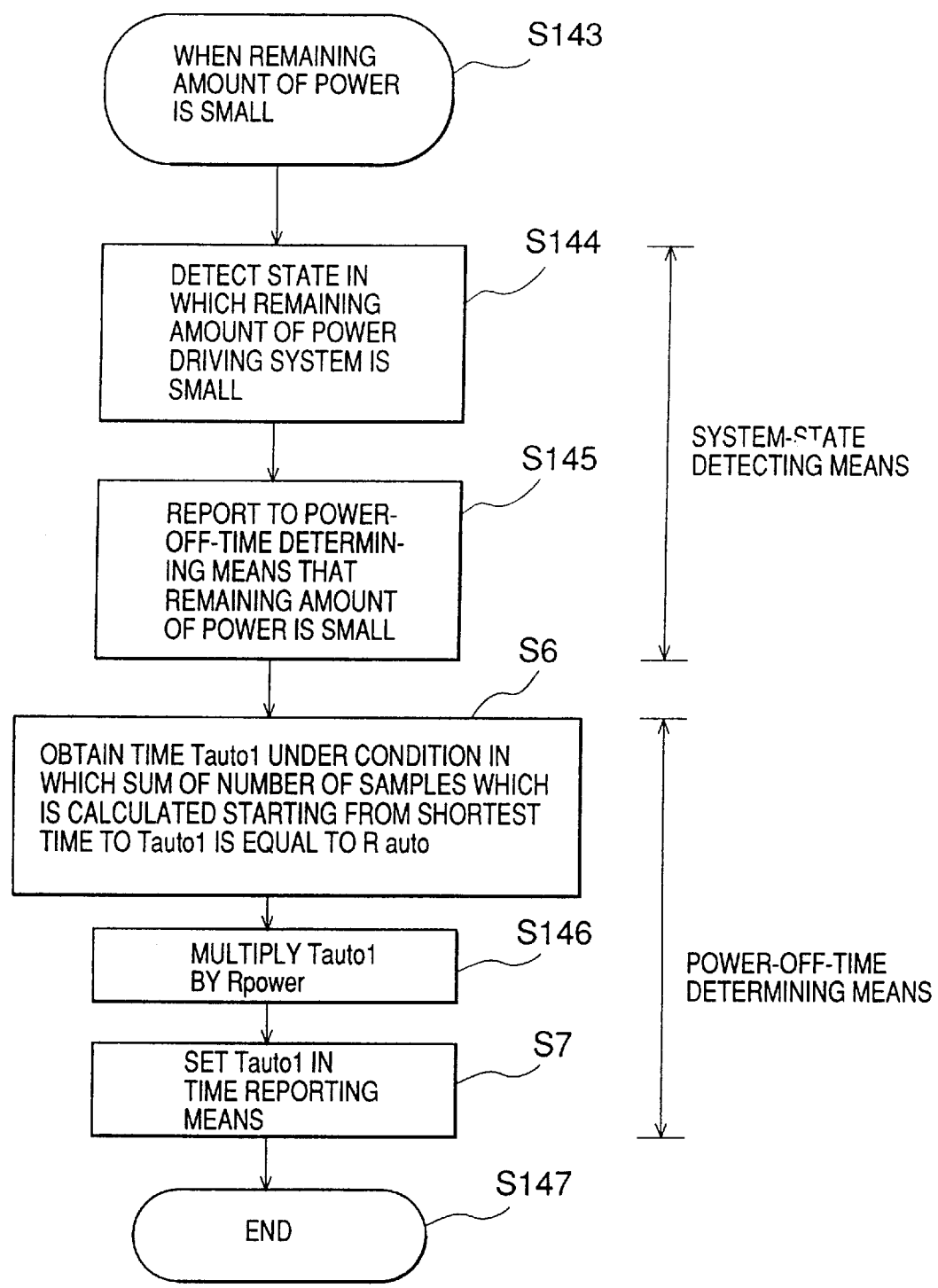
FIGS. 65 to 68 are flowcharts showing operations of the power control device according to the eighteenth embodiment of the present invention.

FIG. 65 is a flowchart showing the processing in a case when the computer system 48 has a small amount of remaining power in the consumable battery (s143).

The system-state detecting unit 49 detects a state in which the remaining amount of power in the consumable battery which drives the computer system 48 is small (s144). Then, the system-state detecting unit 49 reports to the power-off-time determining unit 50 that the remaining amount of power is small (s145).

The power-off-time determining unit 50 performs the same processing as that shown in step s6 in FIG. 6 and multiplies the obtained Tauto1 by Rpower (<1) to make it smaller (s146). The same processing as that shown in step s7 in FIG. 6 is performed and the processing is terminated (s147).

Figure 66:
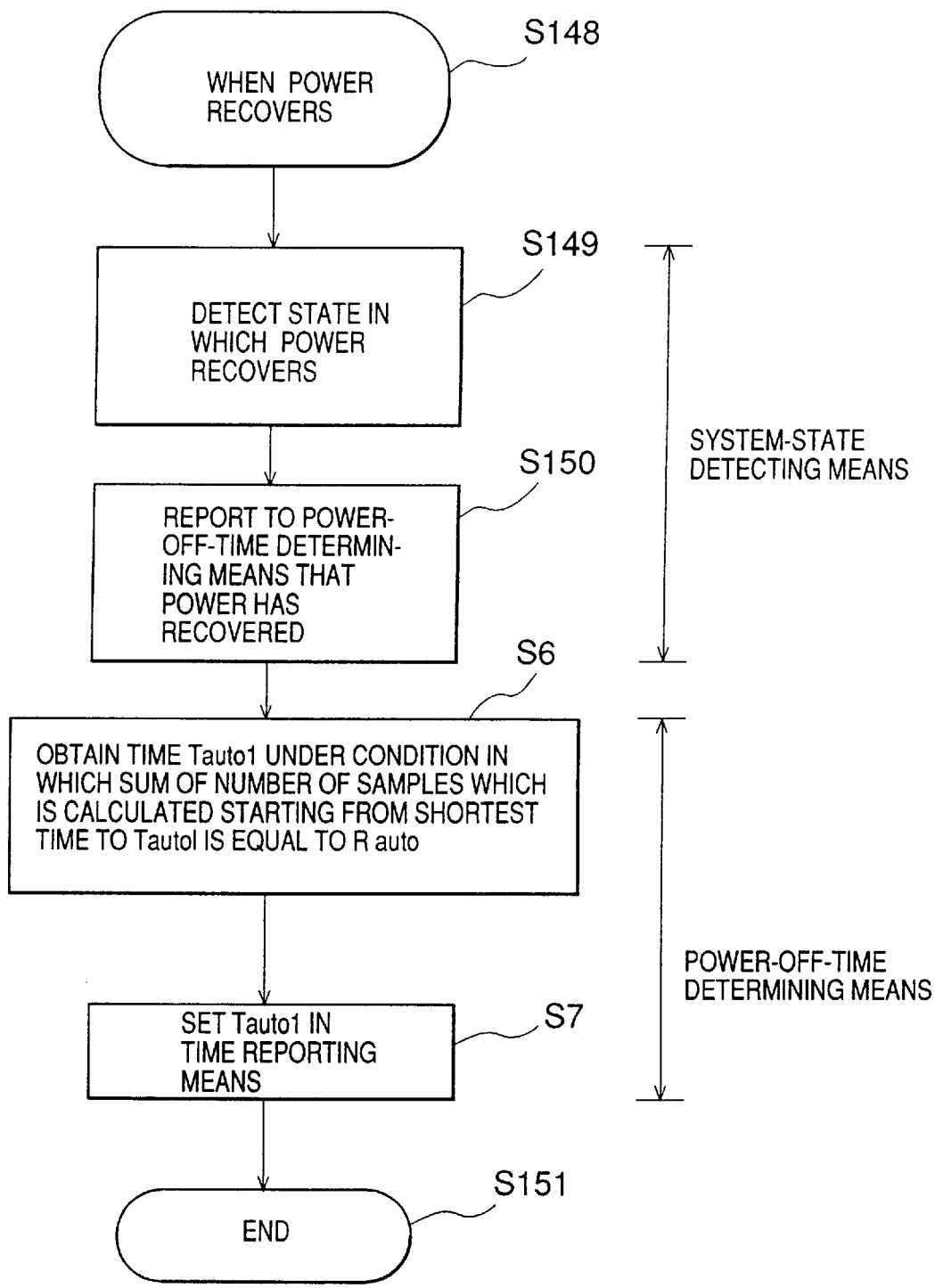

FIG. 66 is a flowchart showing the processing in a case in which the power of the consumable battery, which drives the computer system 48, recovers (s148).

The system-state detecting unit 49 detects a state in which the power of the consumable battery, which drives the computer system 48, recovers (s149). Then, the system-state detecting unit 49 reports to the power-off-time determining unit 50 that the power has recovered (s150).

The same processing as that shown in steps s6 and s7 in FIG. 6 is performed and the processing is terminated (s151).

Figure 67:
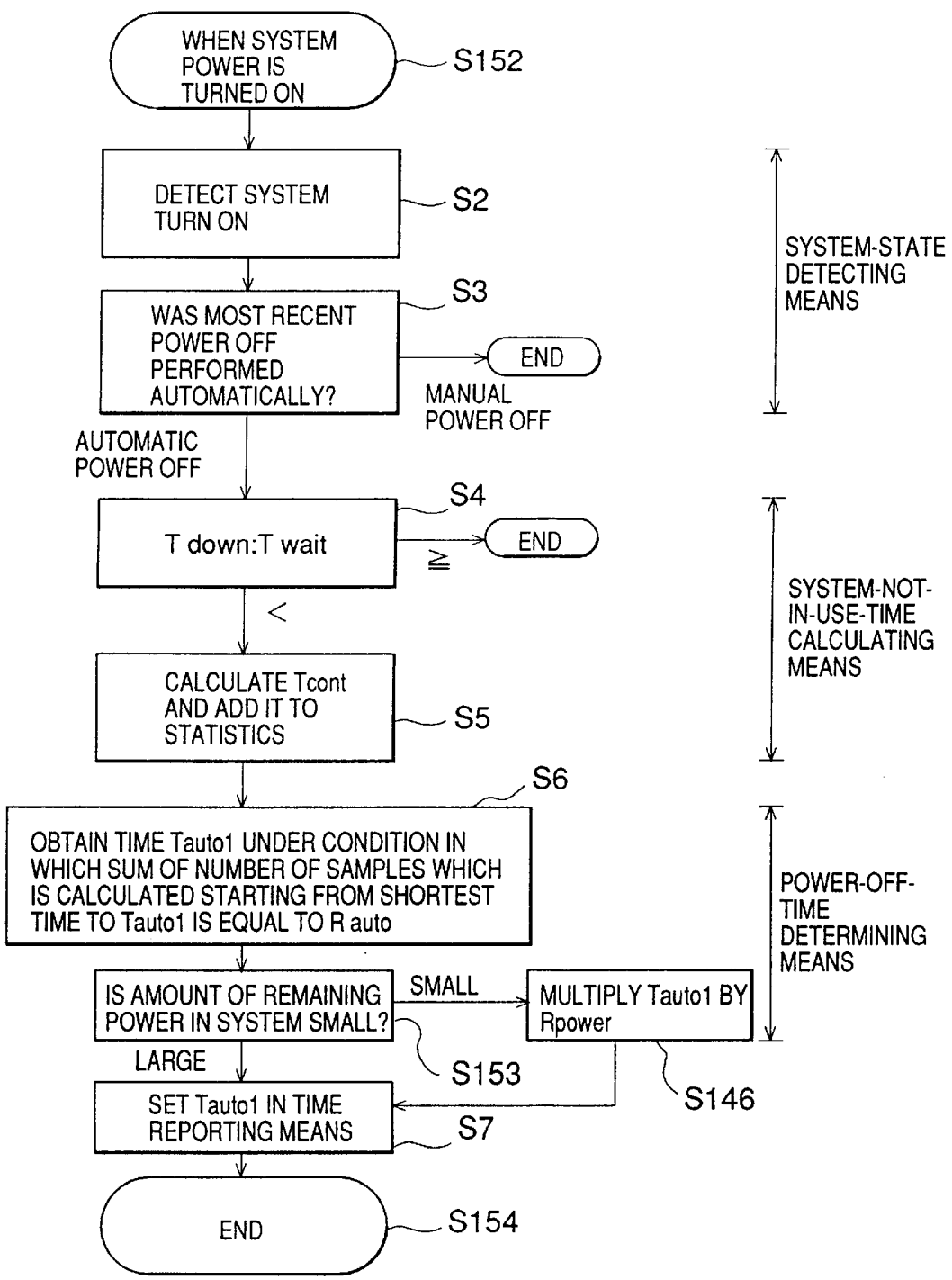

FIG. 67 is a flowchart showing the processing in a case in which the computer system 48 is changed from "off" to "on" (s152).

The same processing as that shown in steps s2 to s5 in FIG. 6 is performed.

The power-off-time determining unit 50 performs the same processing as that shown in step s6 in FIG. 6 and checks whether the remaining amount of power in the consumable battery in the computer system 18 is small (s153). If the remaining amount of power is small, the same processing as that shown in step s146 in FIG. 61 is performed. When the remaining amount of power is large, the same processing as that shown in step s7 in FIG. 6 is performed and the processing is terminated (s154).

Figure 68:
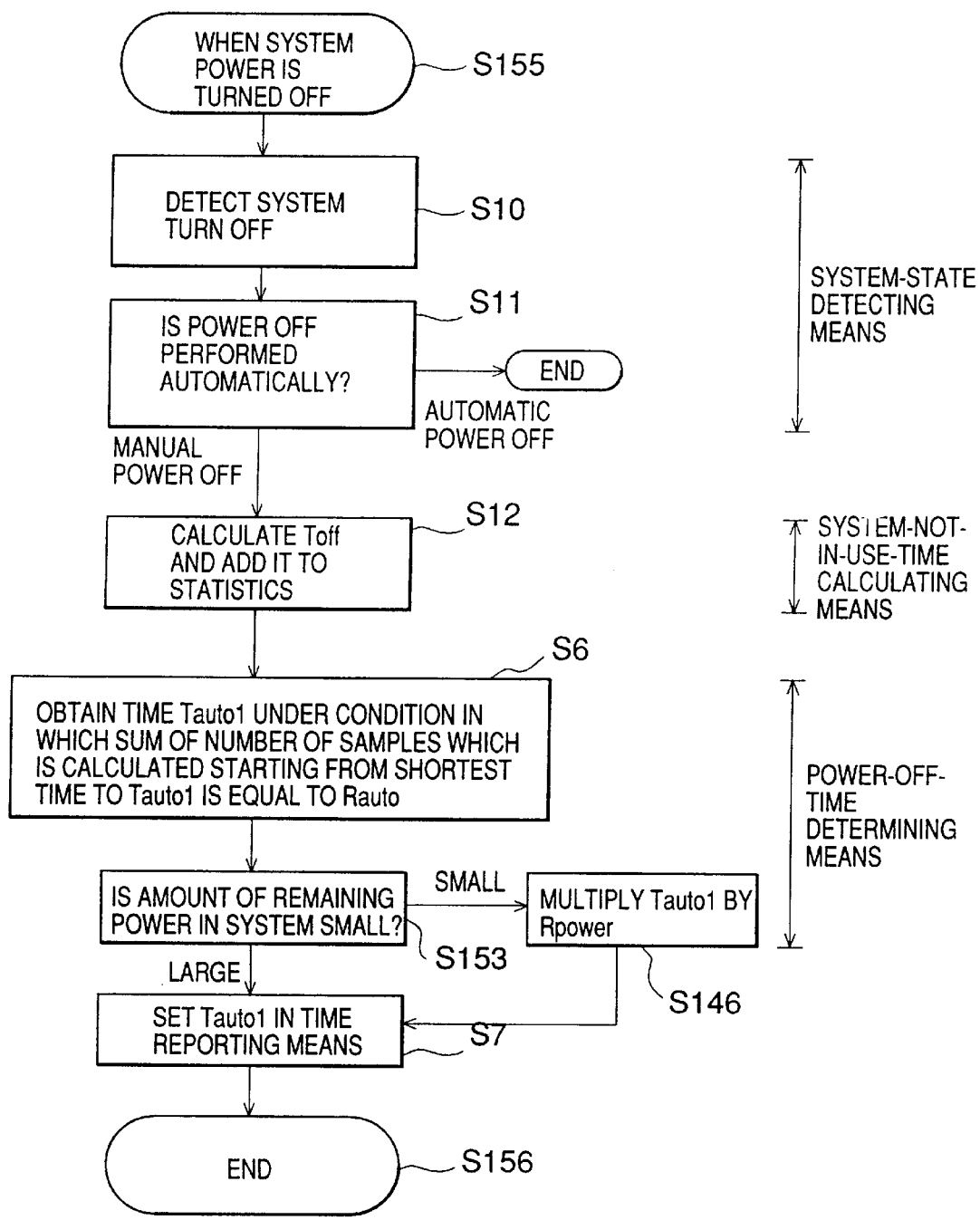

FIG. 68 is a flowchart showing the processing in a case when the computer system 48 is changed from "on" to "off" (s155).

The same processing as that shown in steps s10 to s12 in FIG. 7 is performed.

The power-off-time determining unit 50 performs the same processing as that shown in step s6 in FIG. 6, and then performs the same processing as that shown in step s153 in FIG. 67. When the remaining amount is small, the same processing as that shown in step s146 in FIG. 67 is performed. Then, the same processing as that shown in step s7 in FIG. 6 is performed as when the remaining amount is large, and the processing is terminated (s156).

Operations in FIG. 8 to FIG. 10 are the same as those in this embodiment.

According to this embodiment, when the remaining amount of the power of the computer system 48 is insufficient, power consumption is further reduced to allow the system to be used for a long period, and it can be reported to the user that the remaining amount of the power is insufficient.

Nineteenth Embodiment

Figure 69:
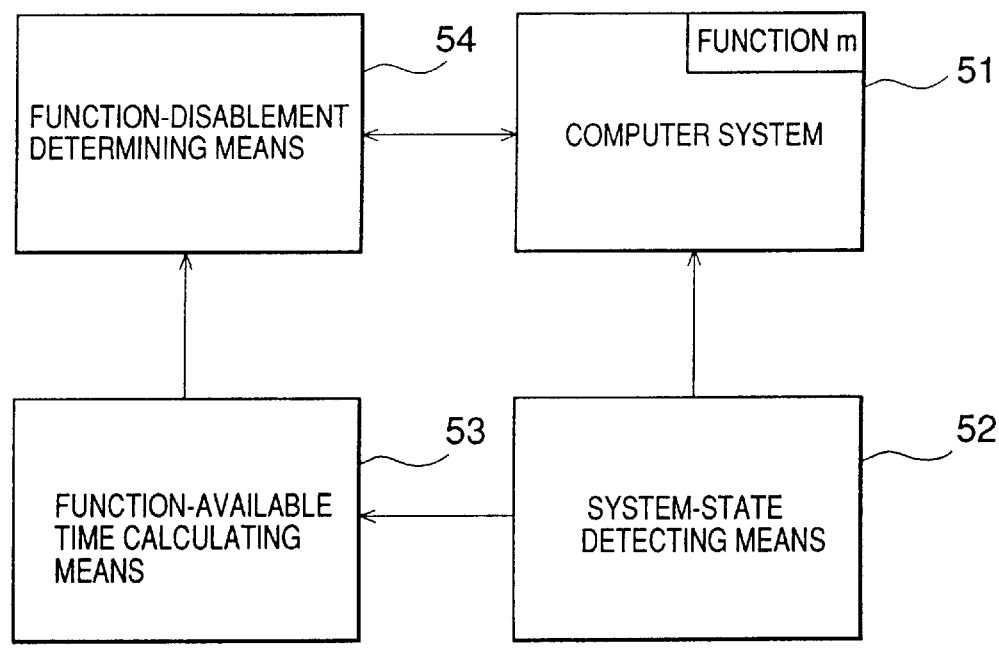
FIG. 69 is a block diagram showing the structure of a power control device according to a nineteenth embodiment of the present invention.

FIG. 69 is a block diagram of a power control apparatus for controlling the power of the computer system 51, according to another embodiment of the present invention.

In FIG. 69, there is shown a computer system 51 to be power-controlled, using a consumable battery as a power supply and having a plurality of functions each of which has a different power consumption, a system-state detecting unit 52 for detecting the state of the computer system 51, a function-available-time calculating unit 53 for obtaining the time period for which each function is usable, from the remaining amount of power and the power consumption of each function, and a function-disablement determining unit 54 for disabling a function according to the time period for which the function is usable.

In this embodiment, the time period for which each function is usable is obtained by measuring the remaining amount of power and the power consumption of each function at a constant interval, and whether each function is disabled is determined by comparing the time period with the reference for determining whether the function is effectively usable, preventing power from wasting uselessly for the function.

Operations in the nineteenth embodiment will be described below.

Figure 70:
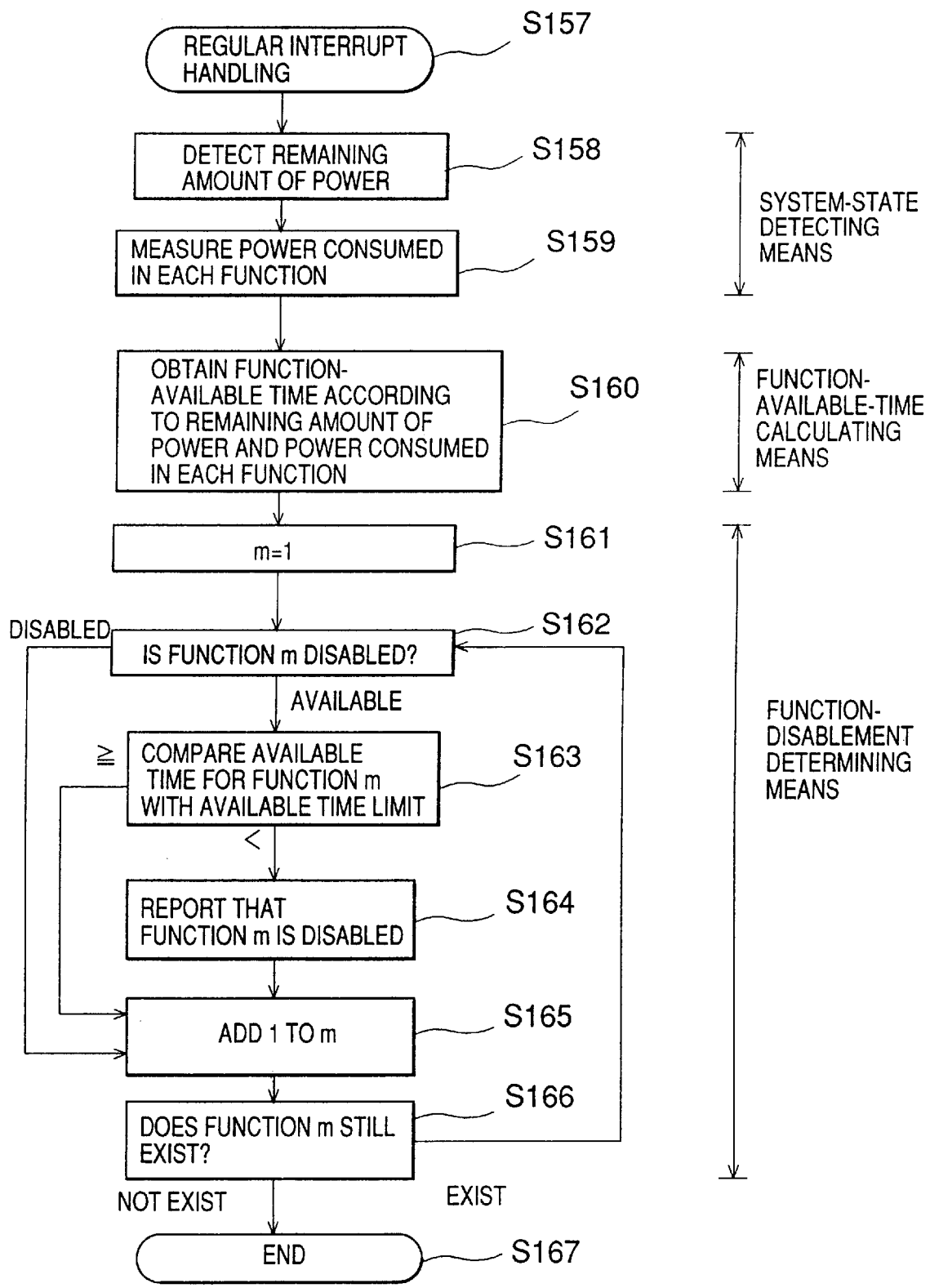
FIG. 70 is a flowchart showing operations of the power control device according to the nineteenth embodiment of the present invention.

FIG. 70 is a flowchart showing the processing in a case when a regular interrupt handling is performed (s157).

The system-state detecting unit 52 detects the remaining amount of power in the consumable battery, used for the computer system 51, and reports the amount to the function-available-time calculating unit 53 (s158). Then, the system-state detecting unit 52 measures the power consumption for each function and reports the value to the function-available-time calculating unit 53 (s159). When power consumption for a function changes while the function is used, it is preferable to use the average power consumption.

The function-available-time calculating unit 53 calculates the time period in which each function can be used, from the remaining amount of power and power consumption for each function, which is recorded in a table (s160). The function-available time is obtained by dividing the remaining amount of power by power consumption.

The function-disablement determining unit 54 sets variable m (m indicates the number assigned to each function) to 1 (s161) and checks whether function m has already been disabled (s162). If disabled, the processing in step s165, described later, is performed. If function m is available, the available time for function m is compared with the function-available time limit set in advance, which is the minimum time required for effectively using function m (s163). When the function available time is equal to or larger than the function-available time limit, the processing in step s165, described later, is performed. When the function available time is smaller than the function-available time limit, function m is disabled and the function-disablement determining unit 54 reports to the computer system 51 that function m is disabled (s164). Then, m is incremented by 1 in order to check the next function (s165), and whether function m still exists is checked (s166). When the next function exists, the processing in step s162, described above, is performed. When the function does not exist, the processing is terminated (s167).

According to this embodiment, when the amount of power in the power supply of the computer system 51 is insufficient, some specified functions among the functions of the computer system 51 are disabled in order to prevent power from wasting with the specified functions being used erroneously, and it is assured that the power is used for the other functions.

Twentieth Embodiment

Figure 71:
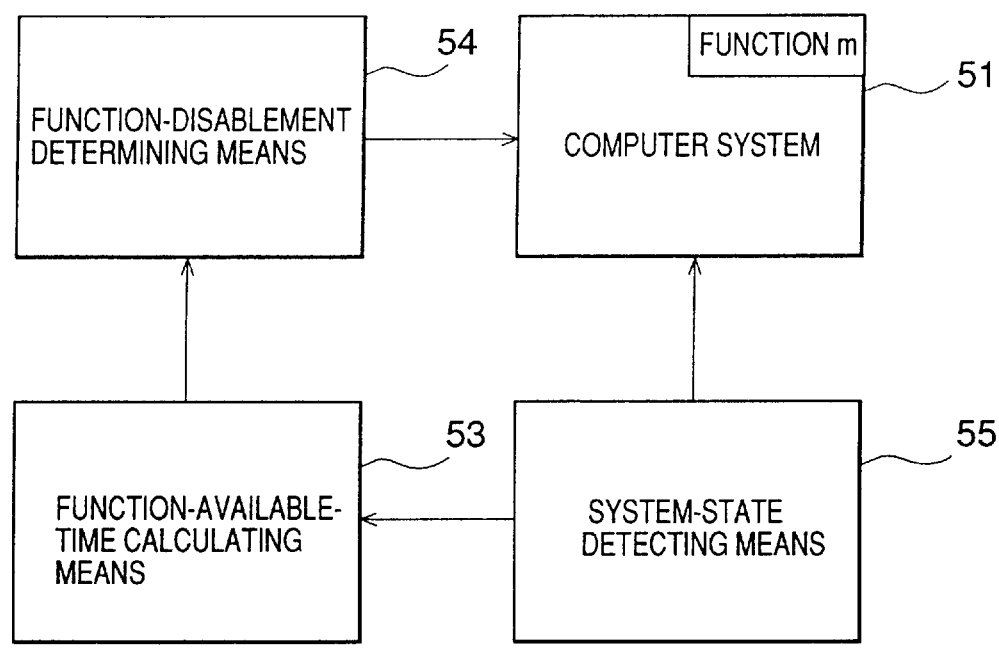
FIG. 71 is a block diagram showing the structure of a power control device according to a twentieth embodiment of the present invention.

FIG. 71 is a block diagram of a power control apparatus for controlling the power of the computer system 51, according to another embodiment of the present invention. The same symbols as those used in FIG. 69 indicate the same or corresponding portions.

In FIG. 71, there is shown a system-state detecting unit 55 for detecting the state of the computer system 51.

In this embodiment, when functions being used are changed in the nineteenth embodiment, the power consumption corresponding to the functions is obtained and stored, and the time in which each function is available is obtained at a constant interval from the remaining amount of power and the stored power consumption corresponding to each function. The need for measuring the power consumption for each function at a constant interval is eliminated and the number of times the processing for measuring power consumption for each function is performed is made smaller.

Figure 72:
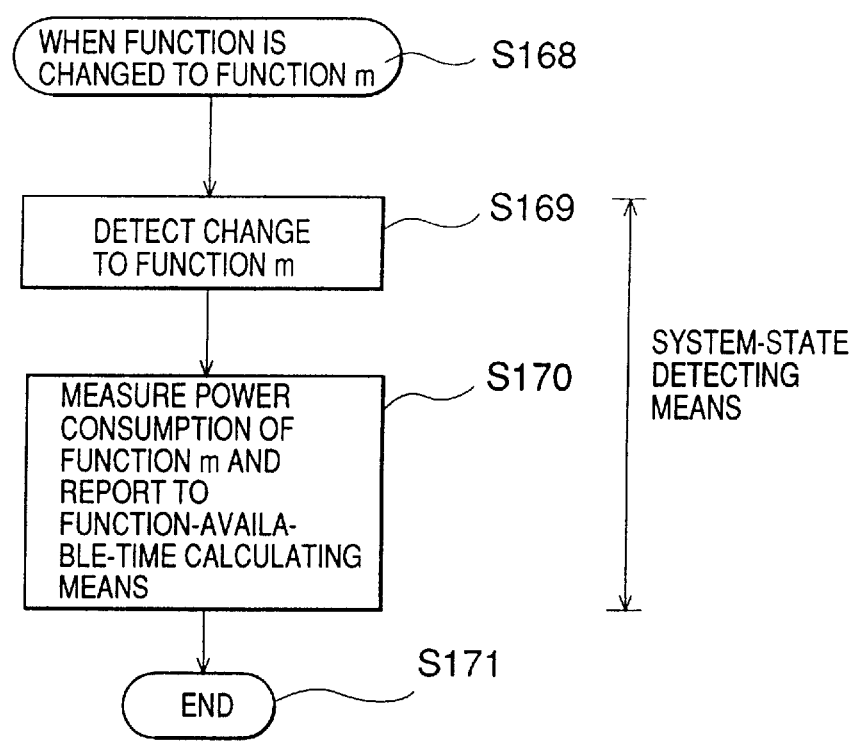
FIG. 72 and FIG. 73 are flowcharts showing operations of the power control device according to the twentieth embodiment of the present invention.

FIG. 72 is a flowchart showing the processing in a case in which the function is changed to function m (s168).

The system-state detecting unit 55 detects a state in which the function being used in the computer system 51 is changed to function m (s169). The system-state detecting unit 55 then detects the remaining amount of power in the consumable battery of the computer system 51, and reports the amount to the function-available-time calculating unit 53 (s170), and the processing is terminated (s171).

Figure 73:
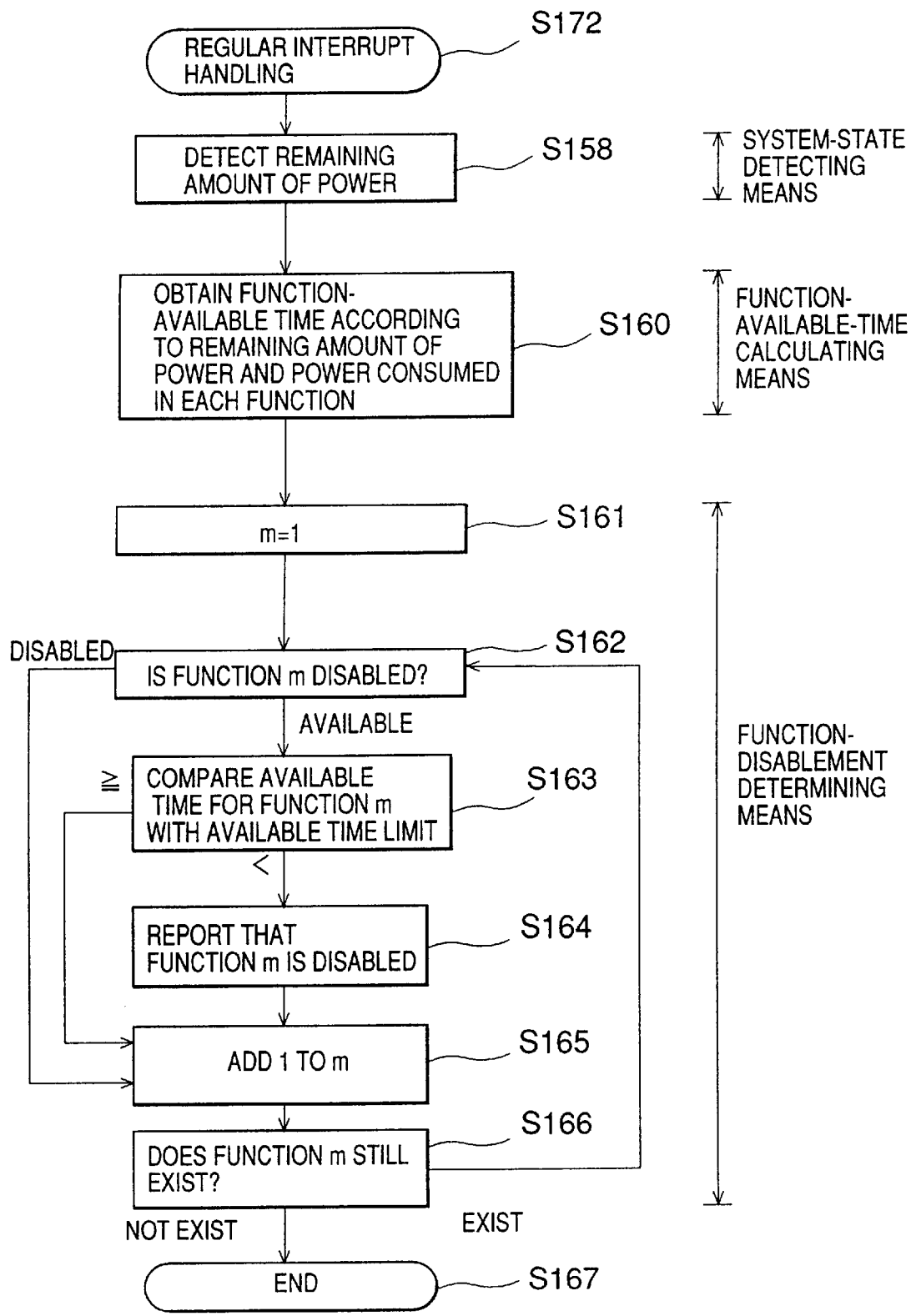

FIG. 73 is a flowchart showing the processing in a case when a regular interrupt handling is performed (s172).

The system-state detecting unit 55 performs the same processing as that shown in step s158 in FIG. 70.

The same processing as that shown in steps s160 to s166 in FIG. 70 is performed, and the processing is terminated (s173).

In the nineteenth embodiment, it is necessary to measure power consumption for each function at a constant interval. In this embodiment, however, it is unnecessary to measure it at a constant interval, increasing processing speed.

Twenty-first Embodiment

FIG. 70 is a block diagram of a power control apparatus for controlling the power of the computer system 1, according to another embodiment of the present invention. The same symbols as those used in FIG. 65 indicate the same or corresponding portions.

Figure 74:
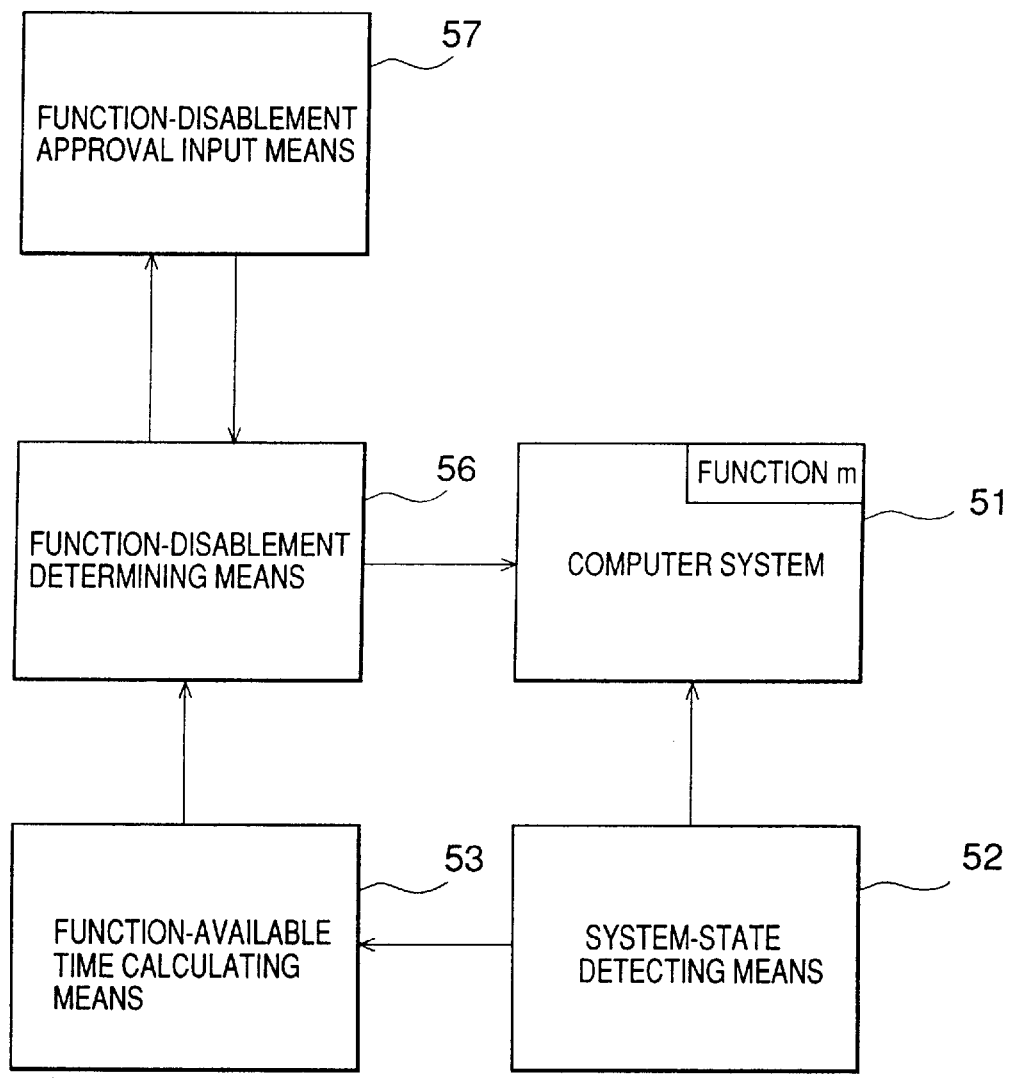
FIG. 74 is a block diagram showing the structure of a power control device according to a twenty-first embodiment of the present invention.

In FIG. 74, there is shown a function-disablement determining unit 56 for disabling a function depending on the time period in which the function is available, and a function-disablement approval input unit 57 for reporting to the user that the function is disabled by the function-disablement determining unit 56 and for obtaining the user's approval for the disablement.

In this embodiment, when it is determined that a function is to be disabled in the nineteenth embodiment, the function is prevented from being disabled if the user needs the function, by obtaining the user's intention by asking the user if the function is actually disabled.

Operations in the twenty-first embodiment will be described below.

Figure 75:
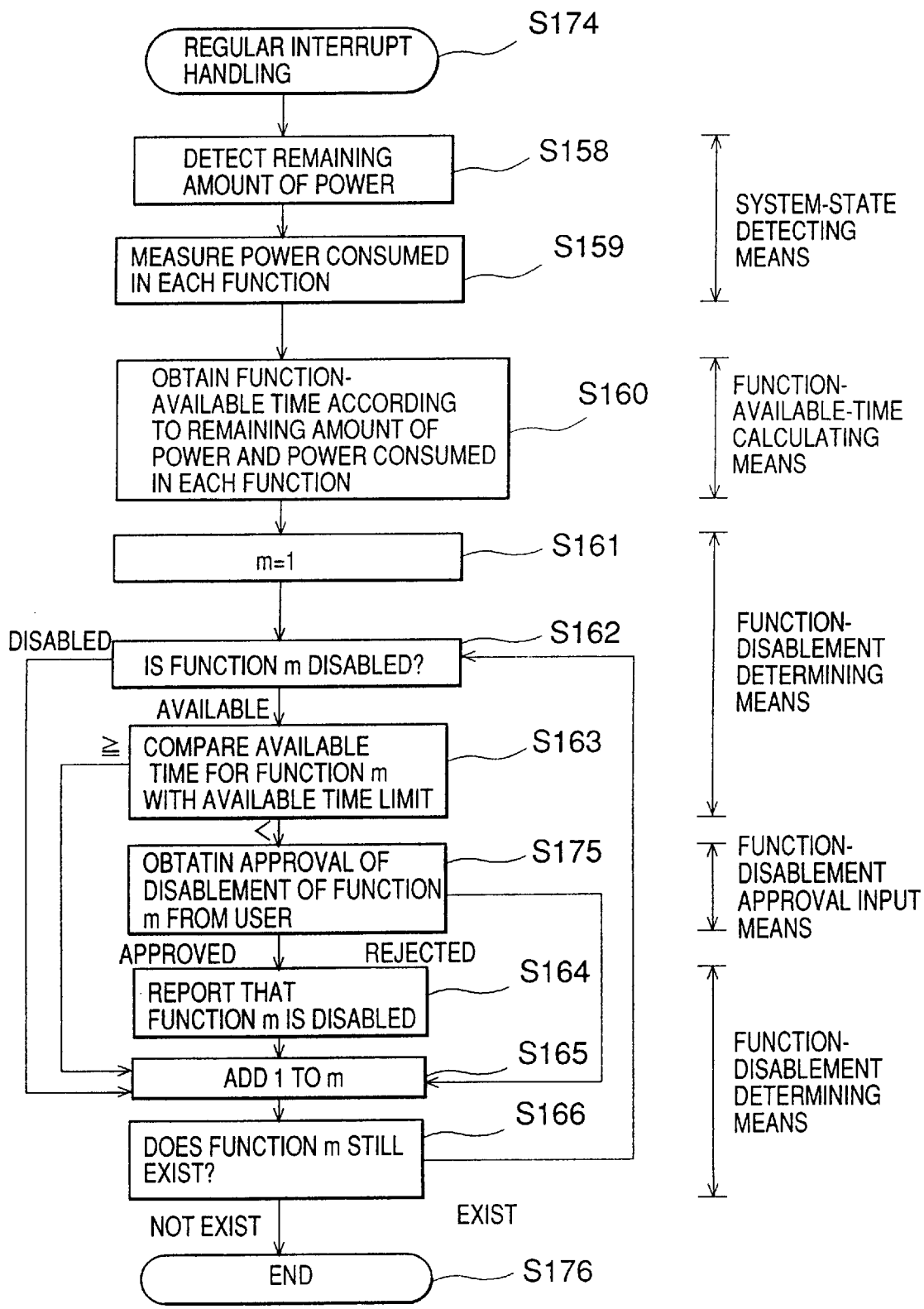
FIG. 75 is a flowchart showing operations of the power control device according to the twenty-first embodiment of the present invention.

FIG. 75 is a flowchart showing the processing in a case in which interrupt handling is performed at a regular interval (s174).

The system-state detecting unit 55 performs the same processing as that shown in steps s158 to s160 in FIG. 70.

The function-disablement determining unit performs the same processing as that shown in steps s161 to s163 in FIG. 70.

When the function-available time is shorter than the function-available time limit, the function-disablement approval input unit 57 reports to the user that function m is to be disabled, asks the user if the user approves the disablement of function m, and receives an input from the user (s175).

When the user rejects the disablement of the function, processing in step s165, described later, is performed. When the user approves the disablement, the function-disablement determining unit 56 performs the same processing as that shown in step s164 in FIG. 70. Then, the same processing as that shown in steps s165 and s166 is performed and the processing is terminated (s176).

In this embodiment, even when it is automatically determined that a function is to be disabled if the remaining power is small, if the user needs the function in such a case in which the user wants to finish work being handled for a short period with the function, the user's determination has priority over the automatic determination, improving user-friendly operations.

Twenty-second Embodiment

Figure 76:
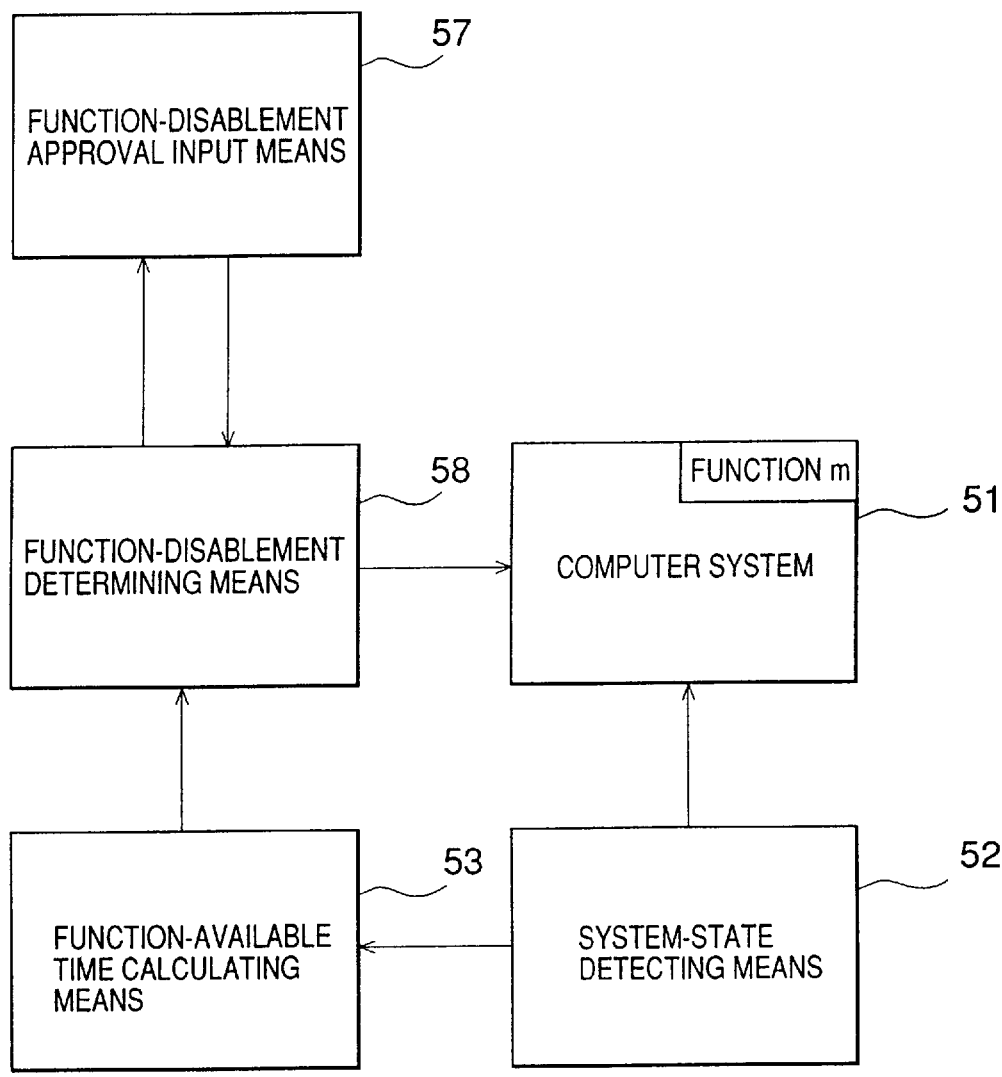
FIG. 76 is a block diagram showing the structure of a power control device according to a twenty-second embodiment of the present invention.

FIG. 76 is a block diagram of a power control apparatus for controlling the power of the computer system 1, according to another embodiment of the present invention. The same symbols as those used in FIG. 69 or FIG. 74 indicate the same or corresponding portions.

In FIG. 76, there is shown a function-disablement determining unit 58 for disabling a function depending on the time period in which the function is available.

In this embodiment, when the system obtains the user's approval of the disablement of a function in the twenty-first embodiment, the function-available time of that function is used as a reference for determining whether the function is effectively used, making the subsequent determination of the disablement of a function more closer to the user's demand.

Operations in the twenty-second embodiment will be described below.

Figure 77:
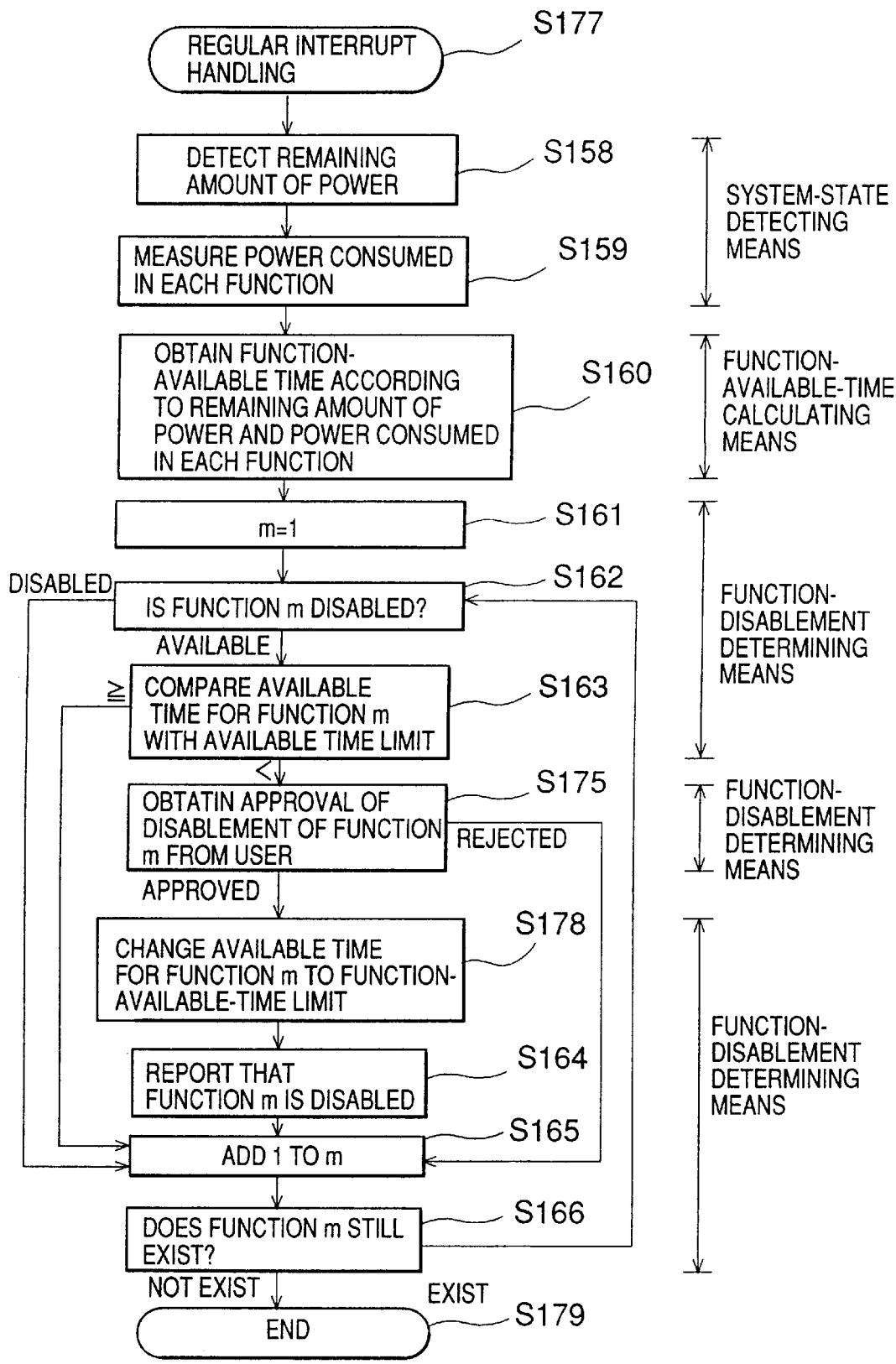
FIG. 77 is a flowchart showing operations of the power control device according to the twenty-second embodiment of the present invention.

FIG. 77 is a flowchart showing the processing in a case in which interrupt handling is performed at a regular interval (s177).

The same processing as that shown in steps s158 to s163 in FIG. 70 is performed.

The same processing as that shown in step s175 in FIG. 75 is performed.

When the disablement of the function is approved, the function-disablement determining unit 58 changes the function-available time limit for function m to the function-available time for function m at that time (s178). Then, the same processing as that shown in steps s164 to s16 in FIG. 70 is performed and the processing is terminated (s179).

According to this processing, the automatic determination for disablement is corrected according to the user's determination, improving the user-friendly operations.

Twenty-third Embodiment

Figure 78:
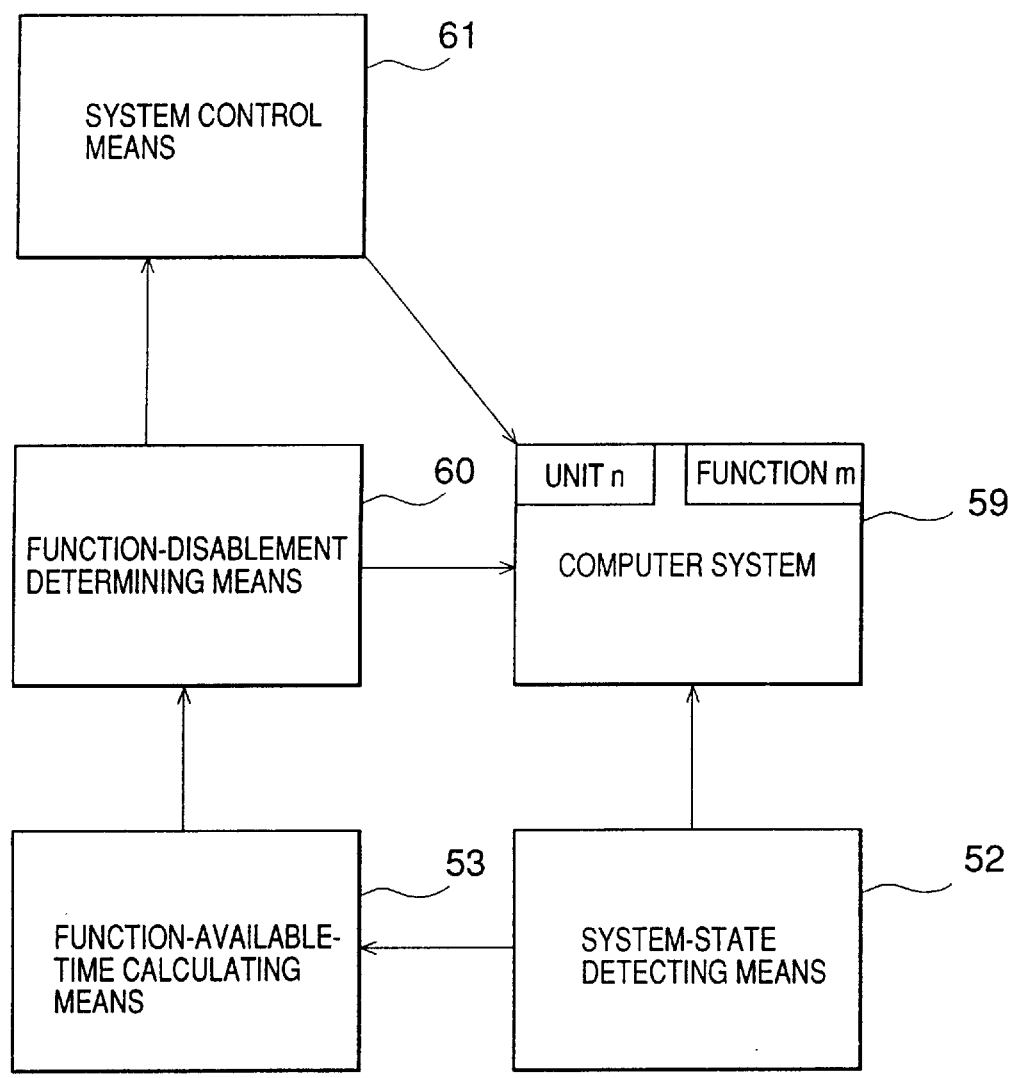
FIG. 78 is a block diagram showing the structure of a power control device according to a twenty-third embodiment of the present invention.

FIG. 78 is a block diagram of a power control apparatus for controlling the power of the computer system 61, according to another embodiment of the present invention. The same symbols as those used in FIG. 69 indicate the same or corresponding portions.

In FIG. 78, there is shown a computer system 59 to be power-controlled which uses a consumable battery as a power supply, and which has a plurality of functions each of which has different power consumption, and which includes a plurality of units that can be power-controlled, a function-disablement determining unit 60 for disabling a function depending on the time period in which the function is available, and a system control unit 61 for turning off the power of a unit which is unnecessary in the computer system 59 when the function-disablement determining unit 60 reports to the system control unit that the corresponding function is disabled.

In this embodiment, when it is determined that a function is to be disabled in the nineteenth embodiment, the corresponding unit, which is made unnecessary, is turned off, reducing power consumption.

Operations in the twenty-third embodiment will be described below.

Figure 79:
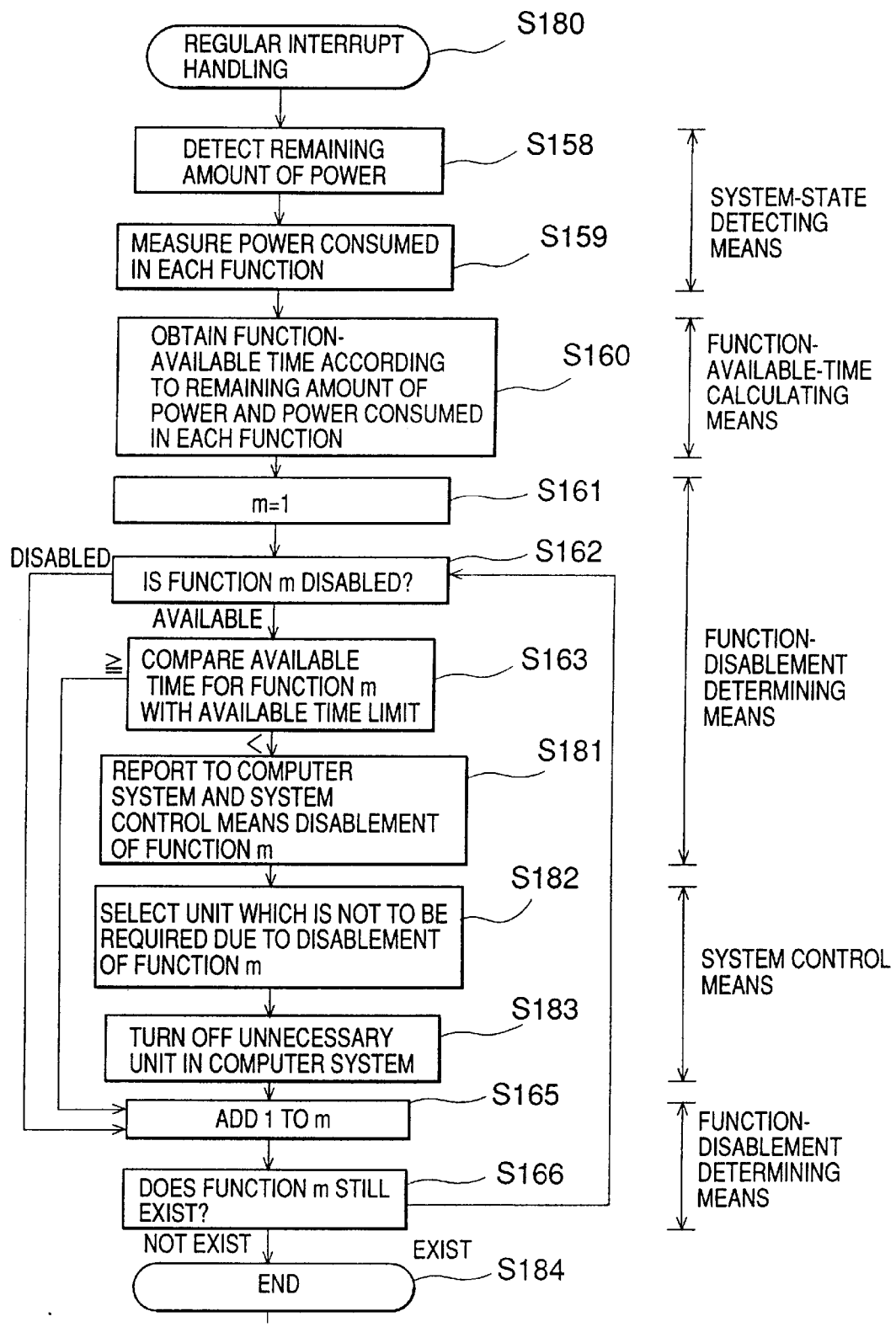
FIG. 79 is a flowchart showing operations of the power control device according to the twenty-third embodiment of the present invention.
Figure 80:
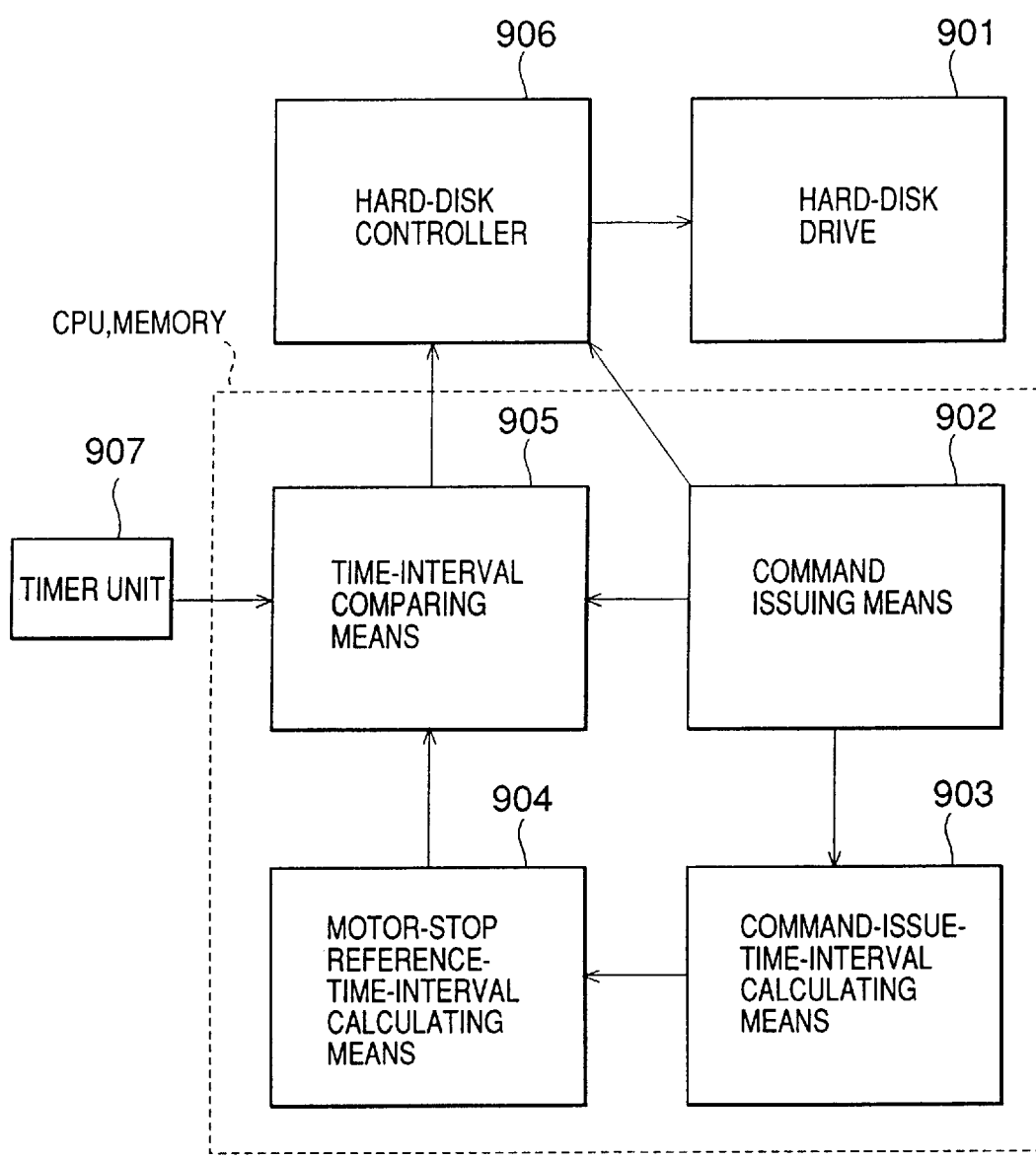
FIG. 80 is a block diagram showing the structure of a conventional data processing apparatus.

FIG. 79 is a flowchart showing the processing in a case in which interrupt handling is performed at a regular interval (s180).

The same processing as that shown in steps s158 to s160 in FIG. 66 is performed.

The function-disablement determining unit 60 performs the same processing as that shown in steps 161 to s163 in FIG. 70. When the function-available time is shorter than the function-available time limit, the function-disablement determining unit 60 reports the disablement of function m to the computer system 59 and the system control unit 61 (s181).

The system control unit 61 disables function m, for which a report is received, and selects a unit which becomes unnecessary with the functions that have been disabled being taken into account (s182). The selected unnecessary unit in the computer system 59 is turned off(s183).

The function-disablement determining unit 60 performs the same processing as that shown in steps s165 and s166 in FIG. 70. Then, the processing is terminated (s184).

According to this embodiment, when power of the power supply of the computer system 1 is insufficient, the units corresponding to the disabled functions are stopped, reducing the system power consumption and allowing available functions to be used for a longer period.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims.

What is claimed is:

1. A power control apparatus comprising:

a system which is driven and controlled by one of a user and automatically;

state detecting means for detecting a state of operation of said system;

measuring means for measuring information regarding changes in a state of operation of said system as determined by said state detecting means after finishing processing;

determining means for determining an automatic-drive-stop time period from a time when said system finishes processing to a time when said system is automatically stopped, according to said information;

time reporting means, receiving the output of the state detecting means, for measuring an idling time from a time when said system finishes processing to a time when processing is re-started, and for reporting that the idling time has exceeded said automatic-drive-stop time period; and system control means for stopping said system based upon an output of said time reporting means.

2. A power control apparatus of claim 1, wherein said information includes a drive-stop designation time period from a time when said system finishes processing to a time when the user designates a drive-stop for said system, and a drive-start designation time period from a time when said system finishes processing to a time when the user designates a drive-start for said system after the drive for said system has been stopped automatically.

3. A power control apparatus of claim 2, wherein said automatic-drive-stop time period is determined according to an average time of a plurality of said drive-stop designation time periods and said drive-start designation time periods.

4. A power control apparatus of claim 2, wherein said automatic-drive-stop time period is determined according to a constant multiple of an average time of a plurality of said drive-stop designation time periods and said drive-start designation time periods.

5. A power control apparatus of claim 2, wherein said automatic-drive-stop time period is determined according to an average value of a total of a plurality of said drive-stop designation time periods and said drive-start designation time periods.

6. A power control apparatus of claim 2, wherein said automatic-drive-stop time period is further determined according to at least one of a predetermined upper limit and a predetermined lower limit.

7. A power control apparatus of claim 2, wherein said drive-stop designation time period is set to one of an upper limit and a lower limit and said drive-start designation time period is set to another one of said upper limit and said lower limit.

8. A power control apparatus of claim 2, wherein said automatic-drive-stop time period is determined according to a first process when automatic drive-stops are detected a predetermined number of consecutive times, and according to a second process when automatic drive-stops are not detected said predetermined number of consecutive times.

9. A power control apparatus of claim 2, wherein said drive-stop designation time period, said drive-start designation time period, and said automatic drive-stop time period are reduced at predetermined rate.

10. A power control apparatus of claim 1, wherein said information includes a number of drive-stop designations in which the user designates a drive-stop for said system after processing finishes, and a number of automatic drive-stops in which the drive is automatically stopped after processing finishes.

11. A power control apparatus of claim 10, wherein said automatic-drive-stop time period is determined according to a ratio of said number of drive-stop designations to said number of automatic-drive-stops.

12. A power control apparatus of claim 10, wherein said automatic-drive-stop time period is determined according to a first process when said drive-stop designation time period is at or below a lower limit, and according to a second process when said drive-stop designation time period is greater than said lower limit.

13. A power control apparatus of claim 10, wherein said automatic-drive-stop time period is further determined according to at least one of a predetermined upper limit and a predetermined lower limit.

14. A power control apparatus of claim 10, wherein said automatic-drive-stop time period is determined according to a first process when automatic drive-stops are detected a predetermined number of consecutive times, and according to a second process when automatic drive-stops are not detected said predetermined number of consecutive times.

15. A power control apparatus of claim 1, wherein said information includes a number of automatic drive-stops in which the drive is automatically stopped after processing finishes, and a number of drive-start designations from a time when said system finishes processing to a time when the user designates a drive-start for said system after the drive for said system has been stopped automatically.

16. A power control apparatus of claim 15, wherein said automatic-drive-stop time period is determined according to a ratio of said number of automatic drive-stops to said number of drive-start designations.

17. A power control apparatus of claim 15, wherein said automatic-drive-stop time period is determined according to a first process when said drive-start designation time period is at or below a lower limit, and according to a second process when said drive-start designation time period is greater than said lower limit.

18. A power control apparatus of claim 15, wherein said automatic-drive-stop time period is further determined according to at least one of a predetermined upper limit and a predetermined lower limit.

19. A power control apparatus of claim 1, wherein said measuring means measures said information separately for each of a plurality of users, said determining means includes input means for inputting the name of a user of said system, and said automatic-drive-stop time period is determined based upon the user.

20. A power control apparatus of claim 1, wherein said measuring means measures said information separately for each of a plurality of functions of said system, and said determining means determines an automatic-drive-stop time period for each function.

21. A power control apparatus of claim 1, wherein said measuring means measures said information separately for each of a plurality of units of said system, said determining means determines an automatic-drive-stop time period for each unit, said reporting means reports that an idling time of a unit has exceeded a corresponding automatic-drive-stop time period for said unit, and said stopping means stops a drive for said unit according to an output of the reporting means.

22. A power control apparatus of claim 1, wherein said determining means determines said automatic-drive-stop time period according to changes in power consumption of said system and said time periods when the transient power consumed in said system at power on differs from the average power consumed in idling.

23. A power control apparatus of claim 1, wherein said determining means determines said automatic-drive-stop time period according to a remaining power of the power supply which drives said system and said time periods.

24. A method for determining an automatic stop period for a unit of a system comprising the steps of:

determining a plurality of stop time periods, each stop time period being a time after processing in said unit has finished until a user designates a stop;

determining a plurality of start time periods, each start time period being a time after processing in said unit has finished until a user designates a start following an automatic stop;

storing said plurality of stop time periods and said plurality of start time periods; and determining the automatic stop period based upon a combination of said stored plurality of stop time periods and said stored plurality of start time periods.

25. The method of claim 24, wherein the step of determining the automatic stop period includes the steps of:

determining an average time of said stored plurality of stop time periods and said stored plurality of start time periods; and determining the automatic stop period based upon said average time.

26. The method of claim 25, wherein said automatic stop period is determined as a predetermined multiple of said average time.

27. The method of claim 25, wherein the step of determining the automatic stop period further includes the steps of:

comparing a stop time period to at least one of an upper limit and a lower limit;

comparing a start time period to at least one of an upper limit and a lower limit; and wherein the storing step occurs based upon a result of the comparison steps.

28. The method of claim 24, wherein the step of determining the automatic stop period includes the step of:

determining the automatic stop period based upon a ratio of a number of said stored plurality of stop time periods to a number of said stored plurality of start time periods.

29. A method for saving power in a system comprising the steps of:

determining a plurality of stop time periods for at least one unit, each stop time period being a time after processing in said at least one unit has finished until a user designates a stop;

determining a plurality of start time periods for the at least one unit, each start time period being a time after processing in said at least one unit has finished until a user designates a start following an automatic stop;

storing said plurality of said stop time periods and said plurality of said start time periods;

determining an automatic stop period for the at least one unit based upon the stored plurality of stop time periods and the stored plurality of start time periods; and stopping the at least one unit when said automatic stop period has elapsed after processing has finished.

30. The method of claim 29, wherein the step of determining the automatic stop period includes the steps of:

determining an average time of said stored plurality of stop time periods and said stored plurality of start time periods; and determining the automatic stop period based upon said average time.

31. The method of claim 29, wherein the step of determining the automatic stop period includes the step of:

determining the automatic stop period based upon a ratio of a number of said stored plurality of stop time periods to a number of said stored plurality of start time periods.

32. A power control apparatus for a system having at least one unit comprising:

measuring means for measuring information regarding changes in an operation state of the at least one unit of the system after processing in the at least one unit has finished;

determining means for determining an automatic stop period for the at least one unit based upon the measured information; and stopping means for stopping the at least one unit when said automatic stop period has elapsed after processing has finished.

33. The power control apparatus of claim 32, wherein said information includes a drive-stop designation time period from a time when said system finishes processing to a time when the user designates a drive-stop for said system, and a drive-start designation time period from a time when said system finishes processing to a time when the user designates a drive-start for said system after the drive for said system has been stopped automatically.

* * * * *